United States Patent
Wiedemann

(10) Patent No.: US 6,834,473 B2
(45) Date of Patent: Dec. 28, 2004

(54) BOTTLING PLANT AND METHOD OF OPERATING A BOTTLING PLANT AND A BOTTLING PLANT WITH SECTIONS FOR STABILIZING THE BOTTLED PRODUCT

(75) Inventor: Ulrich Wiedemann, Dortmund (DE)

(73) Assignee: KHS Maschinen- und Anlagenbau AG, Dortmund (DE)

( * ) Notice: Subject to any disclaimer, the term of this patent is extended or adjusted under 35 U.S.C. 154(b) by 1 day.

(21) Appl. No.: 09/942,254

(22) Filed: Aug. 29, 2001

(65) Prior Publication Data

US 2002/0073652 A1 Jun. 20, 2002

Related U.S. Application Data

(63) Continuation-in-part of application No. 09/510,862, filed on Feb. 23, 2000, now Pat. No. 6,374,575.

(30) Foreign Application Priority Data

Aug. 30, 2000 (DE) .......................................... 100 42 528

(51) Int. Cl.[7] .............................................. B65B 63/28
(52) U.S. Cl. ............................. 53/127; 53/48.7; 53/288; 53/440; 426/407; 422/3
(58) Field of Search ......................... 53/127, 48.7, 288, 53/440, 425, 426, 428; 426/407; 422/3, 38, 62

(56) References Cited

U.S. PATENT DOCUMENTS

| | | | |
|---|---|---|---|
| 3,813,895 A | | 6/1974 | Klee et al. |
| 4,441,406 A | * | 4/1984 | Becker et al. |
| 4,457,892 A | * | 7/1984 | Young ............................ 422/3 |
| 4,476,809 A | | 10/1984 | Bunger |
| 4,688,476 A | | 8/1987 | Zittel |
| 4,727,800 A | | 3/1988 | Richmond et al. |
| 4,773,321 A | * | 9/1988 | Wijts |

(List continued on next page.)

FOREIGN PATENT DOCUMENTS

| | | |
|---|---|---|
| CA | 2299082 | 8/2000 |
| DE | 3107193 | 9/1982 |
| DE | 3637661 | 5/1987 |
| DE | 29716644 | 1/1998 |
| EP | 0249323 | 12/1987 |
| EP | 0430907 | 6/1991 |
| EP | 0960574 | 12/1999 |
| FR | 0598458 | 5/1994 |
| RU | 1790366 | 1/1993 |
| WO | 9522352 | 8/1995 |
| WO | 9602626 | 2/1996 |

OTHER PUBLICATIONS

281—Patent and Utility Model Registry.

*Primary Examiner*—Eugene Kim
*Assistant Examiner*—Sameh H. Tawfik
(74) *Attorney, Agent, or Firm*—Nils H. Ljungman & Associates

(57) ABSTRACT

There is now provided a method and an apparatus therefor for stabilizing products in containers in a continuous container flow by stationary, sequential sections by means of overflowing liquid, whereby the sections are graduated with respect to one another in terms of their liquid temperature, and for purposes of efficient liquid recycling are organized in pairs, so that the liquid is transported by overflow among sections, and to set the desired temperature of the overflowing liquid, liquid is added to the liquid being transported, characterized by the fact that the excess liquid in the at least one zone overflows in a cascade fashion from zone to zone of increasing overflow temperature and into liquid reservoirs. A pasteurization unit for pasteurizing products in containers in a flow of containers through successive sections at least for heating, pasteurizing and cooling by means of fluid covering them, such as by trickling over them, spraying over them, with a pasteurizer housing and spray devices located inside it, is characterized by the fact that the roof of the pasteurizer housing is realized in the form of a roof sprayer and forms both the roof and the spray devices.

20 Claims, 33 Drawing Sheets

U.S. PATENT DOCUMENTS

| | | | |
|---|---|---|---|
| 4,797,255 A | * | 1/1989 | Hatanaka et al. |
| 5,012,727 A | * | 5/1991 | Pesente |
| 5,044,267 A | | 9/1991 | Sollich |
| 5,152,968 A | * | 10/1992 | Foti et al. ............. 53/425 |
| 5,178,841 A | * | 1/1993 | Vokins et al. ......... 53/425 |
| 5,896,727 A | * | 4/1999 | Egli et al. ............. 53/426 |
| 6,135,015 A | * | 10/2000 | Mendez |
| 6,142,065 A | * | 11/2000 | Panella et al. |
| 6,187,097 B1 | | 2/2001 | Klenk |

\* cited by examiner

To Fig. 2D

BOTTLING PLANT AND METHOD OF OPERATING A BOTTLING PLANT AND A BOTTLING PLANT WITH SECTIONS FOR STABILIZING THE BOTTLED PRODUCT

CONTINUING APPLICATION DATA

This application is a continuation-in-part of U.S. Ser. No. 09/510,862, filed on Feb. 23, 2000, U.S. Pat No. 6,374,575 which claims priority from Federal Republic of Germany Patent Application No. 199 08 035.6 filed Feb. 24, 1999.

BACKGROUND OF THE INVENTION

1. Field of the Invention

The present invention relates to a bottling plant and method of operating a bottling plant and a bottling plant with sections for stabilizing bottled products in containers.

2. Background Information

In the beverage industry, in particular when products being bottled are easily perishable, it is common practice to heat-stabilize the products. In bottling plants of the known art, the containers that contain the products are transported in a practically uniform movement from the entry of the plant to the exit from the plant. As they move through the plant, they are heated until they have achieved the required degree of heat-stabilization and are then cooled, whereupon the heat-stabilizing process is completed. A heat-stabilizing tunnel provided for this purpose consequently has a heating section, a superheating and heat-stabilizing section, and a final cooling section. The individual sections can have additional sub-zones. The gradual heating and cooling that such an arrangement provides is preferred, in particular for the glass bottles used in the beverage industry, to prevent any destruction of the glass bottles caused by abrupt temperature changes. The transmission of heat to the product in the containers normally occurs by spraying these containers with water as they are advanced on a conveyor belt which allows the liquid to be sprayed from underneath. Underneath the conveyor belt are catch basins for the sprayed liquid from which the pumps for the spraying are fed. Heat can be exchanged by means of the spray liquid zone-wise between the zones to be heated and the zones to be cooled.

This invention further provides a pasteurization unit for the pasteurization of products in containers in a flow of containers through successive sections at least for heating, pasteurizing and cooling by means of fluid covering them, or fluid being passed over them such as by trickling or spraying, with a pasteurizer housing and spray devices located inside it.

Thus, in the beverage industry, it is conventional to pasteurize beverages, especially when the beverages in question are highly perishable. In pasteurization plants of the prior art, the containers with the products are transported in an essentially uniform movement from the entrance area to the exit area. During this movement they are heated until they have absorbed the desired pasteurization units and are then cooled, which completes the pasteurization process. A pasteurization tunnel provided for this purpose therefore has a warming, or heating or heating-up, section, a superheating and pasteurization section and a final cooling section. The individual sections can in turn be further divided into sub-zones. The gradual heating and cooling such a system achieves is preferred, especially for the glass bottles used in the beverage industry, to prevent the destruction of the glass bottles as a result of abrupt changes in temperature. The transfer of heat to the product in the containers is normally achieved by spraying these containers with water as they move forward on a conveyor belt which allows the sprayed liquid to drain off underneath. Underneath the conveyor belt there are collection containers for the sprayed liquid from which the spray pumps are fed. The sprayed liquid can also be used to exchange heat between individual zones of the sections that require heating and those that require cooling.

To achieve an optimal graduation of the temperatures in the individual sections, these sections are in turn subdivided into smaller zones. Generally the "warming." section has three to four individual zones and the pasteurization section has two or three zones, whereby an additional superheating zone can be provided upstream of the pasteurization zone. The subsequent downstream "cooling" section in turn has three to four individual zones in which the containers are cooled to the desired exit temperature by gradually decreasing the temperature of the sprayed liquid.

The individual spray temperatures must be adapted as a function of the product, the length of the zones and the speed of the conveyor belt, to ensure that the product in the containers reaches the specified degree of pasteurization.

To spray the containers, there are a plurality of spray pipes that are located in the pasteurization housing at right angles to the transport direction and at some distance from one another with spray nozzles or spray openings and a liquid supply line located on the side. Spray pipes of this type are described in German Utility Model No. 29 716 644 U1, for example. German Utility Model No. 29 716 644 U1 and its corresponding U.S. Pat. No. 6,187,097, issued to Klenk on Feb. 13, 2001 and entitled, "Device for spraying liquids onto containers," are hereby incorporated by reference as if set forth in their entirety herein. Spray pipes of this type must be cleaned at regular intervals to ensure uniform spraying. Depending on the location and arrangement of such spray pipes, the spray nozzles that are located in the middle of a unit are barely visible, so that it is frequently necessary to completely remove the spray pipes to inspect them.

OBJECT OF THE INVENTION

One object of the present invention may be to propose a method for the operation of such a bottling plant in which the response to disruptions in the container flow can be managed in an essentially optimum fashion with an essentially minimized utilization of the resources water and heat.

Another object comprises to propose a pasteurization plant that minimizes the time, effort and expense of cleaning while making possible the easy inspection and cleaning of such spraying devices.

SUMMARY OF THE INVENTION

The invention teaches a bottling plant for bottling beverages, said bottling plant comprising: a bottle rinsing section for rinsing bottles; a bottle filling section to receive bottles for filling; a bottle capping section for capping bottles; a product stabilizing section for stabilizing the content of the bottles; said product stabilizing section comprising: a plurality of spray arrangements, each of said plurality of spray arrangements being configured and disposed to spray liquid over at least one bottle; a plurality of tank arrangements configured to receive liquid from said plurality of tanks and to supply liquid to said plurality of tanks; an arrangement interconnecting said plurality of spray arrangements, said plurality of tanks, and said plurality of tank arrangements among one another to adjust characteristics and flow of liquid circulating in said product stabilizing section in response to interruptions of movement of bottles in said product stabilizing section; a housing; said housing comprising a roof, an inlet for the containers, and an outlet for the containers; said roof of said housing comprising in combination the roof for said housing and said plurality of spray arrangements; a first portion configured to heat the product in containers by a first heated spray of liquid, said first spray of liquid comprising a predetermined first temperature to bring the product in containers to a temperature below the pasteurization temperature; a second portion configured to pasteurize the product in containers by a second spray of liquid, said second spray of liquid comprising a predetermined second temperature to impart to the product in containers a predetermined unit of pasteurization; a third portion configured to cool the product in containers by a third spray of liquid, said third spray of liquid comprising a temperature to bring the product in containers to a temperature below said first temperature; said second portion succeeding said first portion; said third portion succeeding said second portion; and apparatus to move the containers in succession from said inlet to said outlet in a flow of containers through the successive portions, at least for heating, pasteurizing and cooling by way of respective sprays of fluid which sprays cover them with respective sprays of liquid.

The invention teaches that the roof of the pasteurization unit is realized in the form of a sprayer roof, and thereby forms the roof and the spraying devices simultaneously.

In other words, the invention teaches that the roof of the pasteurization unit is realized in the form of a sprayer roof, or cover and thereby forms the roof or cover and the spraying devices simultaneously or in combination thereof.

The invention also teaches an independent realization in which the roof is realized in the form of shaped spray channels that are located next to one another.

The dependent claims teach additional characteristics of the invention.

The configuration claimed by the invention makes possible an easy and reliable inspection and verification of the effectiveness and contamination of such spray nozzles or spray openings. Simply by opening the upper part, the entire spray tank becomes immediately visible and can be cleaned directly using simple means. That makes it possible to do without, among other things, the conventional roof construction, so that in addition to the above-mentioned advantages, the construction can be significantly lighter in weight and more economical.

Embodiments of the present invention discussed herein will be described further herein with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to at least one exemplary embodiment, which is illustrated in the accompanying drawings as follows.

DESCRIPTION OF THE PREFERRED EMBODIMENT

Figure 1:
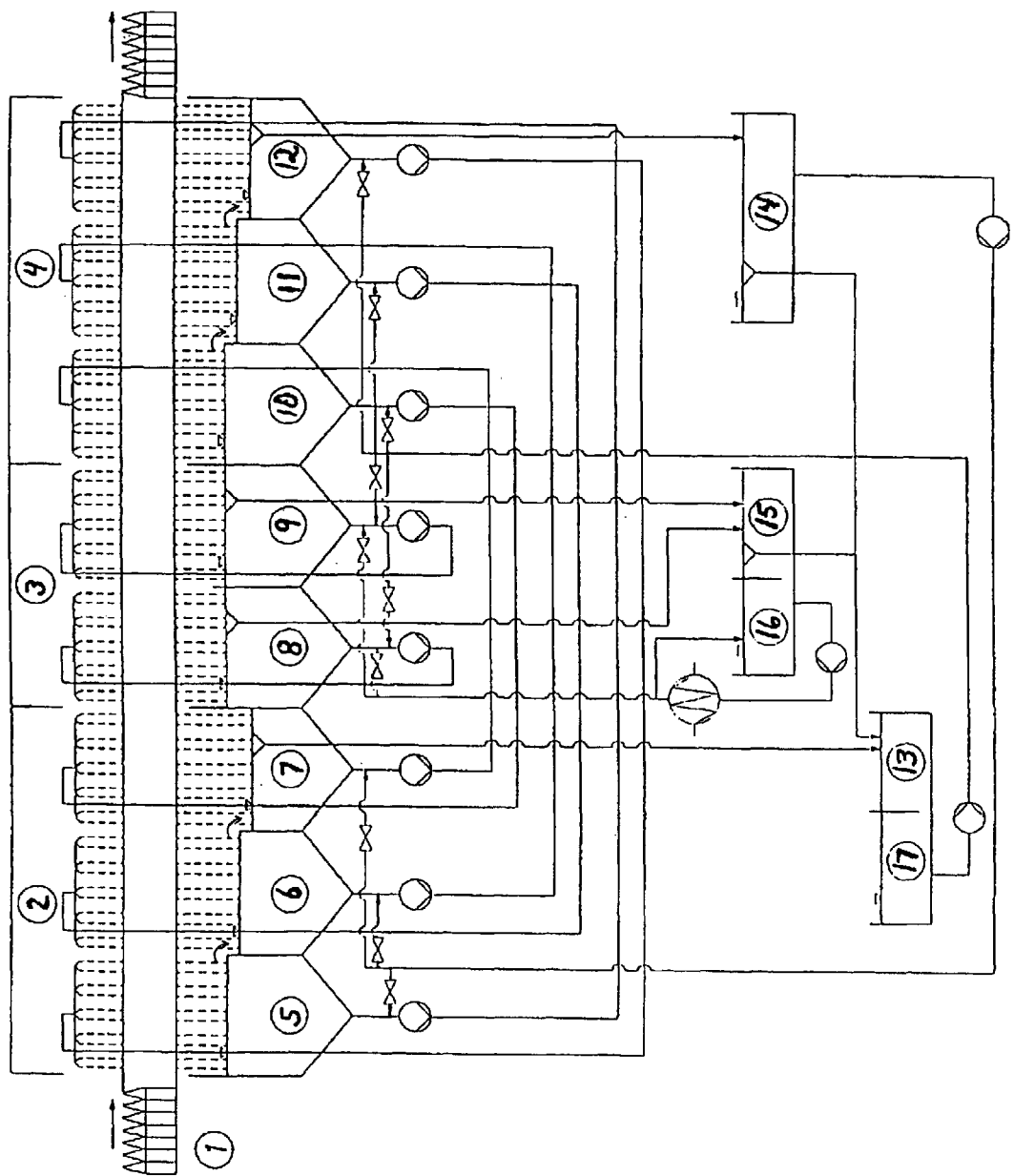
FIG. 1 is a diagram of a heat stabilizing system.
Figure 1A:
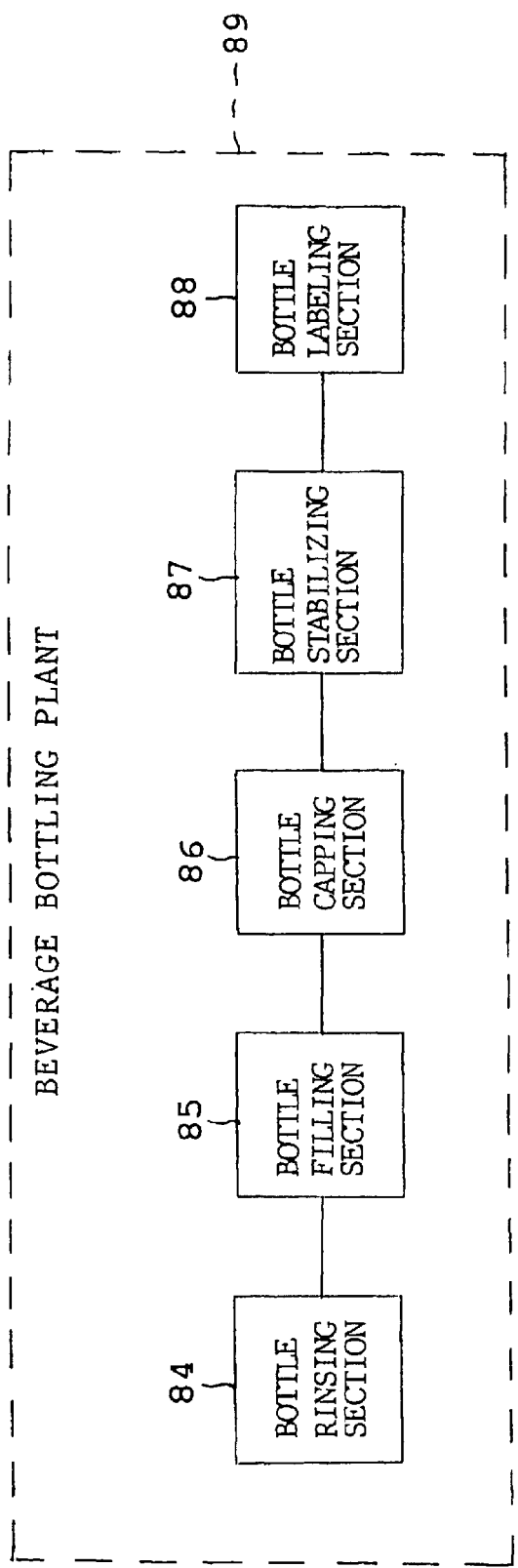
FIG. 1A is a block diagram of a beverage bottling plant and its sections.

FIG. 1A is a block diagram of a beverage bottling plant 89 and the sections 84-88 of this plant 89. Bottles or other containers move through the bottling plant 89 in the following order: bottle rinsing section 84; bottle filling section 85; bottle capping section 86; bottle stabilizing section 87; and bottle labeling section 88. In other words, the bottle stabilizing section 87 may be a heat stabilizing section.

As shown in FIGS. 1, 2, 2A, and 19, the bottling or pasteurizing plant consists of a heating section 2 located in the initial portion, determined on the basis of the direction of travel of the respective container or respective bottle or flow of containers or bottles 1, which heating section in turn consists of a plurality of individual zones or tanks 5–7, whereby the heating phase is correspondingly essentially gentle and gradual. As shown in FIGS. 1, 2, 2B, and 19, following this heating section 2 is a superheating zone 8, which is followed in turn by the actual pasteurizing zone or pasteurizing zone or tank 9. Then, as shown in FIGS. 1, 2, 2C, and 19, the cooling section 4 begins which, as with the other sections, can consist of a larger number of individual zones or tanks 10–12.

The operating program of such a pasteurizing plant is initially designed to conduct the pasteurizing operation under essentially optimum conditions. For example, the invention teaches that the first heating zone 5 has a spray temperature of approximately 18 degrees Celsius, for example. The initial temperature of the pasteurized products is accordingly set at a spray temperature of approximately 17 degrees Celsius. The second heating zone 6 has a spray temperature of slightly greater than 24 degrees Celsius, whereby the cooling zone that communicates with it can be at a temperature of somewhat less than 23 degrees Celsius. Using the example of these two zones 5, 6, it is apparent that the water from the cooling zones 4 is conducted respectively to the zone 5 in the heating section 2, the desired heating temperature of which comes closest to the desired cooling temperature. To equalize the respective temperature difference, water from the first tank 13, shown in FIGS. 1, 2, 2D, and 19, is essentially advantageously added in small amounts to the water from the cooling section 4, which additional higher-temperature water or other liquid originates from the final station 7 of the heating section 2. Following this heating section 2 is the superheating zone 8, the temperature of which is in turn higher than the temperature of the final heating zone 7. The superheating zone 8 is fed from a second tank 15, shown in FIGS. 1, 2, 2E, and 19, with water or other liquid at a higher temperature than the water in the first tank 13. Associated with the tank 15 is a third tank 16, as shown in FIGS. 1, 2, 2E, and 19, to which the excess water or other liquid from the tank 15 is fed. This tank 16 is also maintained at a specified higher temperature than the water in the tank 13 by means of a heater device or heat exchanger 57, shown in FIGS. 1, 2, 2E, and 19. The water or other liquid in tank 16 is also used to feed the superheating and pasteurizing zones 8, 9, whereby the quantity of hot water or other liquid discharged is collected in the tank 15 and is mixed with the hot water of the tank 16.

Figure 2:
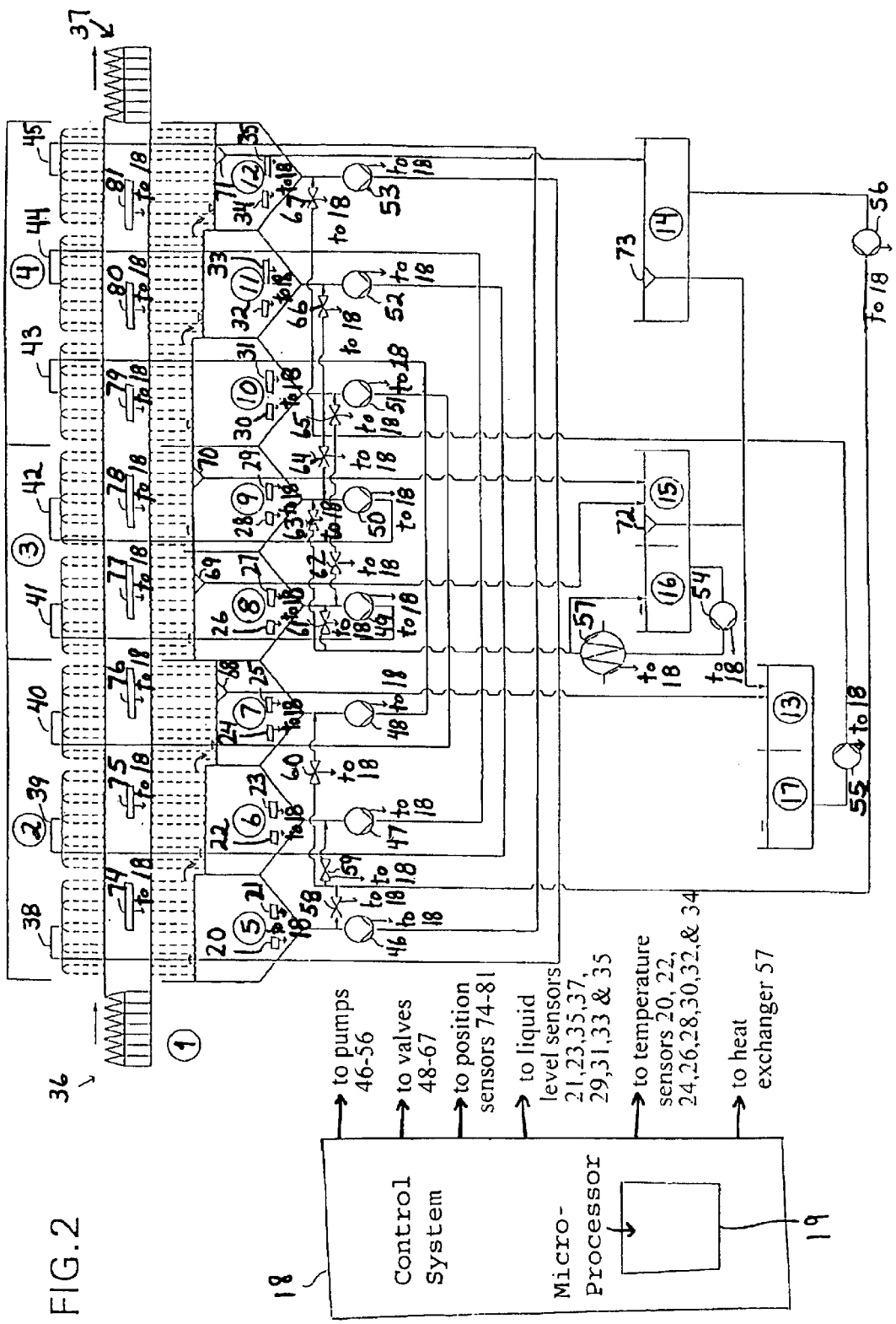
FIG. 2 is an enlarged reproduction of FIG. 1 with additional information.
Figure 2A:
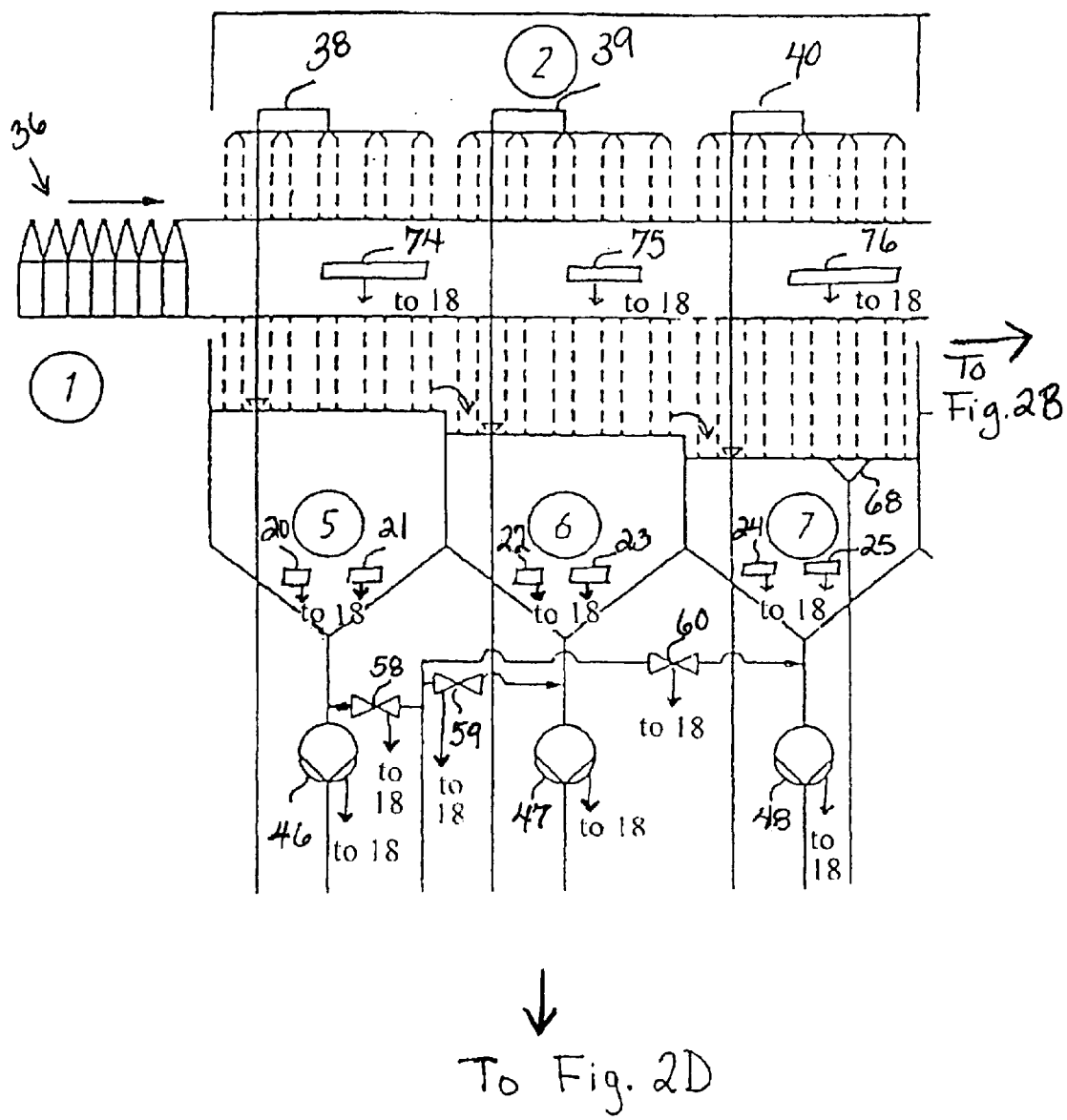
FIGS. 2A, 2B, 2C, 2D, 2E, and 2F are enlarged views of sections of FIG. 2.
Figure 2B:
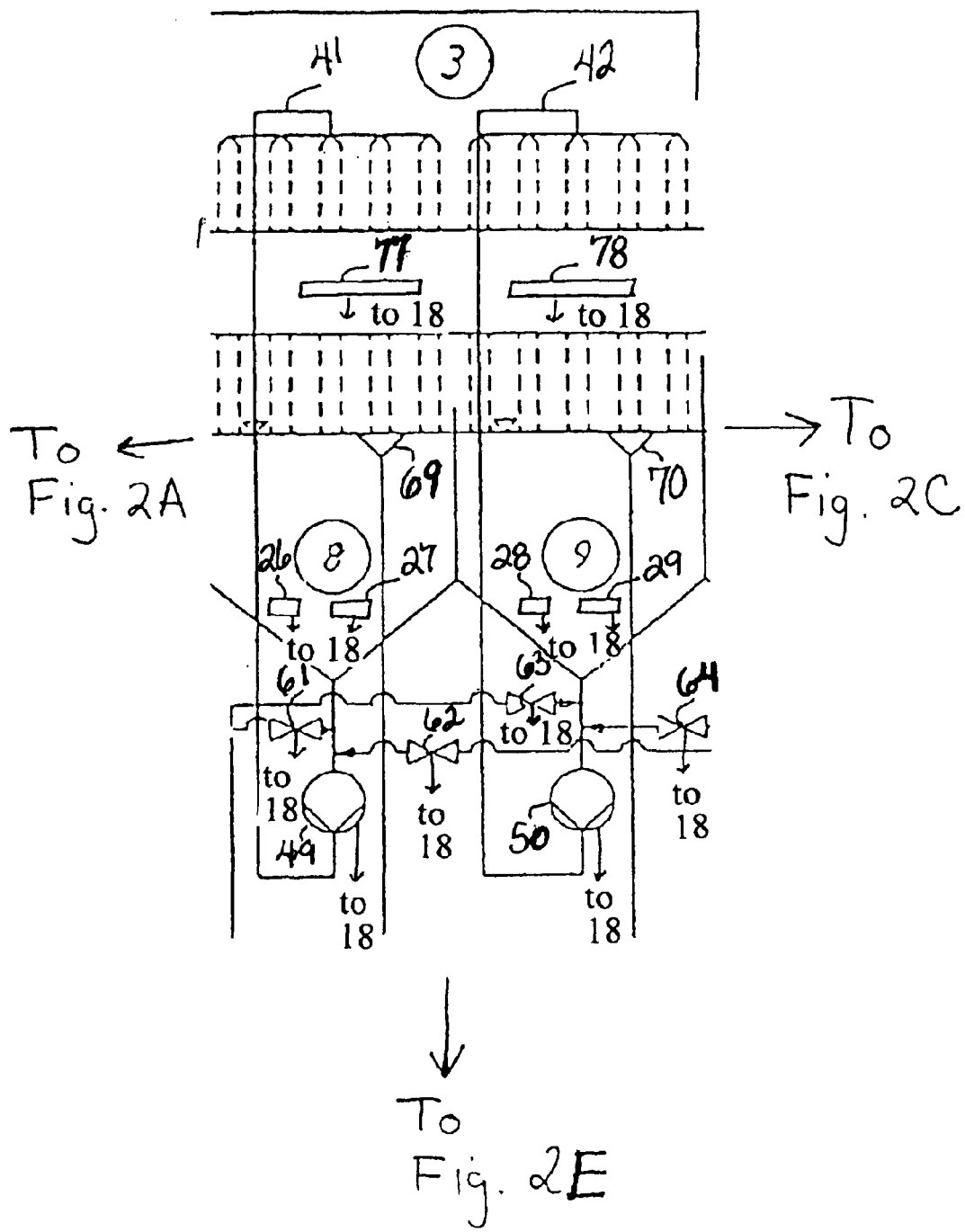
Figure 2C:
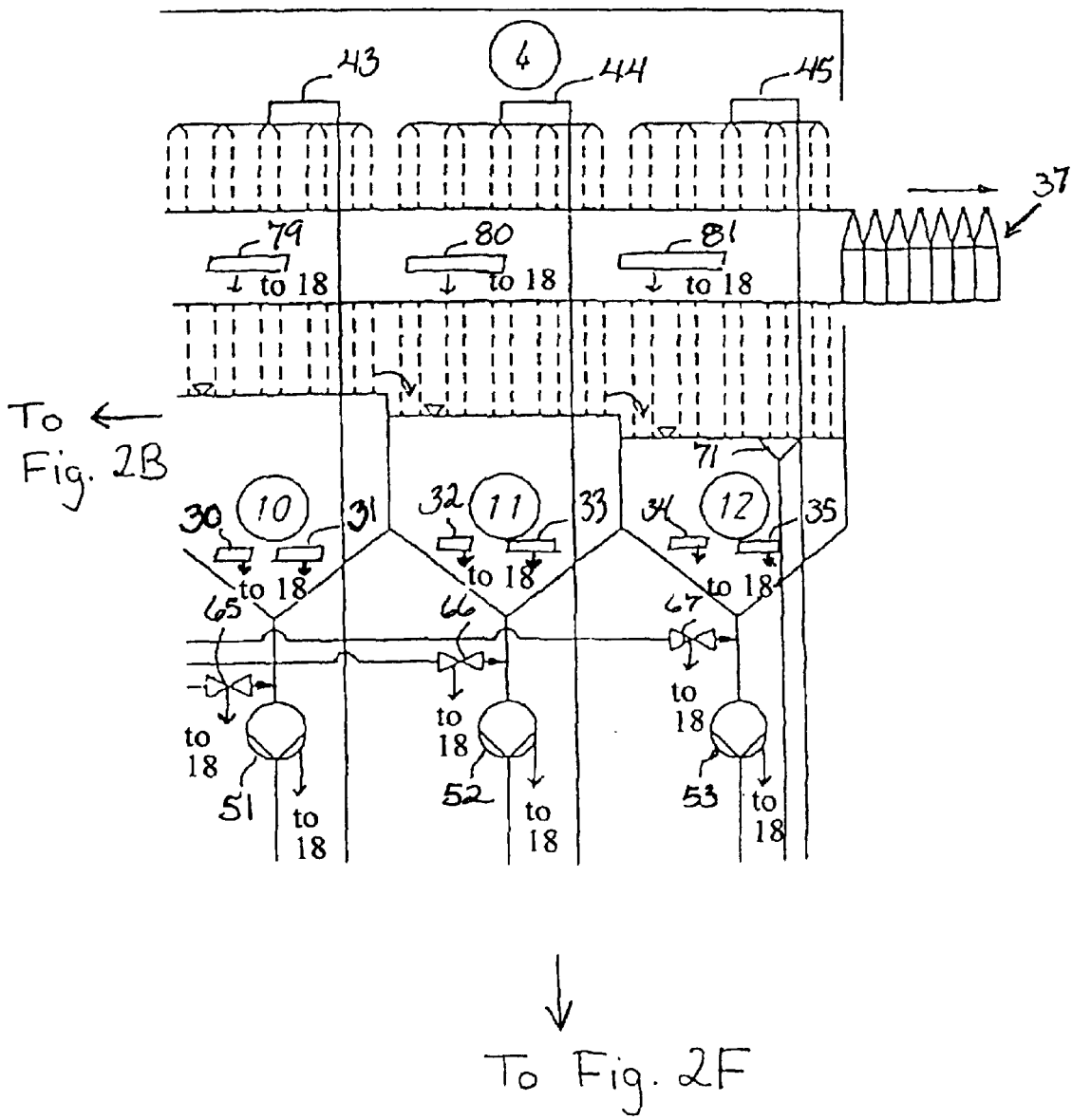
Figure 2D:
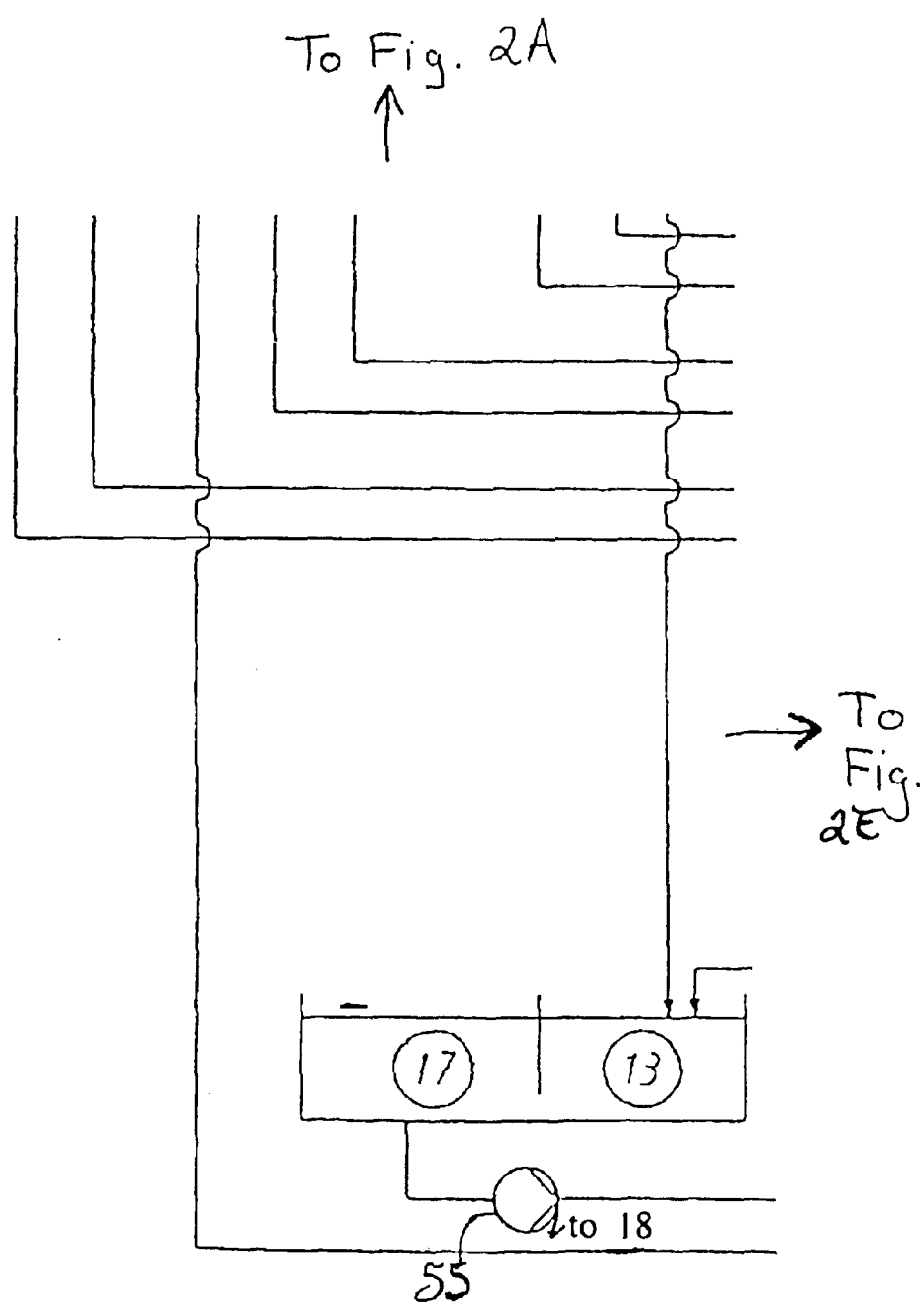
Figure 2E:
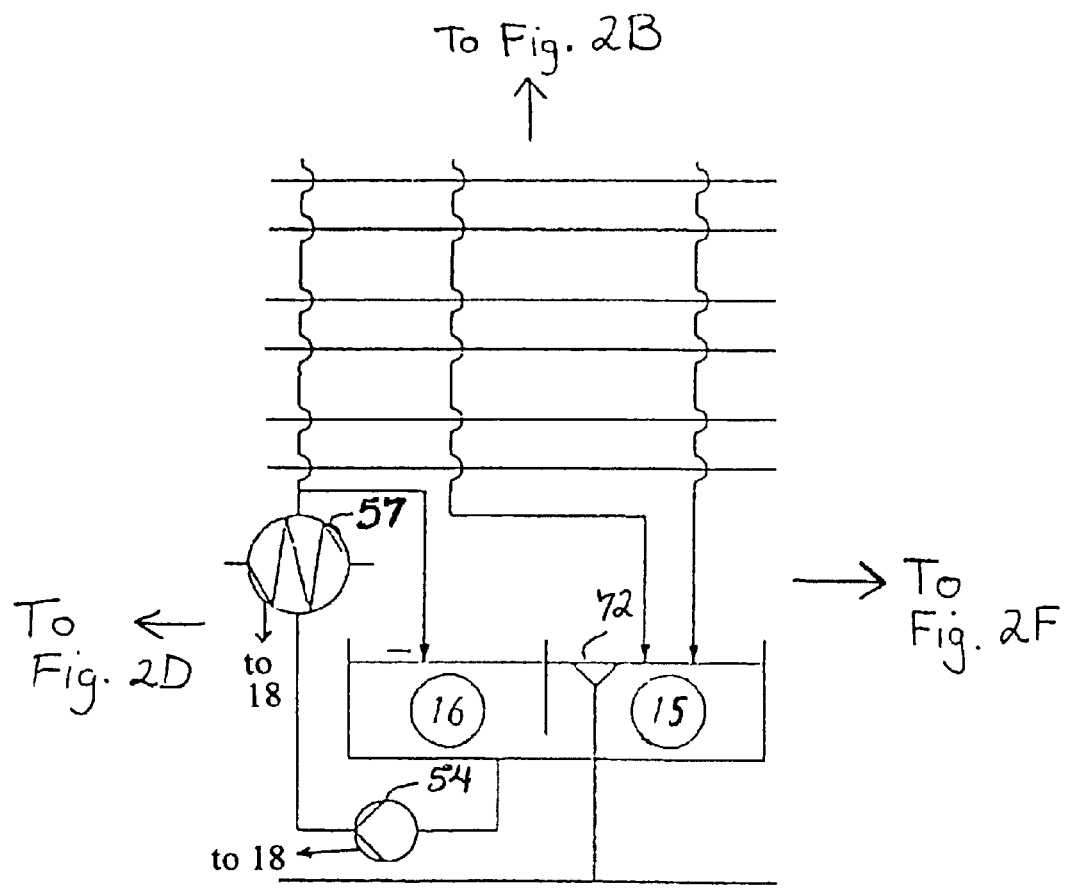
Figure 2F:
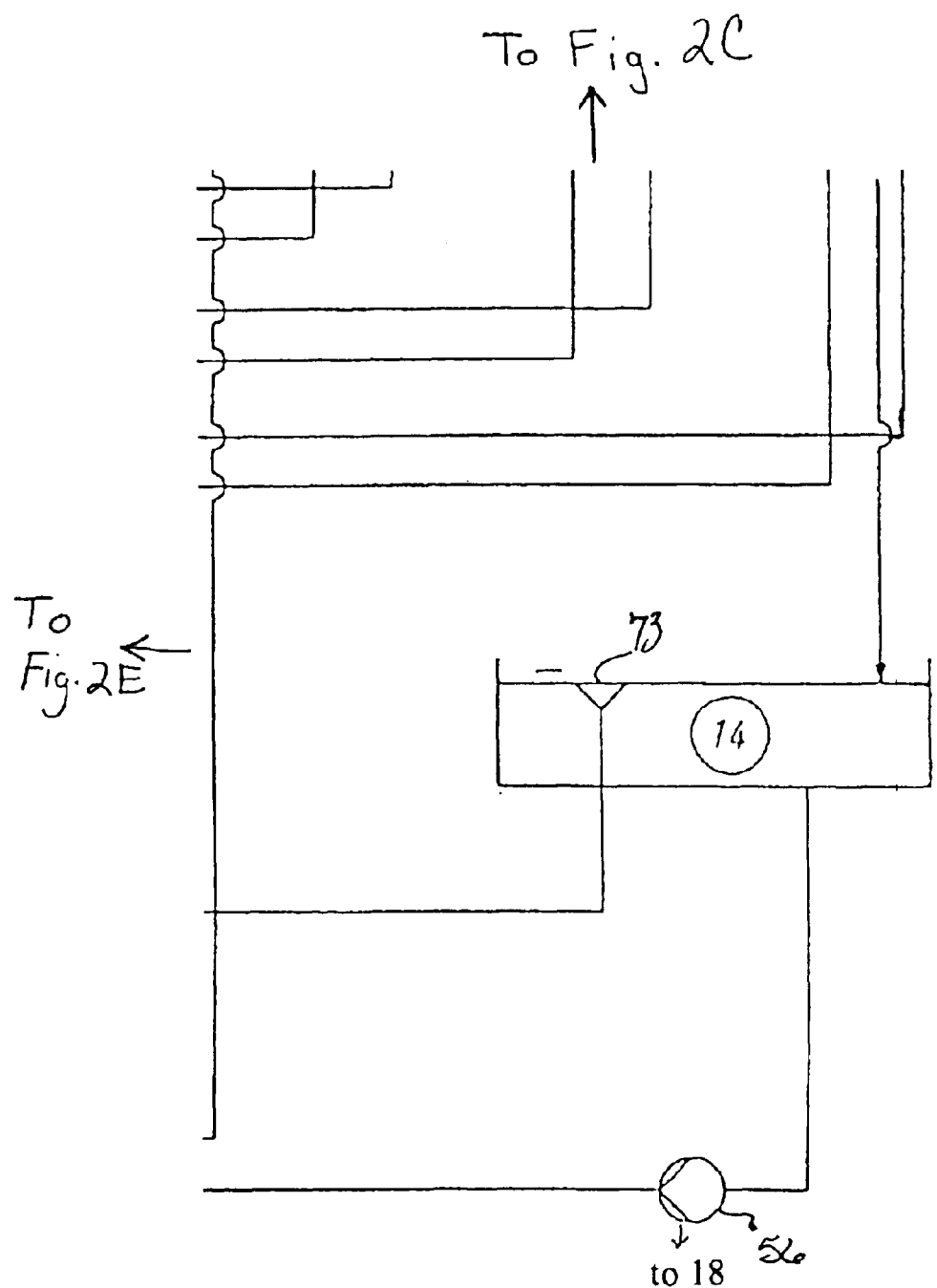
Figure 2G:
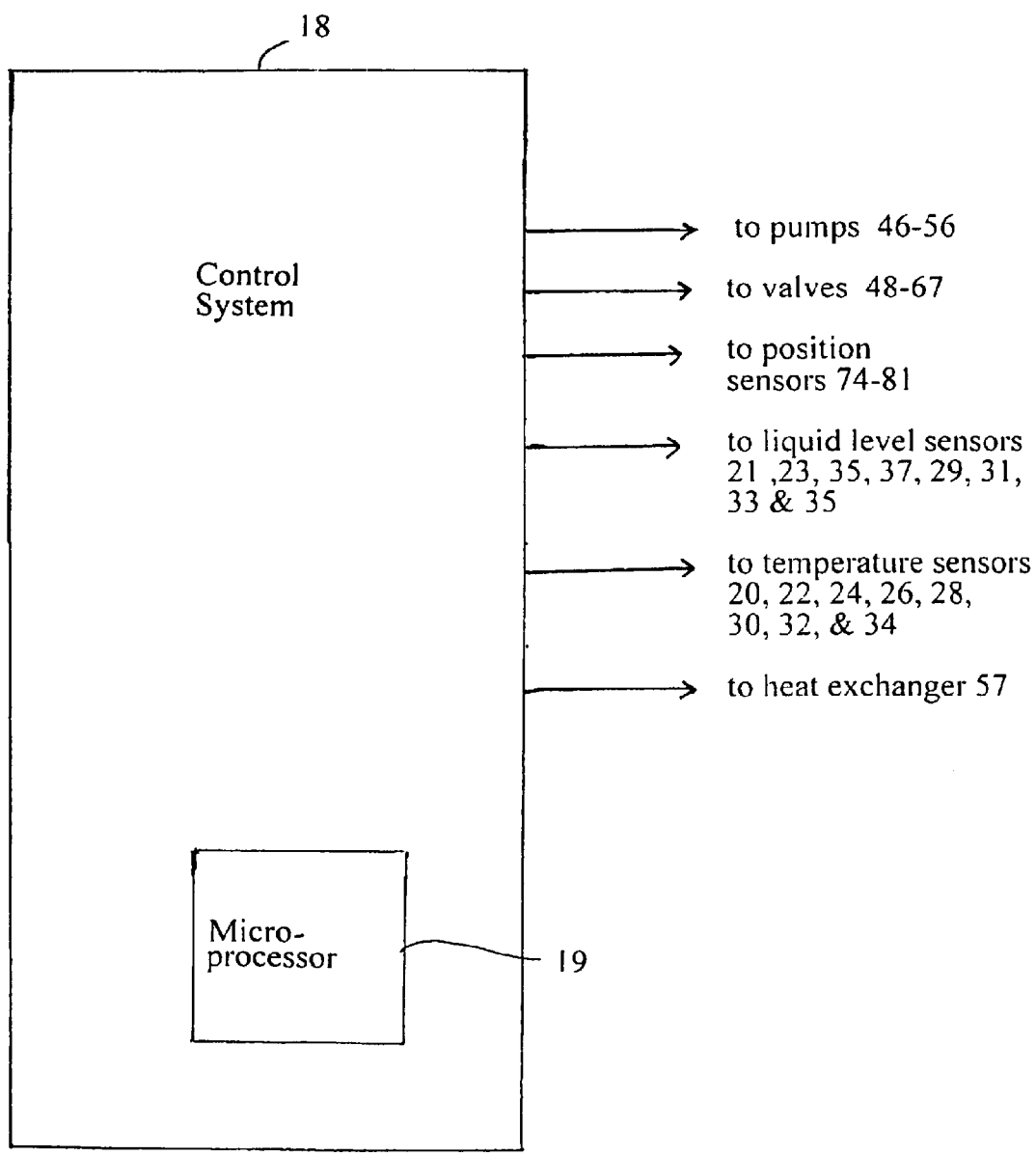
FIG. 2G is an enlarged view of the control system and microprocessor shown in FIG. 2.

In the event of a disruption in production, e.g., a disruption caused by a backup of containers in the bottling plant, a control device or system 18, which control system 18 is shown in FIGS. 1, 2, and 2G, essentially immediately actuates certain of the valves 58–67, which valves 58–67 are shown in FIG. 2, so that, for example, the lower-temperature water from the tank 16 is fed to the superheating and/or pasteurizing zones 8, 9. Lower-temperature water can also be fed to the other sections 2, 4, for example, from an additional fourth tank 14, shown in FIGS. 1, 2, 2F, and 19.

In other words, in at least one possible embodiment of the present invention as shown in FIG. 2, the tanks 5–12, before the pasteurization system is activated, are filled with liquid to a predetermined level regulated by liquid level sensors 21 (for tank 5), 23 (for tank 6), 25 (for tank 7), 27 (for tank 8), 29 (for tank 9), 31 (for tank 10), 33 (for tank 11), and 35 (for tank 12), which liquid level sensors 21, 23, 25, 27, 29, 31, 33, and 35 are shown in FIGS. 1, 2, 2A–2F, and 19. The liquid level sensors 21, 23, 25, 27, 29, 31, 33, and 35 may be located in, or generally at or about, one or more of the tanks 5–12 and are controlled by a control system 18, which control system 18 is preferably controlled by a microprocessor 19, shown in FIGS. 1, 2, and 2G.

The tanks 5–12, before the pasteurization system is activated, are filled with liquid having a predetermined spray temperature regulated by temperature sensors 20 (for tank 5), 22 (for tank 6), 24 (for tank 7), 26 (for tank 8), 28 (for tank 9), 30 (for tank 10), 32 (for tank 11), and 34 (for tank 12), which temperature sensors 20, 22, 24, 26, 28, 30, 32, and 34 are shown in FIGS. 1, 2, 2A–2F, and 19. The tanks 5–12 preferably have heaters to heat the liquid therein to a desired temperature. The spray temperature sensors 20, 22, 24, 26, 28, 30, 32, and 34 may be located in, or generally at or about, one or more of the tanks 5–12 and are controlled by a control system 18, which control system 18 is preferably controlled by a microprocessor 19.

In other words, there are three zones or sections 2–4 in the pasteurization system: the heating section 2, the pasteurization section 3, and the cooling section 4. In the sections 2–4 there are tanks 5–12, which provide liquid to be sprayed over the containers 36. Specifically, tanks 5–7 provide liquid for heating section 2; tanks 8–9 provide liquid for the pasteurization section 3; and tanks 10–12 provide liquid for the cooling section 4. The tanks 5–12 vary among themselves in the temperature of their liquid contents as follows.

In heating section 2, the liquid in tanks 5–7 increase in temperature from tank 5 to tank 7, so that tank 5 and tank 6 contain and spray lower-temperature liquid than does tank 7. In the pasteurizing section 3, tank 8 is the superheating tank, containing and spraying higher-temperature liquid than does the pasteurization tank 9. In the cooling section 4, the liquid contained in and sprayed by tanks 10–12 decrease in temperature from tank 10 to tank 12, so that the temperature of the liquid in tank 10 is higher than the temperature in tank 11, and the temperature of the liquid in tank 11 is higher than the temperature in tank 12.

In another possible embodiment of the present invention, the superheating tank 8 may contain and spray lower-temperature liquid than does the pasteurization tank 9.

Alternatively, in the cooling section 4, the liquid contained in and sprayed by tanks 10–12 increases in temperature from tank 10 to tank 12, so that the temperature of the liquid in tank 10 is lower than the temperature in tank 11, and the temperature of the liquid in tank 11 is lower than the temperature in tank 12.

When containers 36, as shown in FIG. 2, are put on a conveyor belt (not shown) or on some other similar apparatus to enter the pasteurization system or begin the pasteurization process, if there are no stoppages, backups, or disruptions in the system or process or in the movement of the containers 36, shown in FIGS. 1, 2, 2A, and 19, the containers 36 will be moved from the heating section 2, then to the pasteurizing section 3, and then to the cooling section 4. In other words, the containers 36 will be sprayed by liquid provided by the tanks 5–12 in the following order: zone 5, zone 6, zone 7, zone 8, zone 9, zone 10, zone 11, and zone 12. As shown in FIG. 2, this movement of the containers 36 through the sections 2–4 of the pasteurization system will produce pasteurized products 37, shown in FIGS. 1, 2, 2C, and 19.

If there are no stoppages, backups, or disruptions in the system of process or in the movement of the containers 36, the containers 36 move or are moved through the sections 2–4 in a time period within the range of approximately 15 minutes to approximately 20 minutes. In another possible embodiment of the present invention, the containers 36 move or are moved through the sections 2–4 in a time period within the range of approximately 15 minutes to approximately 30 minutes. In yet another possible embodiment of the present invention, the containers 36 move or are moved through the sections 2–4 in a time period within the range of approximately 10 minutes to approximately 45 minutes.

In at least one possible embodiment of the present invention as shown in FIG. 2, spray arrangements or sprayers 38–45 are associated with each of the tanks 5–12 as follows. Spray arrangement 38 is associated with tank 5. Spray arrangement 39 is associated with tank 6. Spray arrangement 40 is associated with tank 7. Spray arrangement 41 is associated with tank 8. Spray arrangement 42 is associated with tank 9. Spray arrangement 43 is associated with tank 10. Spray arrangement 44 is associated with tank 11. Spray arrangement 45 is associated with tank 12. Spray arrangements 38–45 may be located generally at, about, or above their respective tanks 5–12.

In the possible embodiment of the present invention shown in FIG. 2, the spray arrangements 38–45 are supplied with liquid by the tanks 5–12, for example, as follows. Spray arrangement 38 is supplied with liquid by tank 12. Spray arrangement 39 is supplied with liquid by tank 11. Spray arrangement 40 is supplied with liquid by tank 10. Spray arrangement 41 is supplied with liquid by tank 8. Spray arrangement 42 is supplied with liquid by tank 9. Spray arrangement 43 is supplied with liquid by tank 7. Spray arrangement 44 is supplied with liquid by tank 6. Spray arrangement 45 is supplied with liquid by tank 5.

The tanks 7, 8, 9, and 12 supply the tanks 13, 14, and 15 with liquid as follows. Tank 7 supplies tank 13. Tank 8 and tank 9 supply tank 15. Tank 12 supplies tank 14.

Tanks 14, 15, and 16 are supplied with liquid as follows. Tank 13 supplies tank 14. Tank 13 also supplies tank 17 and vice versa. Tank 15 supplies tank 16 and vice versa.

Pumps 46–53, shown in FIG. 2, pump liquid to the spray arrangements 38–45 as follows. Pump 46 pumps liquid to spray arrangement 45. Pump 47 pumps liquid to spray arrangement 44. Pump 48 pumps liquid to spray arrangement 43. Pump 49 pumps liquid to spray arrangement 41. Pump 50 pumps liquid to spray arrangement 42. Pump 51 pumps liquid to spray arrangement 40. Pump 52 pumps liquid to spray arrangement 39. Pump 53 pumps liquid to spray arrangement 38.

Pumps 54–56 pump liquid to tanks 9, 12, and 7 as follows. Pump 54 pumps liquid to tank 9. Pump 55 pumps liquid to tank 12. Pump 56 pumps liquid to tank 7.

Valves 58–67 partly regulate the flow of liquid to pumps 46–53 as follows. Valve 58 allows release of liquid into pump 46. Valve 59 allows release of liquid into pump 47. Valve 60 allows release of liquid into pump 48. Valve 61 allows release of liquid into pump 49. Valve 62 allows release of liquid into pump 49. Valve 63 allows release of liquid into pump 50. Valve 64 allows release of liquid into pump 50. Valve 65 allows release of liquid into pump 51. Valve 66 allows release of liquid into pump 52. Valve 67 allows release of liquid into pump 53.

A heat exchanger 57 regulates the temperature of the liquid passing to tank 16. The heat exchanger 57 is controlled by the control system 18.

Overflow of liquid occurs as follows. Liquid overflows from tank 5 into tank 6, which is lower than tank 5. Liquid overflows from tank 6 into tank 7, which is lower than tank 6. Liquid overflows from tank 7 into tank 13 via an overflow device 68, shown in FIG. 2, which overflow device 68 is located generally on, in, at, or about tank 7. Liquid overflows from tank 8 into tank 15 via an overflow device 69, shown in FIG. 2, which overflow device 69 is located generally on, in, at, or about tank 8. Liquid overflows from tank 9 into tank 15 via an overflow device 70, shown in FIG. 2, which overflow device 70 is located generally on, in, at, or about tank 9. Liquid overflows from tank 10 into tank 11, which is lower than tank 10. Liquid overflows from tank 11 into tank 12, which is lower than tank 11. Liquid flows from tank 12 into tank 14 via an overflow device 71, shown in FIG. 2, which overflow device 71 is located generally on, in, at, or about tank 12. Liquid overflows from tank 15 to tank 13 via an overflow device 72, shown in FIG. 2, which overflow device 72 is located generally on, in, at, or about tank 15. Liquid overflows from tank 14 to tank 13 via an overflow device 73, shown in FIG. 2, which overflow device 73 is located generally on, in, at, or about tank 14.

If there is stoppage, breakage, or another interruption in the continuous container flow 1, tanks 13–17 preferably supply liquid to pumps 46–56, valves 58–67, and spray arrangements 38–45 through at least one of the following pathways. Tank 17 supplies liquid to pump 55; pump 55 pumps liquid to valve 67; valve 67 releases liquid into pump 53; and pump 53 supplies liquid to spray arrangement 38. Tank 17 supplies liquid to pump 55; pump 55 pumps liquid to valve 66; valve 66 releases liquid into pump 52; and pump 52 supplies liquid to spray arrangement 39. Tank 17 supplies liquid to pump 55; pump 55 pumps liquid to valve 65; valve 65 releases liquid into pump 51; and pump 51 supplies liquid to spray arrangement 40. Tank 17 supplies liquid to pump 55; pump 55 pumps liquid to valve 64; valve 64 releases liquid into pump 50; and pump 50 supplies liquid to spray arrangement 42. Tank 16 supplies liquid to pump 54; pump 54 pumps liquid to valve 63; valve 63 releases liquid into pump 50; and pump 50 supplies liquid to spray arrangement 42. Tank 17 supplies liquid to pump 55; pump 55 pumps liquid to valve 62; valve 62 releases liquid into pump 49; and pump 49 supplies liquid to spray arrangement 41. Tank 16 supplies liquid to pump 54; pump 54 pumps liquid to valve 61; valve 61 releases liquid into pump 49; and pump 49 supplies liquid to spray arrangement 41. Tank 14 supplies liquid to pump 56; pump 56 pumps liquid to valve 60; valve 60 releases liquid into pump 48; and pump 48 supplies liquid to spray arrangement 43. Tank 14 supplies liquid to pump 56; pump 56 pumps liquid to valve 59; valve 59 releases liquid into pump 47; and pump 47 supplies liquid to spray arrangement 44. Tank 14 supplies liquid to pump 56; pump 56 pumps liquid to valve 58; valve 58 releases liquid into pump 46; and pump 46 supplies liquid to spray arrangement 45.

The conveyor belt (not shown) or other apparatus for moving the containers 36 has position, proximity, or movement sensors 74–81 for detecting the presence of containers 36 as follows. Position sensor 74 is associated with tank 5 and spray arrangement 38. Position sensor 75 is associated with tank 6 and spray arrangement 39. Position sensor 76 is associated with tank 7 and spray arrangement 40. Position sensor 77 is associated with tank 8 and spray arrangement 41. Position sensor 78 is associated with tank 9 and spray arrangement 42. Position sensor 79 is associated with tank 10 and spray arrangement 43. Position sensor 80 is associated with tank 11 and spray arrangement 44. Position sensor 81 is associated with tank 12 and spray arrangement 45. Position sensors 74–81 may be located generally on, in, at, or about the conveyor belt or other apparatus for moving the containers 36 and 37. Alternatively, position sensors 74–81 may be located generally on, at, or about the tanks 5–12.

The control system 18, as shown in FIGS. 2 and 2G, is connected to and controls pumps 46–56; valves 58–67; position sensors 74–81; liquid level sensors 21, 23, 25, 27, 29, 31, 33, and 35; temperature sensors 20, 22, 24, 26, 28, 30, 32, and 34; and heat exchanger 57. As shown in FIGS. 2 and 2G, the control system 18 is preferably operated by means of a microprocessor 19.

FIGS. 3–18 are flow charts illustrating possible operation of the pasteurization system. FIGS. 3–8 illustrate possible embodiments of the present invention in which there is an interruption or stoppage in the flow of containers or bottles. FIGS. 9–14 are flow charts illustrating startup of the pasteurization system in at least one possible embodiments of the present invention. For example, FIGS. 9–14 present possible decision trees for spraying the first flow of bottles or containers that passes through the pasteurization system after this system has been turned on or activated. FIGS. 15–18 illustrate emptying each of the heating zone 2, the pasteurization zone 3, and the cooling zone 4 of bottles until there are no bottles sensed by any of the position sensors 74–81. In other words, FIGS. 15–18 preferably illustrate at least one possible embodiment of the present invention in which the pasteurization system is shut down.

Figure 3:
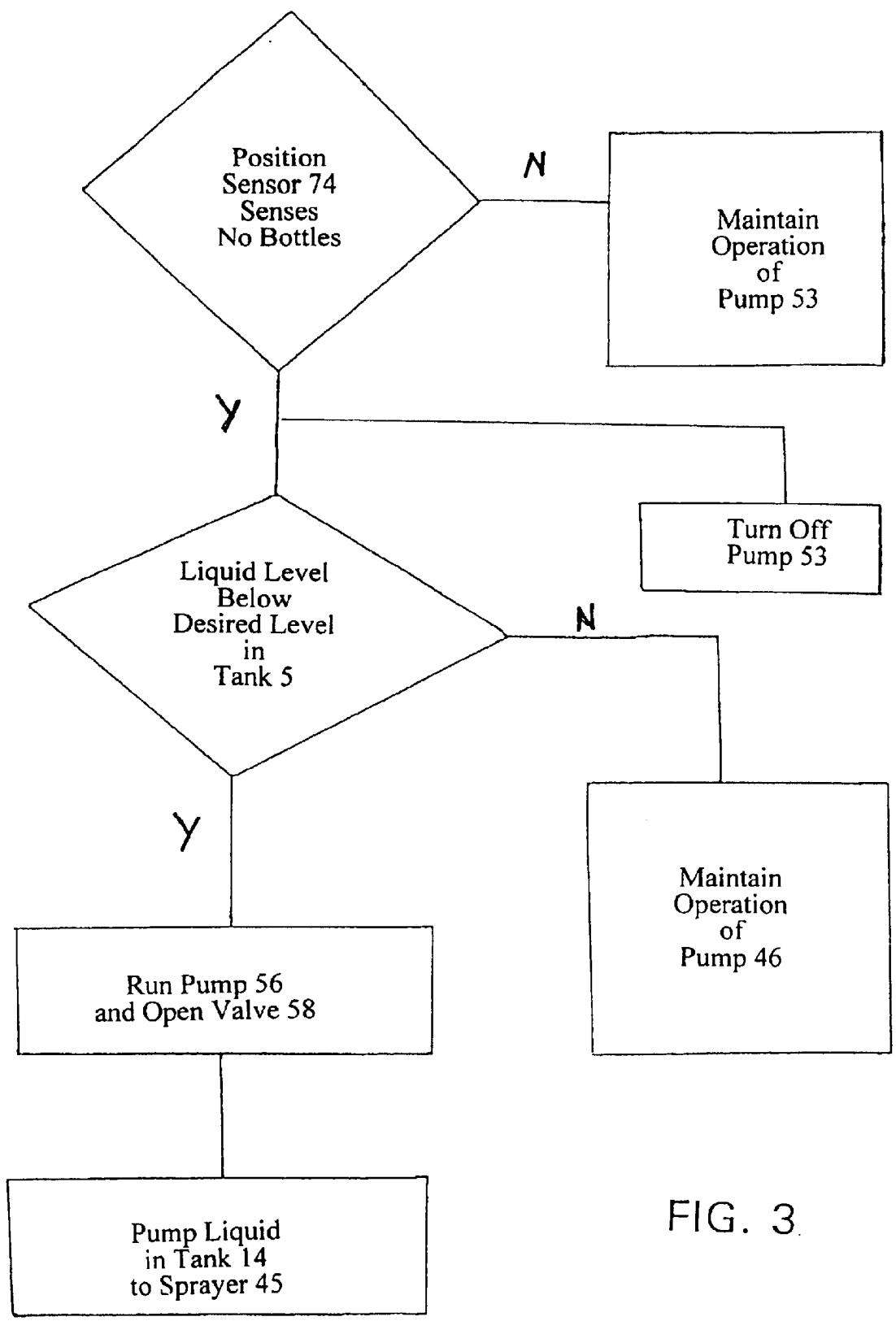
FIGS. 3–18 are flow charts for the operation of the heat stabilizing system shown in FIGS. 2 and 2A to 2G.

In FIG. 3, if position sensor 74 senses bottles or containers, the operation of pump 53 is maintained. If position sensor 74 senses no bottles, pump 53 is turned off and a determination is made whether the liquid level in tank 5 is below the desired liquid level in tank 5. If the liquid level in tank 5 is not below the desired liquid level in tank 5, the operation of pump 46 is maintained. If the liquid level in tank 5 is below the desired liquid level in tank 5, pump 56 is run and valve 58 is opened so that liquid in tank 14 may be pumped to sprayer 45.

Figure 4:
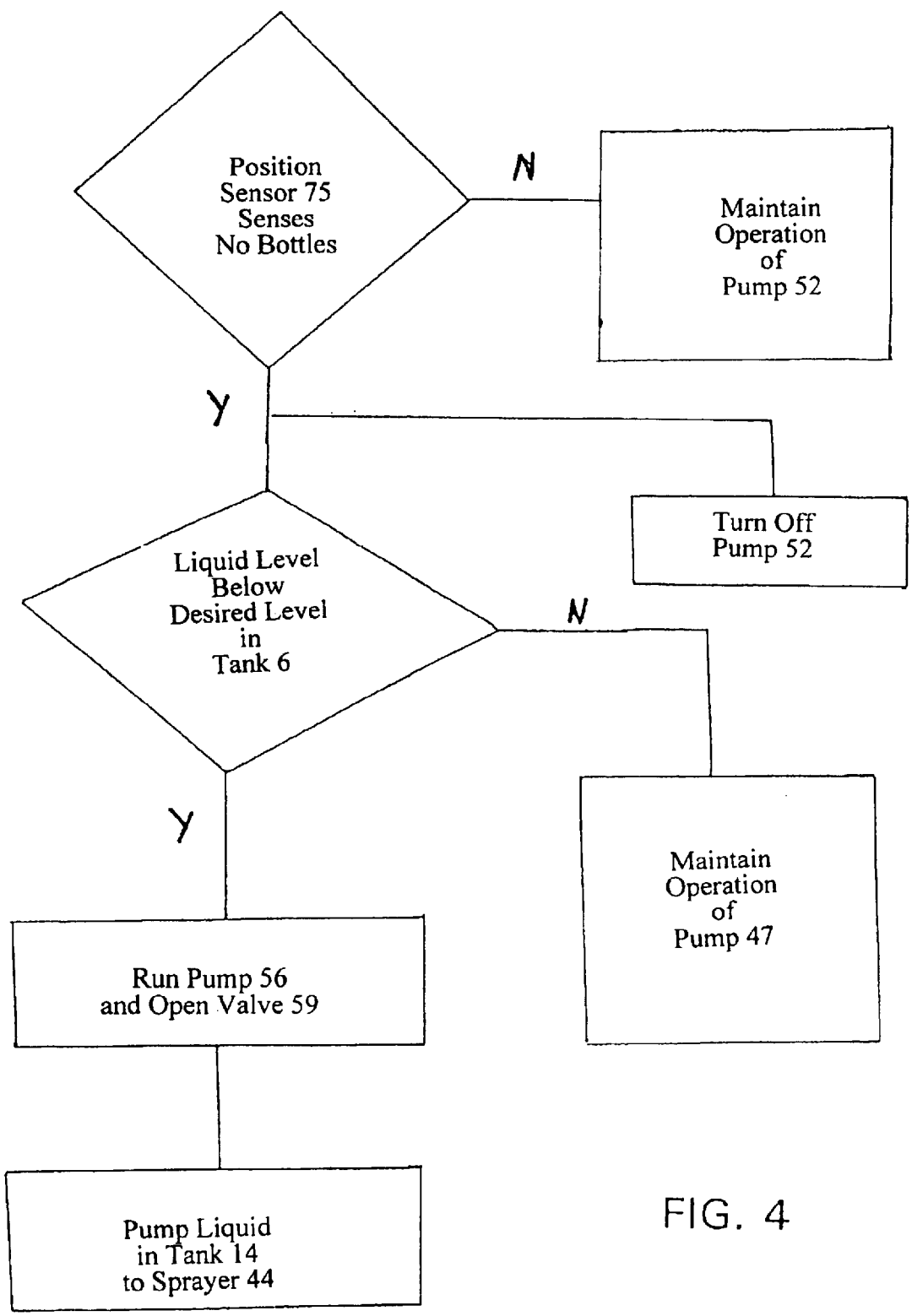

In FIG. 4, if position sensor 75 senses bottles or containers, the operation of pump 52 is maintained. If position sensor 75 senses no bottles, pump 52 is turned off and a determination is made whether the liquid level in tank 6 is below the desired liquid level in tank 6. If the liquid level in tank 6 is not below the desired liquid level in tank 6, the operation of pump 47 is maintained. If the liquid level in tank 6 is below the desired liquid level in tank 6, pump 56 is run and valve 59 is opened so that liquid in tank 14 may be pumped to sprayer 44.

Figure 5:
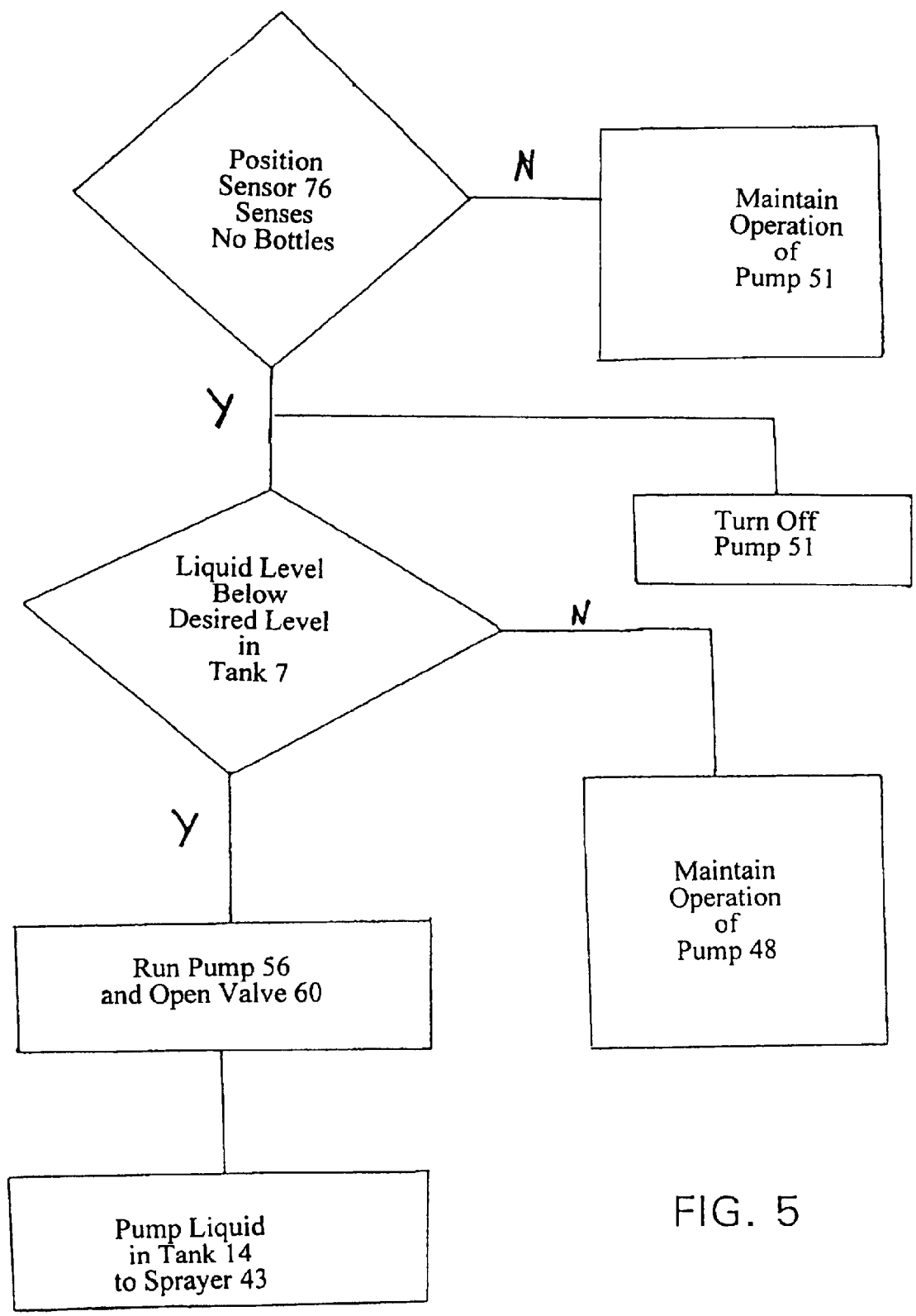

In FIG. 5, if position sensor 76 senses bottles or containers, the operation of pump 51 is maintained. If position sensor 76 senses no bottles, pump 51 is turned off and a determination is made whether the liquid level in tank 7 is below the desired liquid level in tank 7. If the liquid level in tank 7 is not below the desired liquid level in tank 7, the operation of pump 48 is maintained. If the liquid level in tank 7 is below the desired liquid level in tank 7, pump 56 is run and valve 60 is opened so that liquid in tank 14 may be pumped to sprayer 43.

Figure 6:
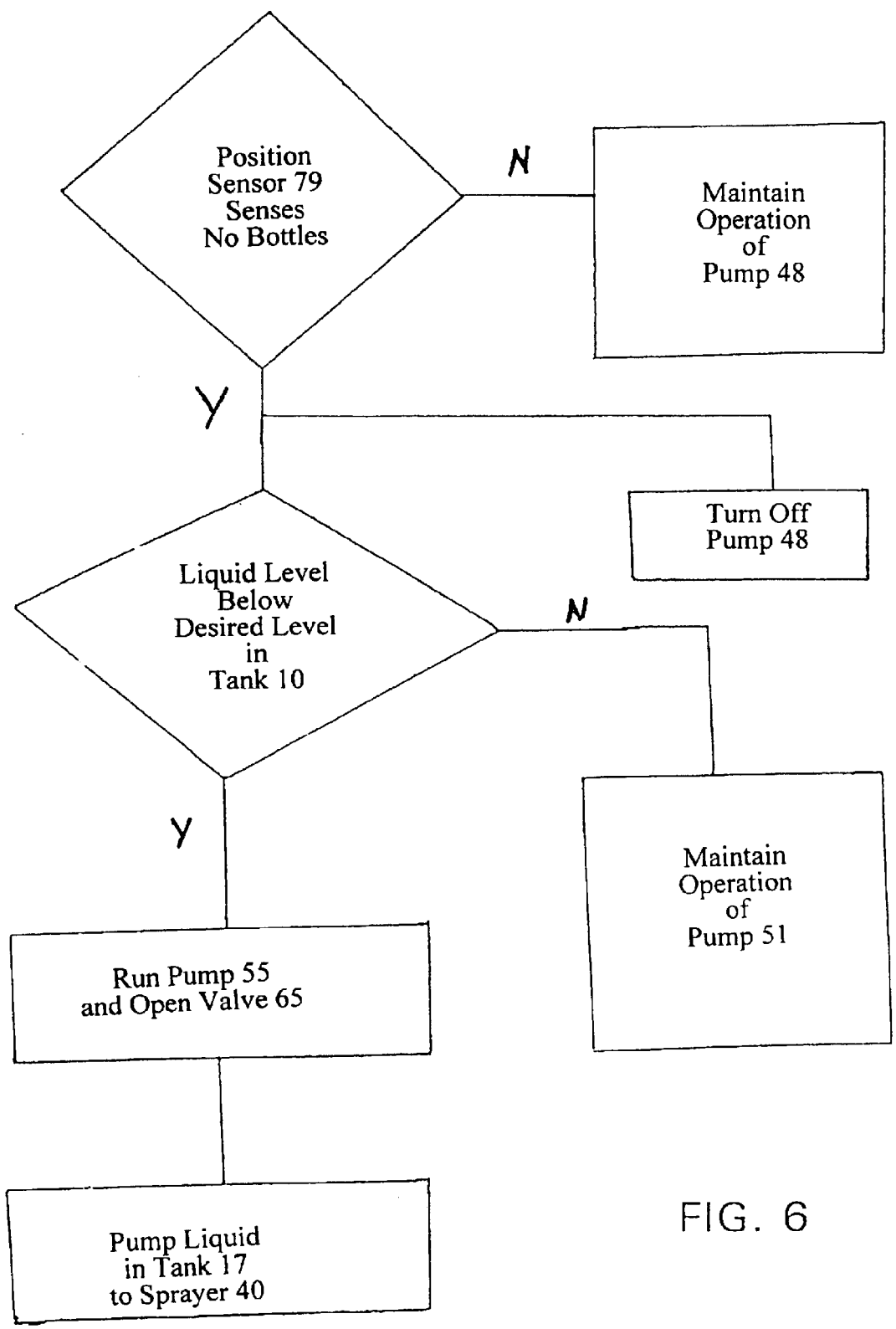

In FIG. 6, if position sensor 79 senses bottles or containers, the operation of pump 48 is maintained. If position sensor 79 senses no bottles, pump 48 is turned off and a determination is made whether the liquid level in tank 10 is below the desired liquid level in tank 10. If the liquid level in tank 10 is not below the desired liquid level in tank 10, the operation of pump 51 is maintained. If the liquid level in tank 10 is below the desired liquid level in tank 10, pump 55 is run and valve 65 is opened so that liquid in tank 17 may be pumped to sprayer 40.

Figure 7:
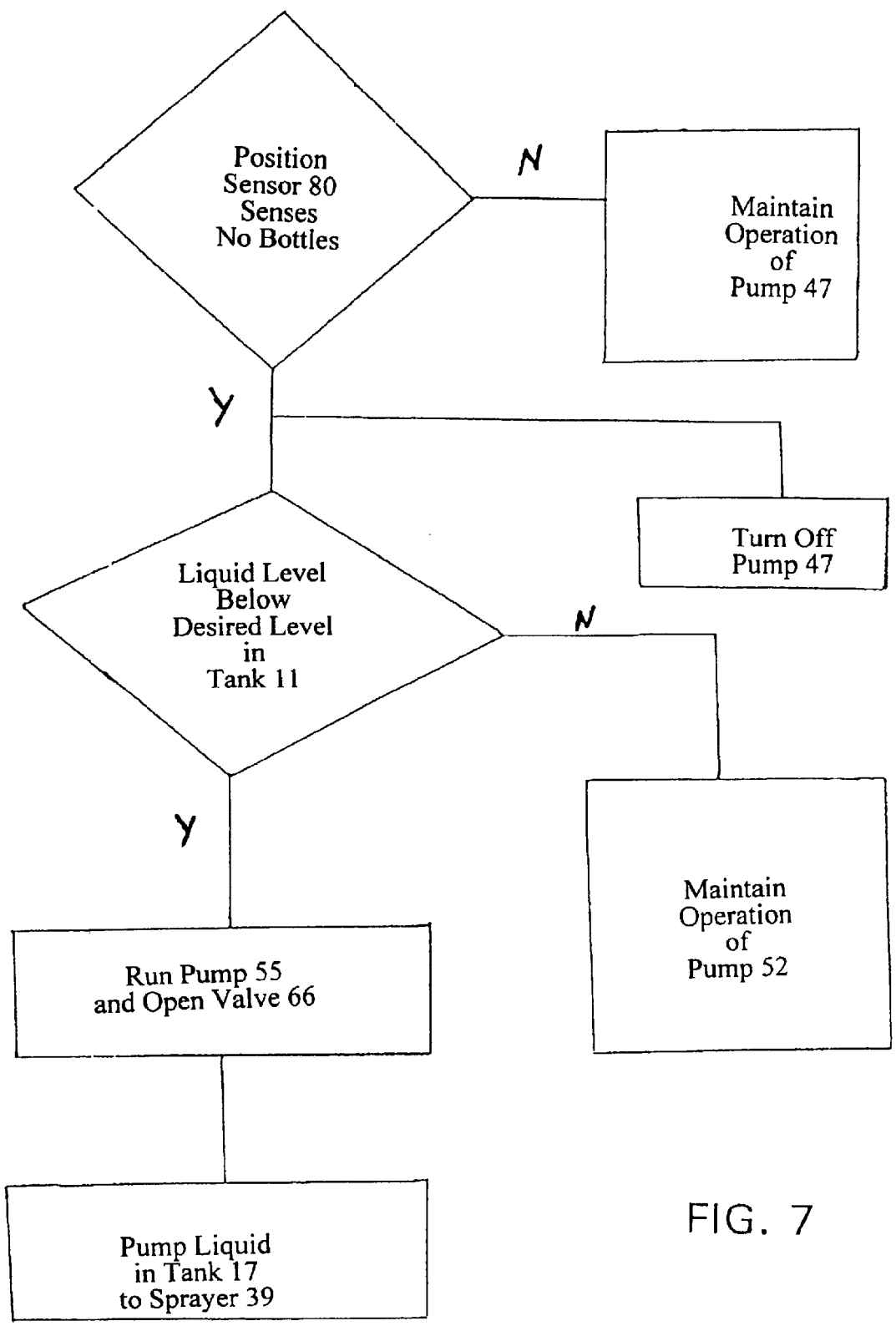

In FIG. 7, if position sensor 80 senses bottles or containers, the operation of pump 47 is maintained. If position sensor 80 senses no bottles, pump 47 is turned off and a determination is made whether the liquid level in tank 11 is below the desired liquid level in tank 11. If the liquid level in tank 11 is not below the desired liquid level in tank 11, the operation of pump 52 is maintained. If the liquid level in tank 11 is below the desired liquid level in tank 11, pump 55 is run and valve 66 is opened so that liquid in tank 17 may be pumped to sprayer 39.

Figure 8:
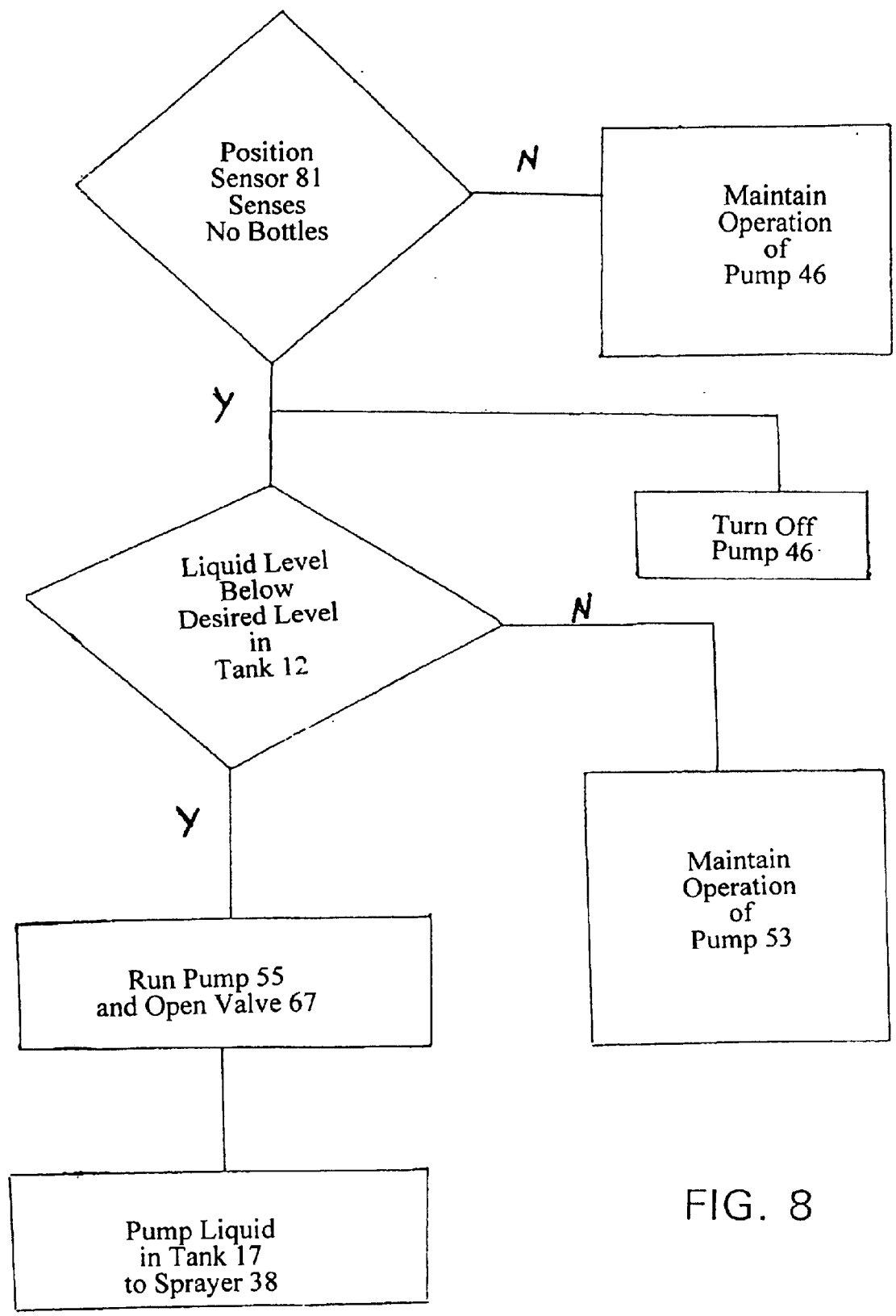

In FIG. 8, if position sensor 81 senses bottles or containers, the operation of pump 46 is maintained. If position sensor 81 senses no bottles, pump 46 is turned off and a determination is made whether the liquid level in tank 12 is below the desired liquid level in tank 12. If the liquid level in tank 12 is not below the desired liquid level in tank 12, the operation of pump 53 is maintained. If the liquid level in tank 12 is below the desired liquid level in tank 12, pump 55 is run and valve 67 is opened so that liquid in tank 17 may be pumped to sprayer 38.

Figure 9:
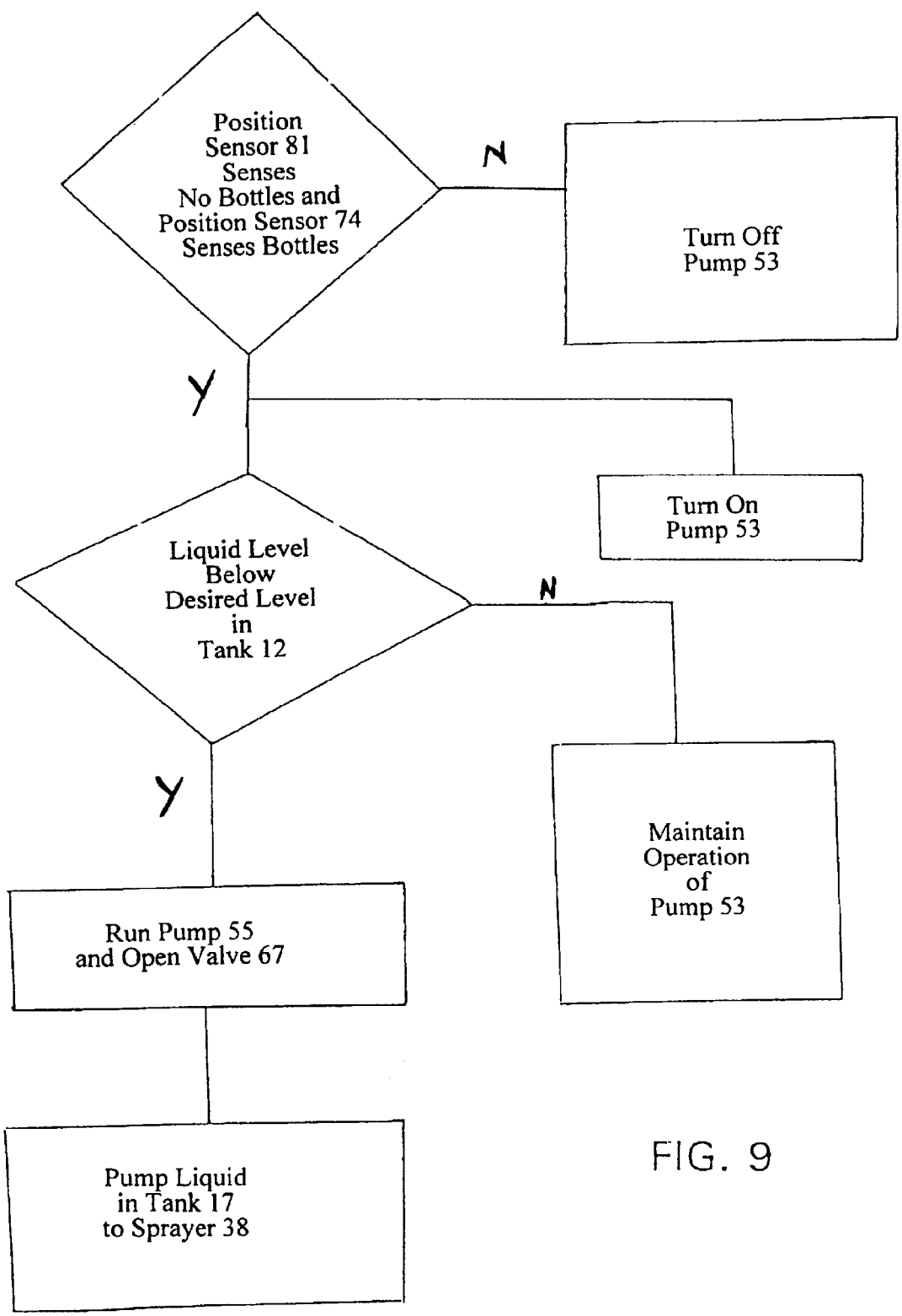

In FIG. 9, if position sensor 81 senses no bottles and position sensor 74 senses no bottles, pump 53 is turned off. If position sensor 81 senses no bottles and position sensor 74 senses bottles, pump 53 is turned on and a determination is made whether the liquid level in tank 12 is below the desired liquid level in tank 12. If the liquid level in tank 12 is not below the desired liquid level in tank 12, the operation of pump 53 is maintained. If the liquid level in tank 12 is below the desired liquid level in tank 12, pump 55 is run and valve 67 is opened so that liquid in tank 17 may be pumped to sprayer 38.

Figure 10:
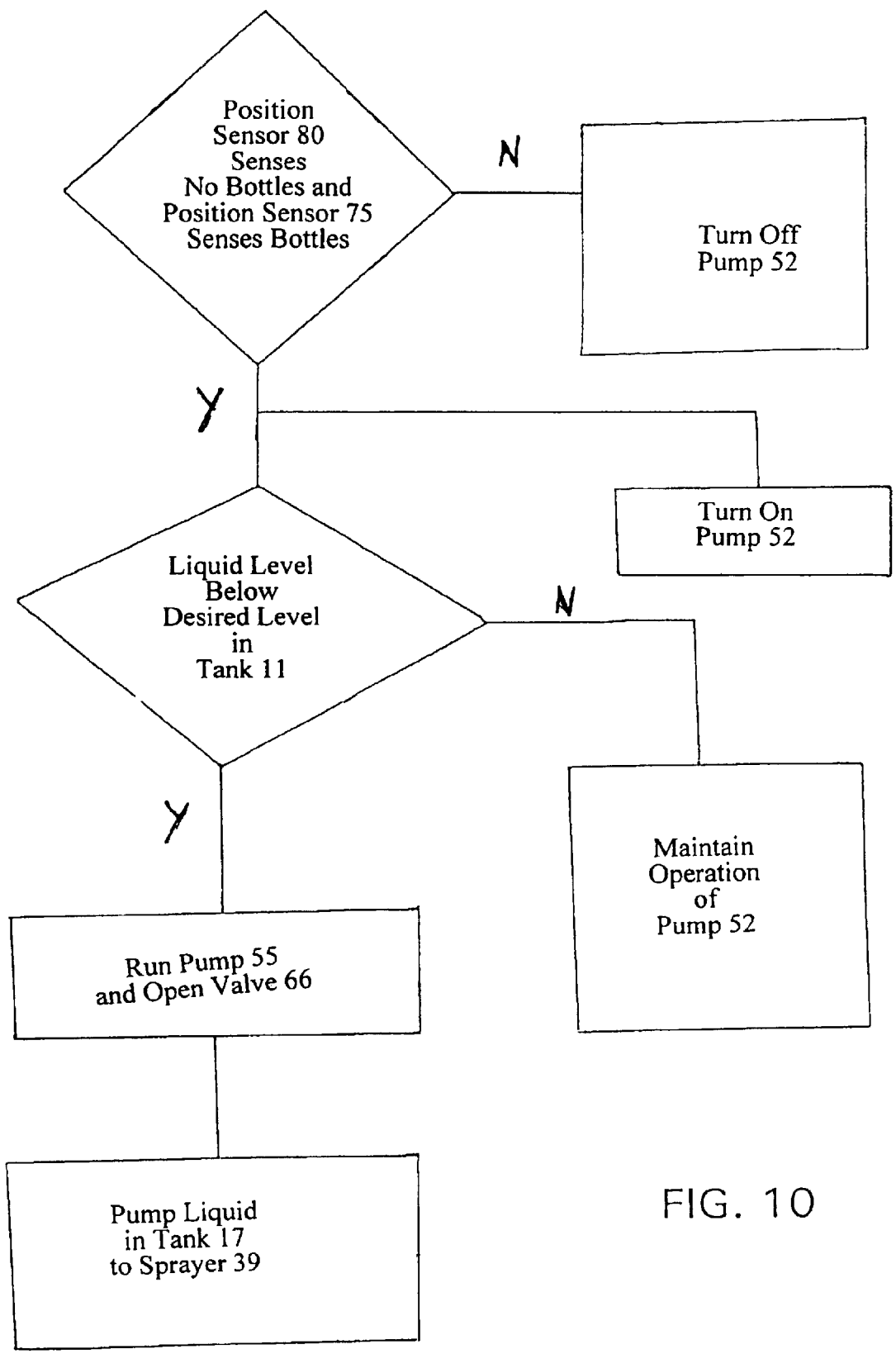

In FIG. 10, if position sensor 80 senses no bottles and position sensor 75 senses no bottles, pump 52 is turned off. If position sensor 80 senses no bottles and position sensor 75 senses bottles, pump 52 is turned on and a determination is made whether the liquid level in tank 11 is below the desired liquid level in tank 11. If the liquid level in tank 11 is not below the desired liquid level in tank 11, the operation of pump 52 is maintained. If the liquid level in tank 11 is below the desired liquid level in tank 11, pump 55 is run and valve 66 is opened so that liquid in tank 17 may be pumped to sprayer 39.

Figure 11:
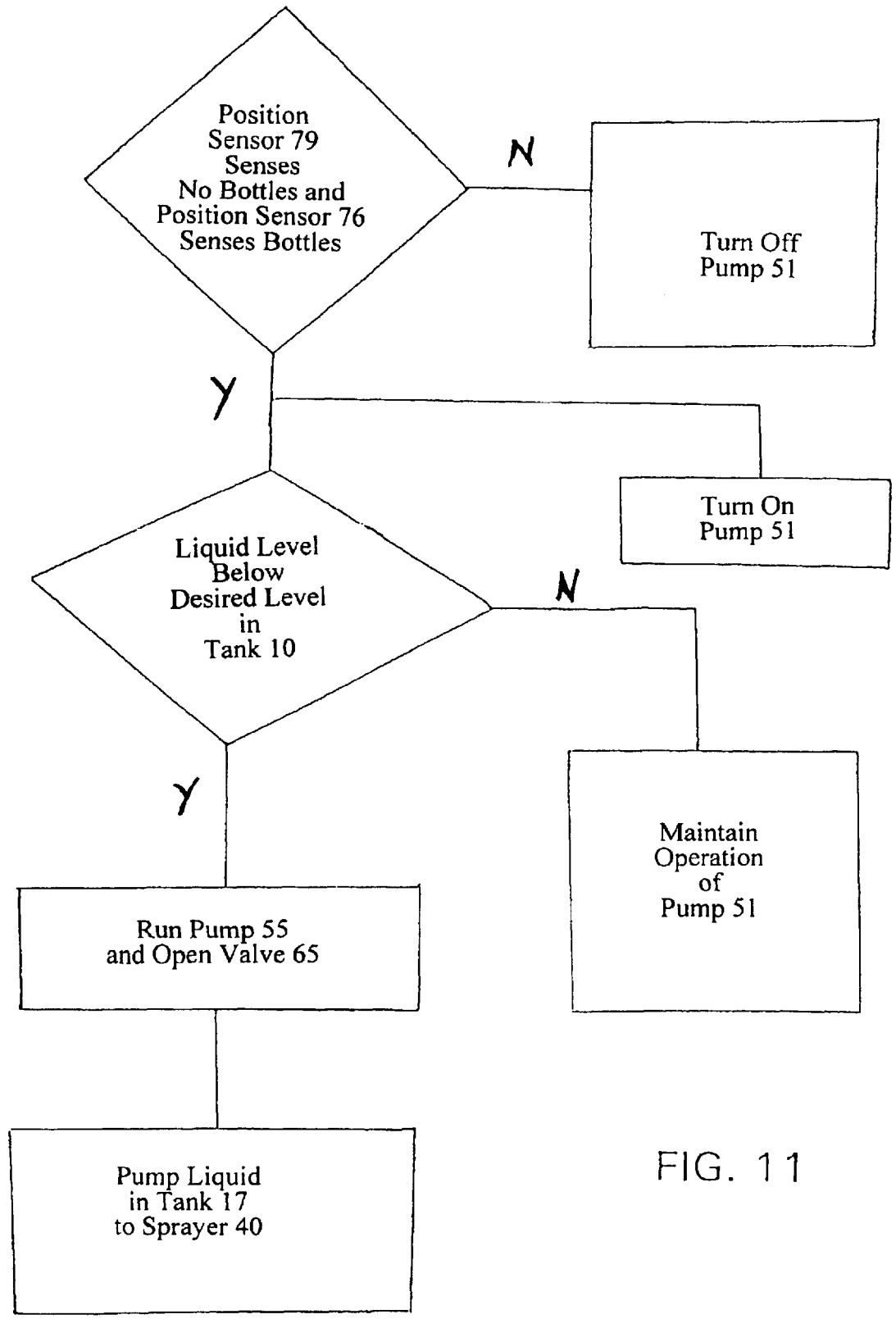

In FIG. 11, if position sensor 79 senses no bottles and position sensor 76 senses no bottles, pump 51 is turned off. If position sensor 79 senses no bottles and position sensor 76 senses bottles, pump 51 is turned on and a determination is made whether the liquid level in tank 10 is below the desired liquid level in tank 10. If the liquid level in tank 10 is not below the desired liquid level in tank 10, the operation of pump 51 is maintained. If the liquid level in tank 10 is below the desired liquid level in tank 10, pump 55 is run and valve 65 is opened so that liquid in tank 17 may be pumped to sprayer 40.

Figure 12:
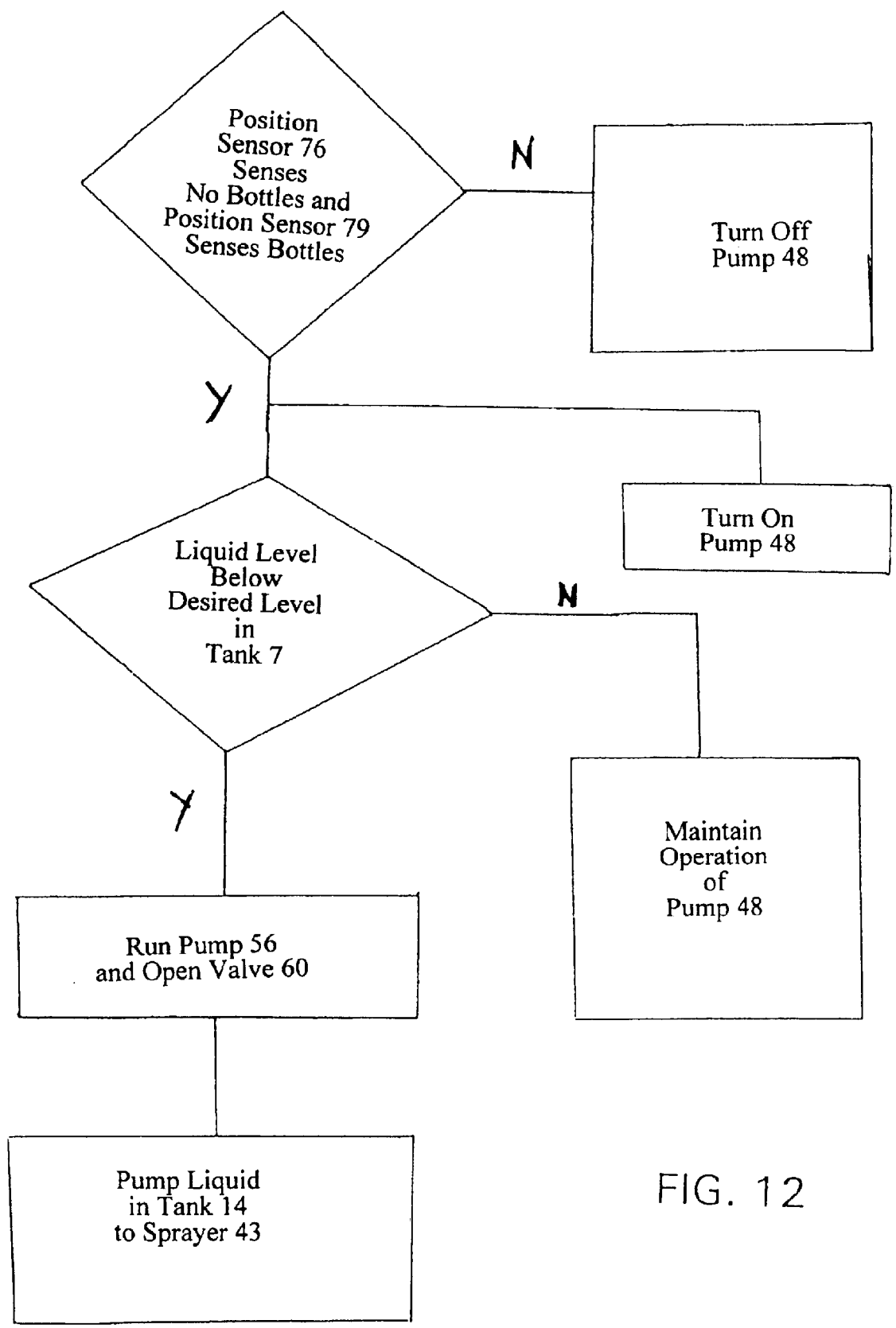

In FIG. 12, if position sensor 76 senses no bottles and position sensor 79 senses no bottles, pump 48 is turned off. If position sensor 76 senses no bottles and position sensor 79 senses bottles, pump 48 is turned on and a determination is made whether the liquid level in tank 7 is below the desired liquid level in tank 7. If the liquid level in tank 7 is not below the desired liquid level in tank 7, the operation of pump 48 is maintained. If the liquid level in tank 7 is below the desired liquid level in tank 7, pump 56 is run and valve 60 is opened so that liquid in tank 14 may be pumped to sprayer 43.

Figure 13:
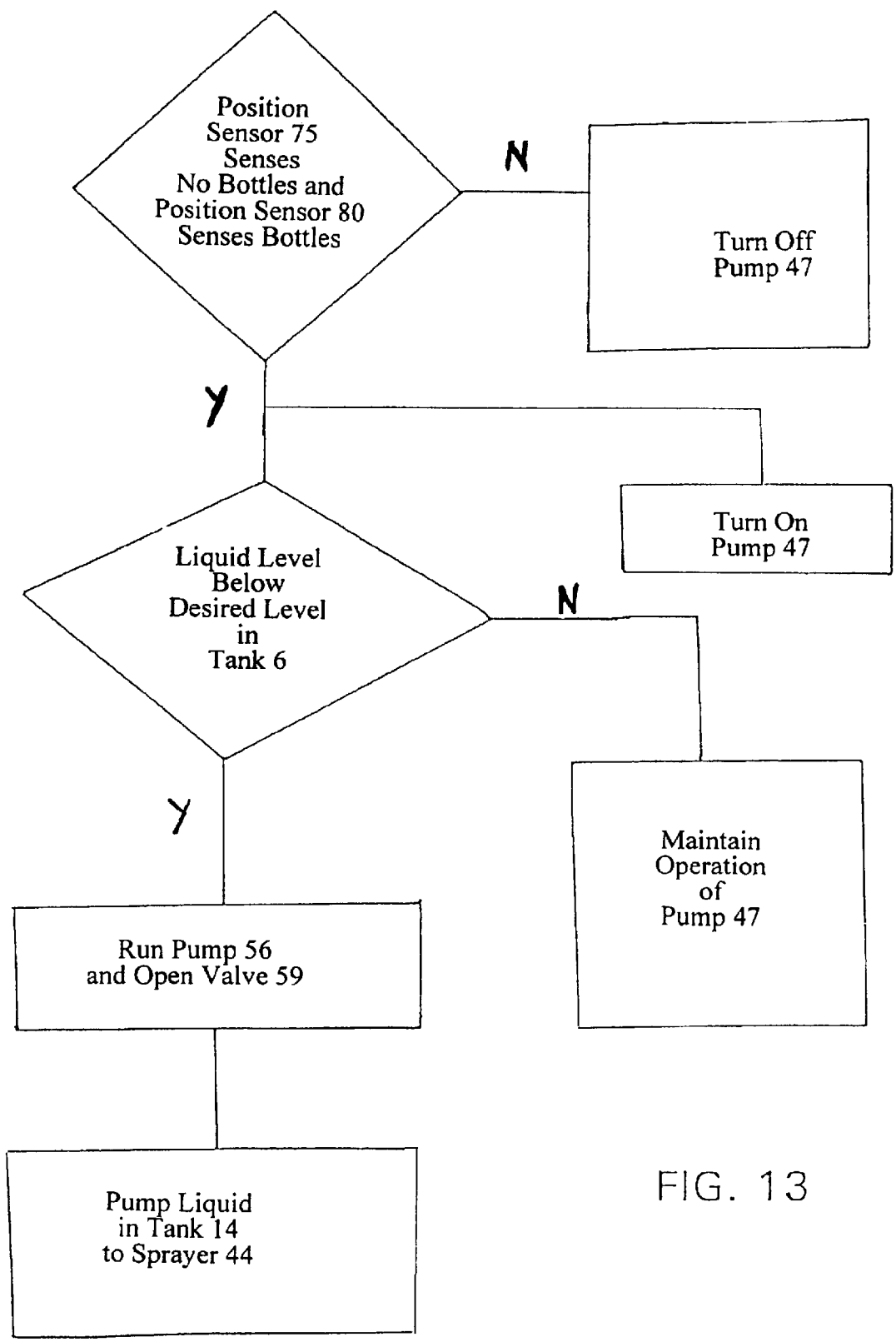

In FIG. 13, if position sensor 75 senses no bottles and position sensor 80 senses no bottles, pump 47 is turned off. If position sensor 75 senses no bottles and position sensor 80 senses bottles, pump 47 is turned on and a determination is made whether the liquid level in tank 6 is below the desired liquid level in tank 6. If the liquid level in tank 6 is not below the desired liquid level in tank 6, the operation of pump 47 is maintained. If the liquid level in tank 6 is below the desired liquid level in tank 6, pump 56 is run and valve 59 is opened so that liquid in tank 14 may be pumped to sprayer 44.

Figure 14:
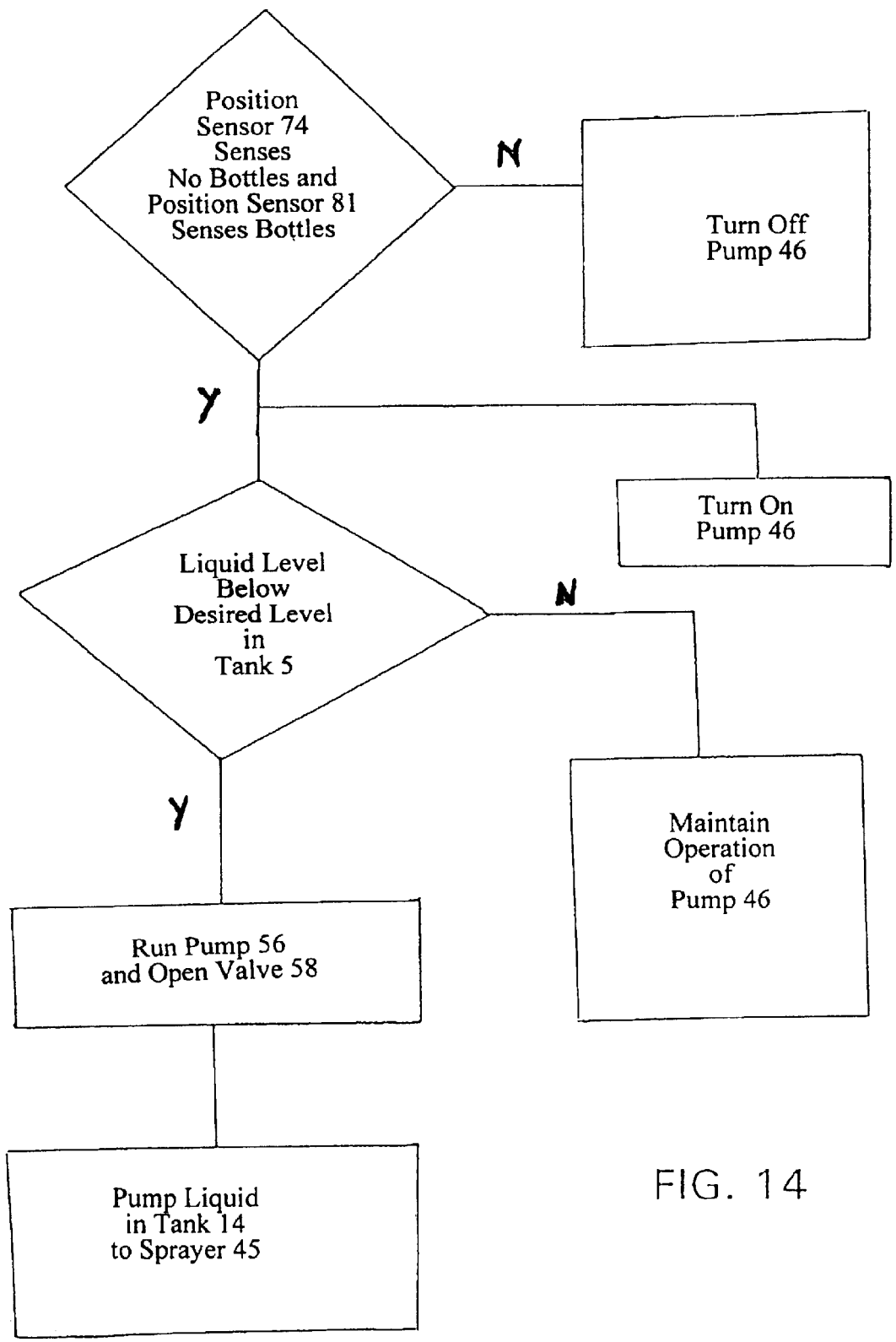

In FIG. 14, if position sensor 74 senses no bottles and position sensor 81 senses no bottles, pump 46 is turned off. If position sensor 74 senses no bottles and position sensor 81 senses bottles, pump 46 is turned on and a determination is made whether the liquid level in tank 5 is below the desired liquid level in tank 5. If the liquid level in tank 5 is not below the desired liquid level in tank 5, the operation of pump 46 is maintained. If the liquid level in tank 5 is below the desired liquid level in tank 5, pump 56 is run and valve 58 is opened so that liquid in tank 14 may be pumped to sprayer 45.

Figure 15:
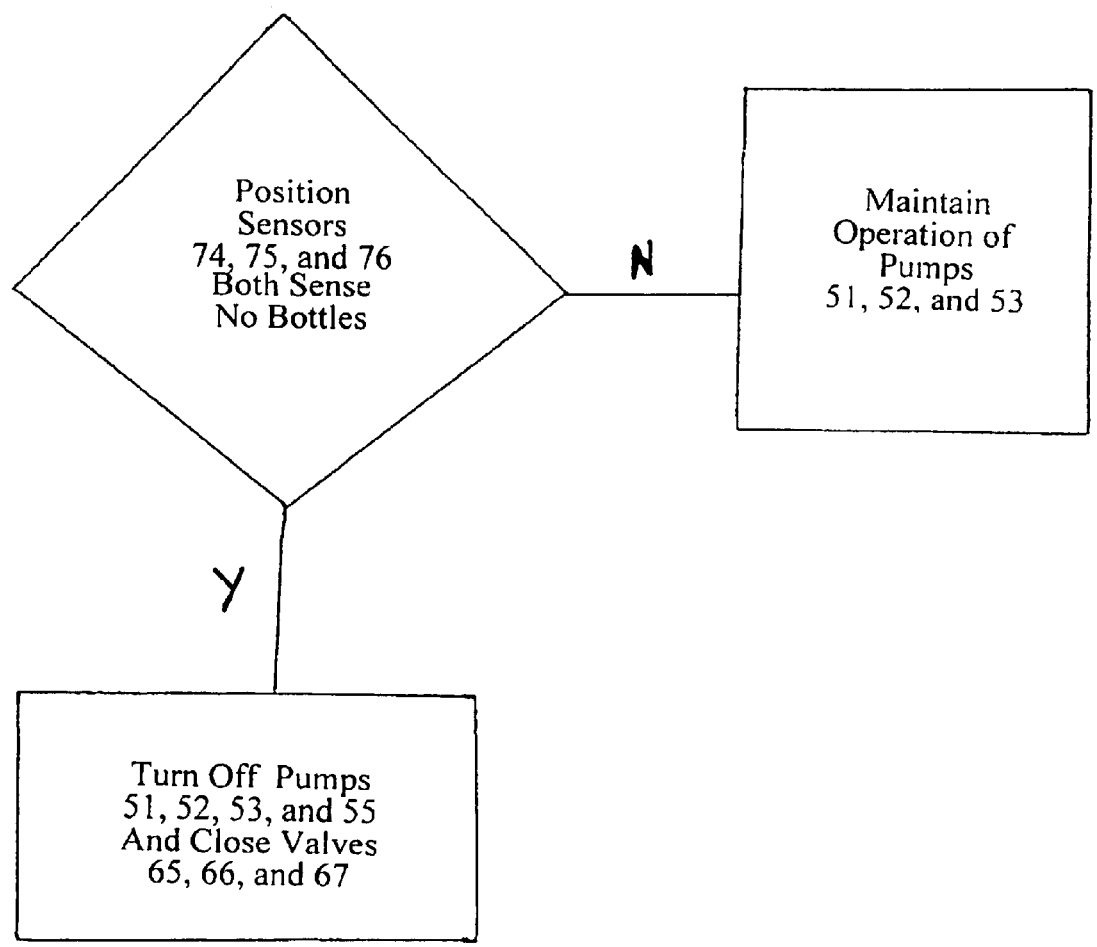

In FIG. 15, if position sensors 74, 75, and 76 all sense bottles, operation of pumps 51, 52, and 53 is maintained. If position sensors 74, 75, and 76 all sense no bottles, pumps 51, 52, 53, and 55 are turned off and valves 65, 66, and 67 are closed.

Figure 16:
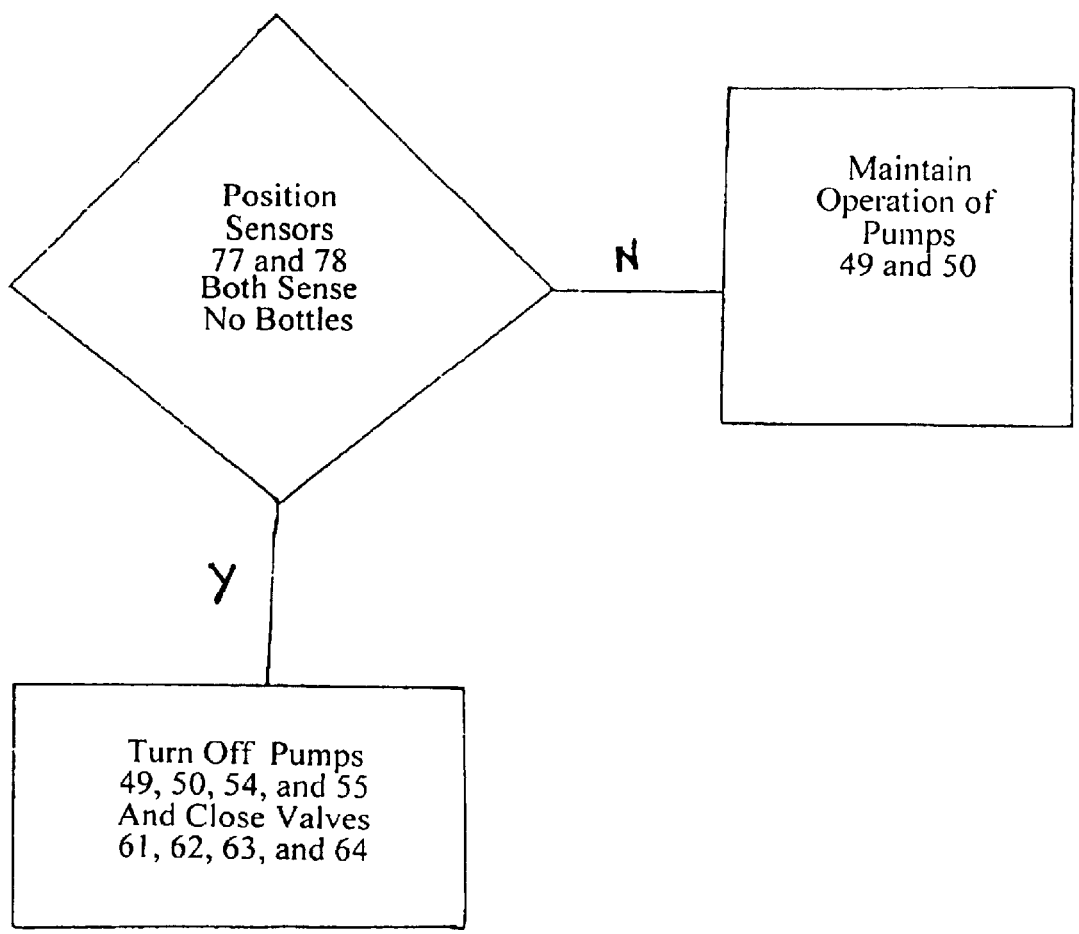

In FIG. 16, if position sensors 77 and 78 both sense bottles, operation of pumps 49 and 50 is maintained. If position sensors 77 and 78 both sense no bottles, pumps 49, 50, 54, and 55 are turned off and valves 61, 62, 63, and 64 are closed.

Figure 17:
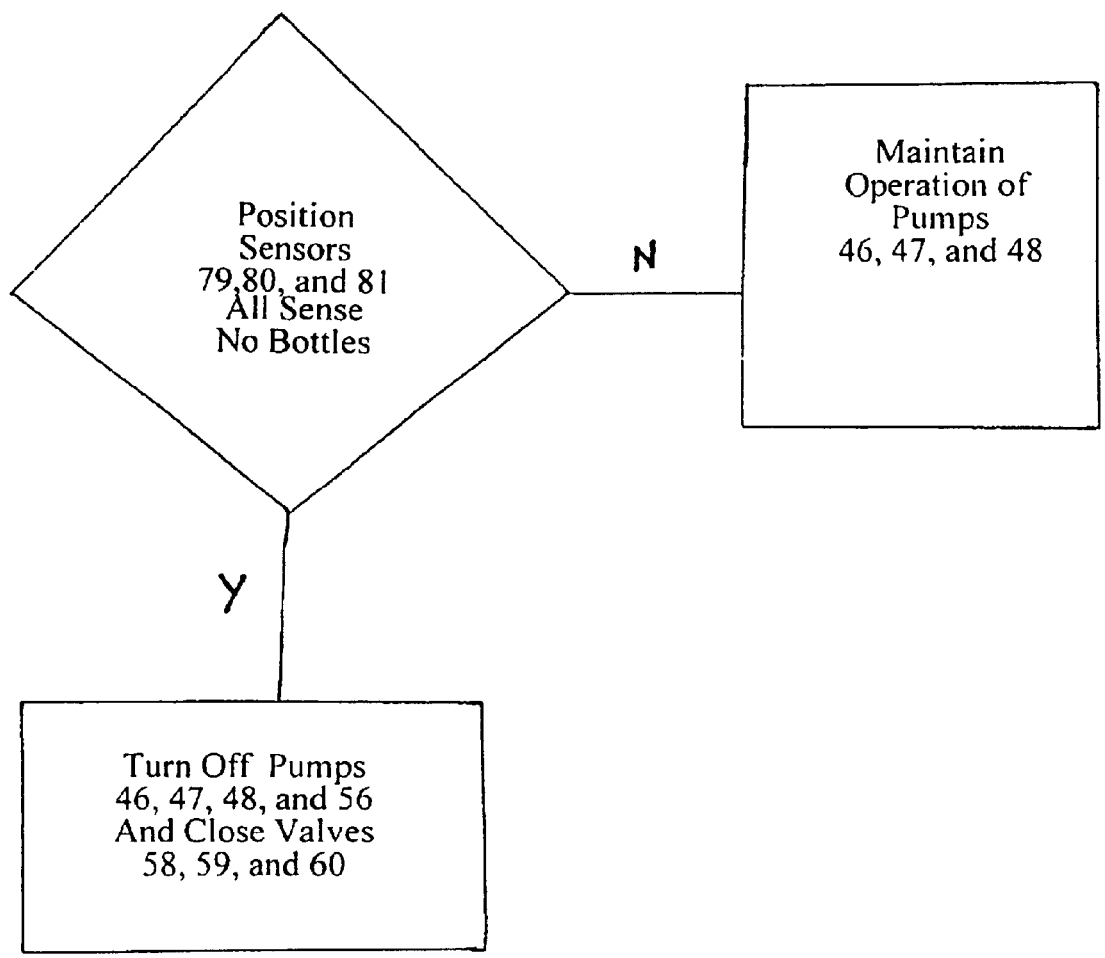

In FIG. 17, if position sensors 79, 80, and 81 all sense bottles, operation of pumps 46, 47, and 48 is maintained. If position sensors 79, 80, and 81 all sense no bottles, pumps 46, 47, 48, and 56 are turned off and valves 58, 59, and 60 are closed.

Figure 18:
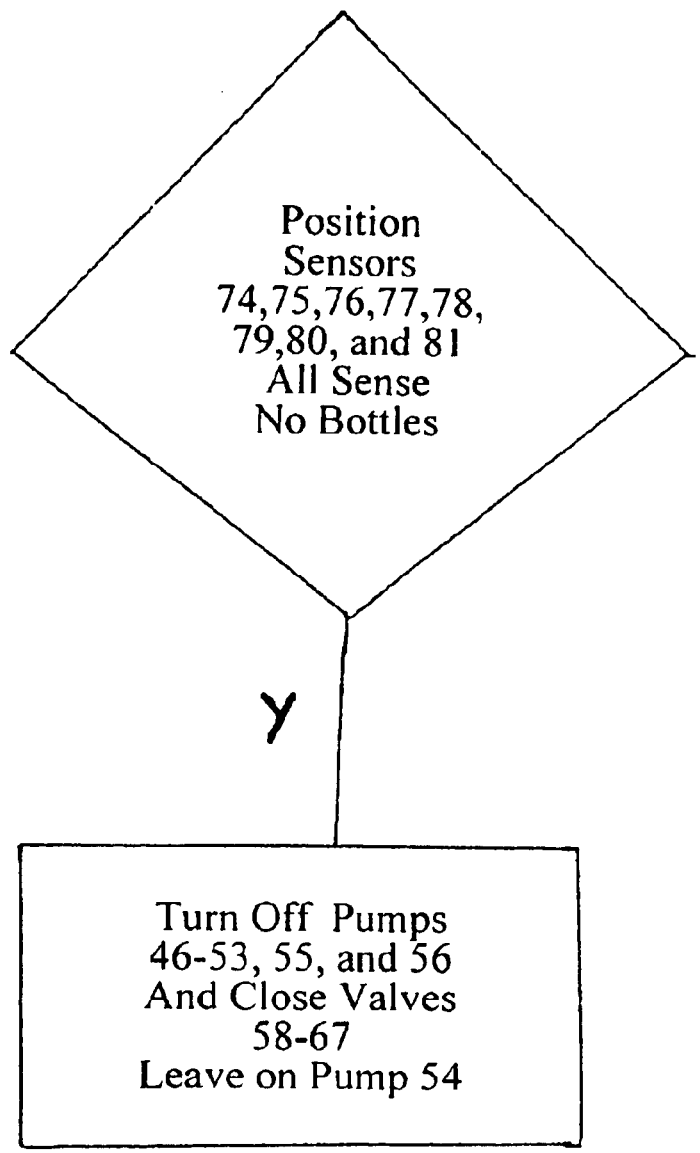

In FIG. 18, if position sensors 74, 75, 76, 77, 78, 79, 80, and 81 all sense no bottles, pumps 46–53, 55 and 56 are turned off and valves 58–67 are closed but pump 54 is left on.

A person skilled in computer art, for example, would be able to determine from this specification and the drawings for this application, with minimum experimentation or without undue experimentation, the operation of the pasteurization system, possibly including interruption, stoppage, or startup of the pasteurization system, as it relates to, for example, position sensors 77 and 78, sprayers 41 and 42, tanks 8, 9, 13, 15, and 16, liquid level sensors 27 and 29, temperature sensors 26 and 28, valves 61–64, overflow devices 69, 70, 72, and pumps 49, 50, 54, and 55.

Figure 19:
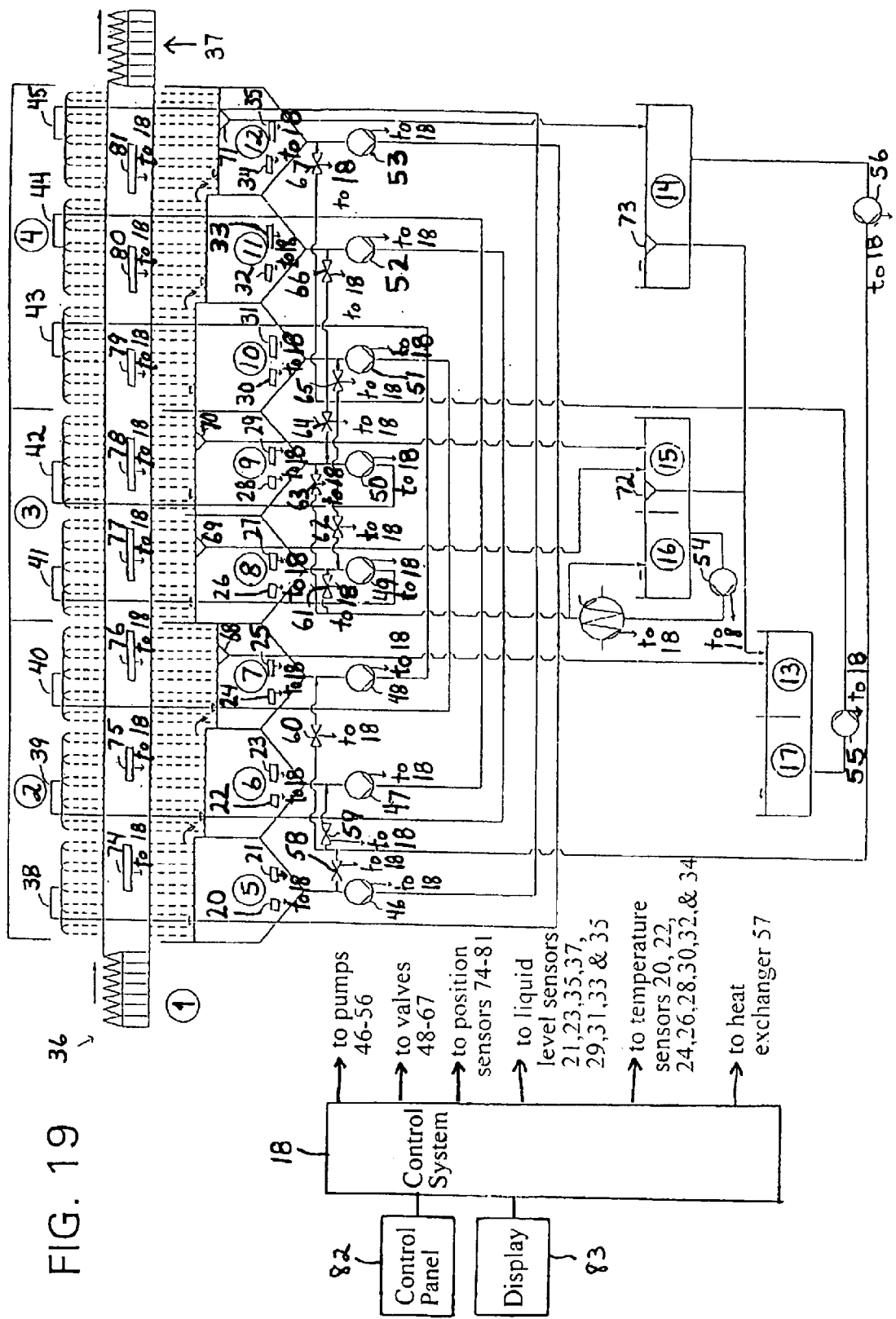
FIG. 19 is essentially identical to FIG. 2 except for the substitution of a manual control arrangement for the microprocessor shown in FIG. 2.
Figure 19A:
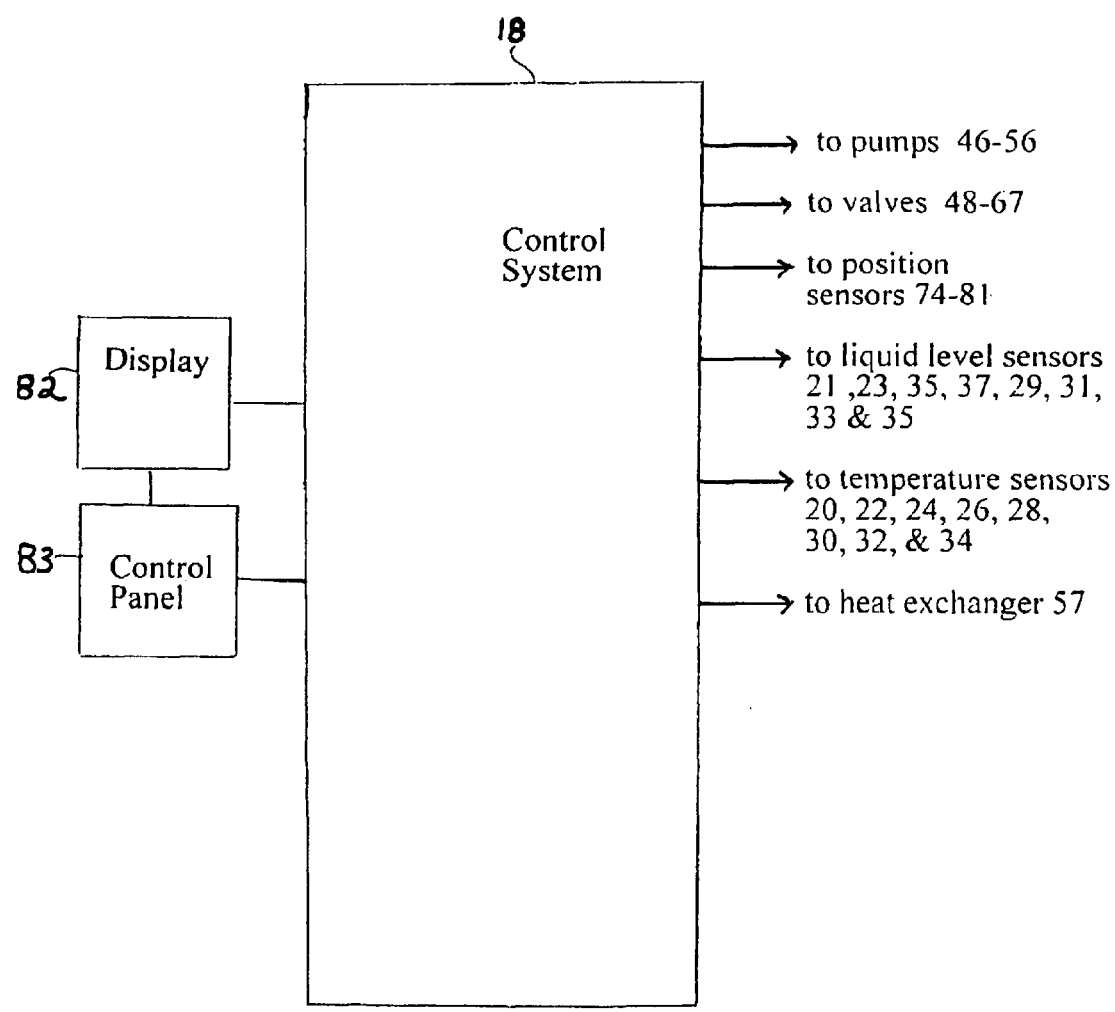
FIG. 19A is an enlarged view of the manual control arrangement shown in FIG. 19.

In at least one possible embodiment of the present invention, all or at least some of the components of the pasteurization system can be controlled manually by the control system 18, a display 82, and a control panel 83, which control system 18, display 82, and control panel 83 are shown in FIGS. 19 and 19A. In FIGS. 19 and 19A, both the display 82 and the control panel 83 are connected to the control system 18 and to each other. The control panel 83 may be operated by means of switches, and information relating to the control panel 83 is displayed on the display 82. The control system 18 in FIGS. 19 and 19A is connected to and controls pumps 46–56; valves 58–67; position sensors 74–81; liquid level sensors 21, 23, 25, 27, 29, 31, 33, and 35; temperature sensors 20, 22, 24, 26, 28, 30, 32, and 34; and the heat exchanger 57. A person skilled in the art would be able to determine, with minimum experimentation or without undue experimentation, manual operation of the pasteurization system and control arrangement shown in FIGS. 19 and 19A.

Figure 20:
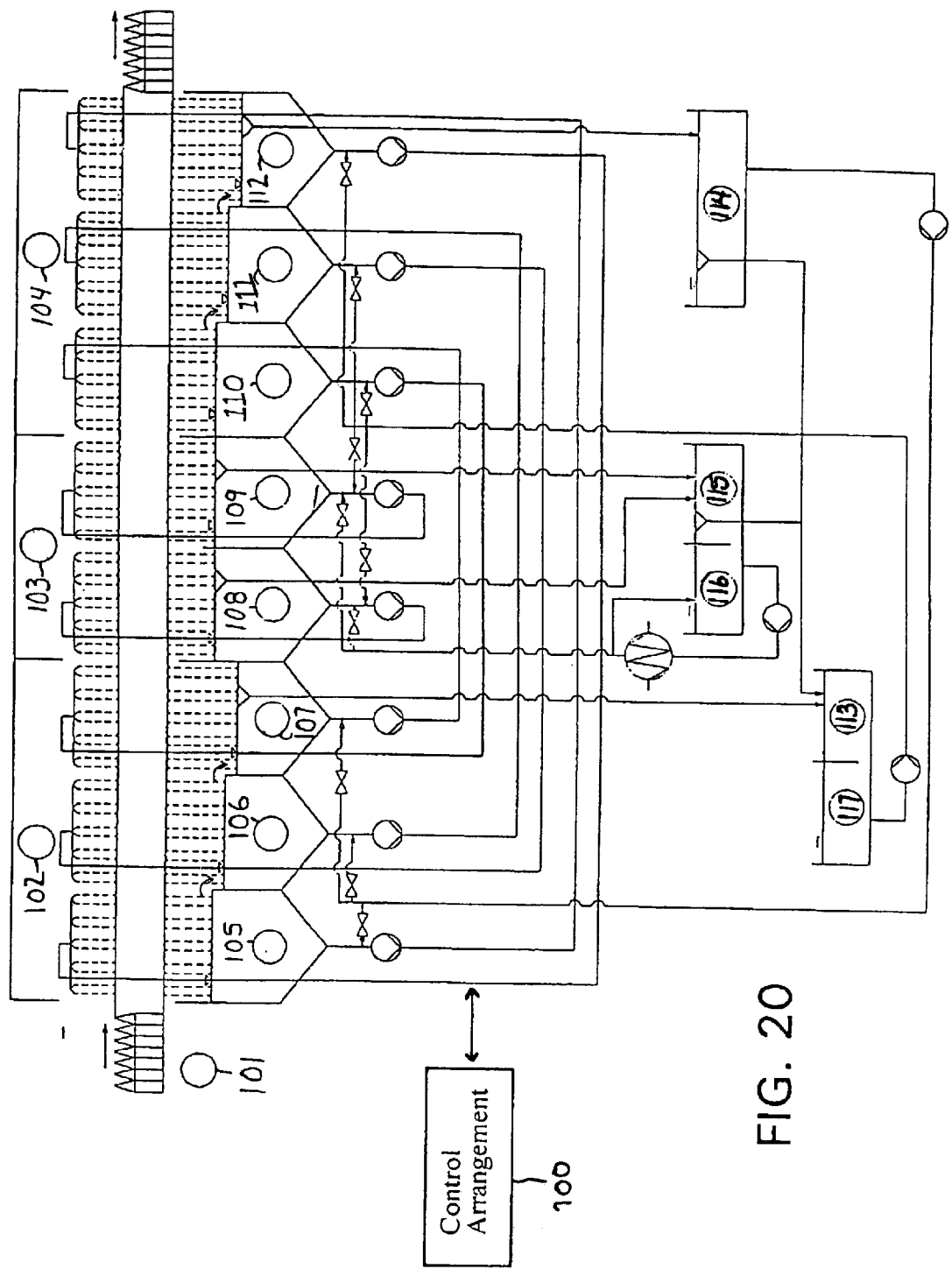
FIG. 20 is a diagram showing a pasteurization unit with embodiment in accordance with the present invention.

As shown in FIG. 20, the pasteurization unit consists, in the direction of travel of the individual containers 101, of a warming section 102 that is located in the starting area. The warming section 102 consists of a plurality of individual zones 105, 106, and 107, whereby the heating is conducted gradually and in phases. Immediately downstream of this warming section 102 is a superheating zone 108, which in turn is followed by the actual pasteurization zone 109. Then begins the cooling section 104 which, like the other sections, can consist of a rather large number of individual zones 110, 111, and 112.

The operating program for such a pasteurization unit is initially designed for pasteurization operation under optimum conditions. For example, the first warming zone 105 has a spray temperature of 18° C. The initial temperature of the product to be pasteurized therefore has a temperature after spraying of approximately 17° C. The second heating zone 106 has a spraying temperature that is slightly above 24° C., whereby the cooling zone that immediately follows it can be somewhat lower at 23° C. Using the example of these two zones it is clear that the water from the "cooling" zones 104 is fed to the zone in the "heating" section 102, the desired heating temperature of which is closest to the desired cooling temperature. To equalize the respective temperature difference, small quantities of water are added to the water from the cooling section 104, preferably from the first tank 113, the higher-temperature water of which originates from the last station 107 of the warming section 102. Downstream of this warming section is the superheating zone 108, the temperature of which is in turn higher than the temperature of the last heating zone 107, and is fed from a second container 115 with water at a higher temperature than the first container 113. Associated with the second container 115 is a third container 116, to which the overflow water from the container 115 is fed. This third container 116 is also held at a pre-determined higher temperature by means of a heating device. The superheating and pasteurization zone 108, 109 is also heated from this container 116, whereby the hot water discharged is collected in the second container 115 and is mixed with the hot water from the third container 116.

The operating program for the a pasteurization unit is possibly subject to a control arrangement, generally identified by reference numeral 100 in FIG. 20.

In the event of a disruption, which can be caused for example by a container that becomes jammed or stuck in the pasteurization plant, there is an immediate actuation of certain valves by a control device (not shown in any further detail) so that, for example, the lower-temperature water from the first container 113 is fed to the superheating and/or pasteurization zone 108, 109. Lower-temperature water, for example from an additional fourth container 114, can also be fed to the other sections 102, 104.

Figure 21:
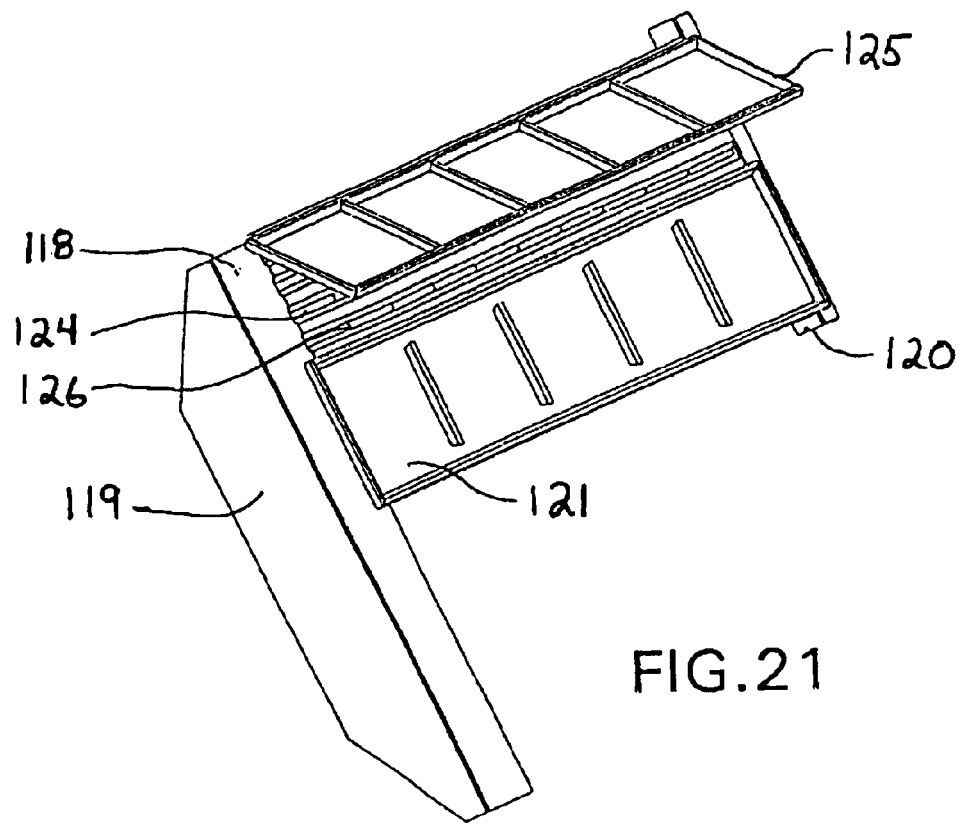
FIG. 21 is a perspective view illustrating details of the housing of a pasteurization unit.

As illustrated in FIG. 21, the pasteurization unit has a housing 118 with side walls and bottom walls that surround it on all sides, whereby the side walls 119, 120 are used to hold the spray units 122 that are realized in the form of the roof 121. These spray units serve on one hand as roof covers for the housing 118 and on the other hand as direct spraying devices for the individual pasteurization segments in the pasteurization unit. The roof is thereby formed by sheet metal bodies 123, which can be serpentine-shaped, for example, in which the spray channels 124 are shaped. These spray channels are closed on the top with a removable or pivoting cover plate 125, and have a common supply line, which can be on the side, for example. The spray units 122 that form the roof can have conical channels 124 that are placed in alternation or in groups next to one another, each of which can be supplied from the wider side with the liquid to be sprayed and which ensure an appropriately uniform distribution of fluid. The individual channels 124 have spray nozzles or spray openings 126, the condition of which can be easily verified by opening or lifting the cover plates 125. Any cleaning that is necessary can also be performed during such an inspection.

Figure 22:
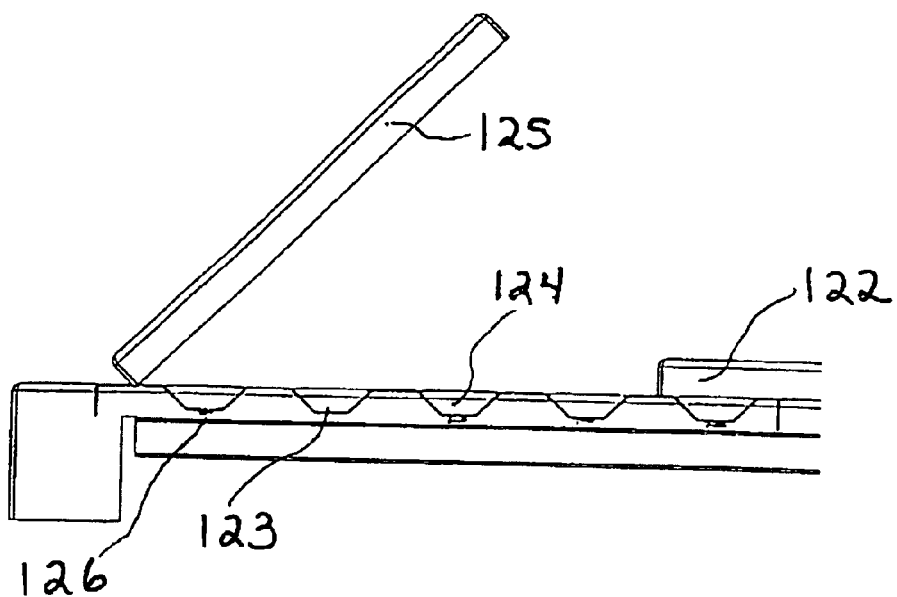
FIG. 22 is a side elevation of a portion of a pasteurization unit.

A flat-type roof structure or cover is illustrated in FIG. 22, comprising a top cover 125 that can be placed flat onto the channel or channel section 124 comprising sheet metal bodies or structures 123. The channel section 124 comprises peaks and valleys, with spray nozzles 126 being disposed in valleys and connected to piping, not shown. The assembly is generally identified by reference numeral 122.

In other words, as illustrated in FIG. 21, a gable type roof or cover has supporting structures 119 and 120. Other configurations of the cover or roof are within the scope of the present invention. Disposed on or at the structures 119 and 120 are the channels 124 or channel sections, in the illustrated embodiment of FIG. 21 and 22, these channels or sections 124 comprise a peak and valley profile with spray nozzles 126 being disposed in the valleys of the profile, generally identified by reference numeral 124. Piping, not shown, supplies the nozzles 126 respectively with the spray medium, as described elsewhere.

Figure 23:
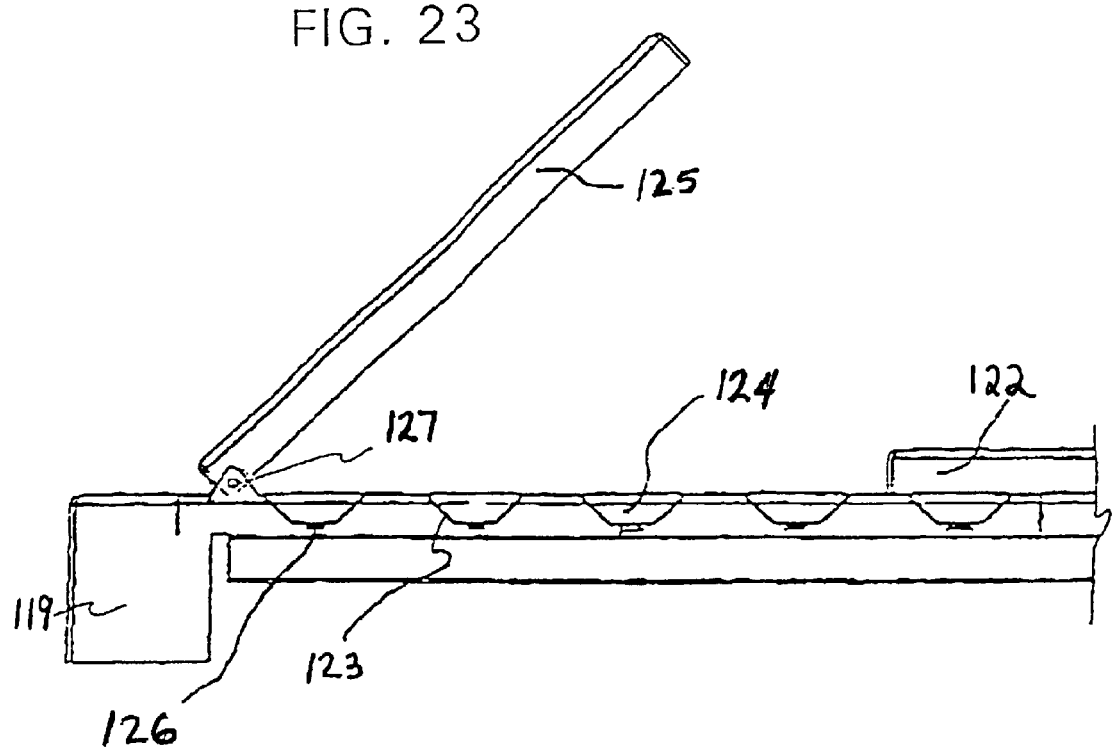
FIG. 23 is a view similar to FIG. 22 showing further detail.

FIG. 23 illustrates in greater detail the pivot or hinge-type connection between the support structure 119 and the cover 125. Thus, to service or inspect the attendant piping and nozzles 126, the cover may be swung about center of rotation 127.

For multi-story pasteurization units, the spray units 122 in the unit can be realized so that they can be extracted from the side and can be stored inside the housing 118.

In other words, the housing has provisions for storing spray units, generally identified by reference numeral 122. The spray units 122 comprise the channels or sections comprising channels, as identified by reference numeral 124.

Figure 24:
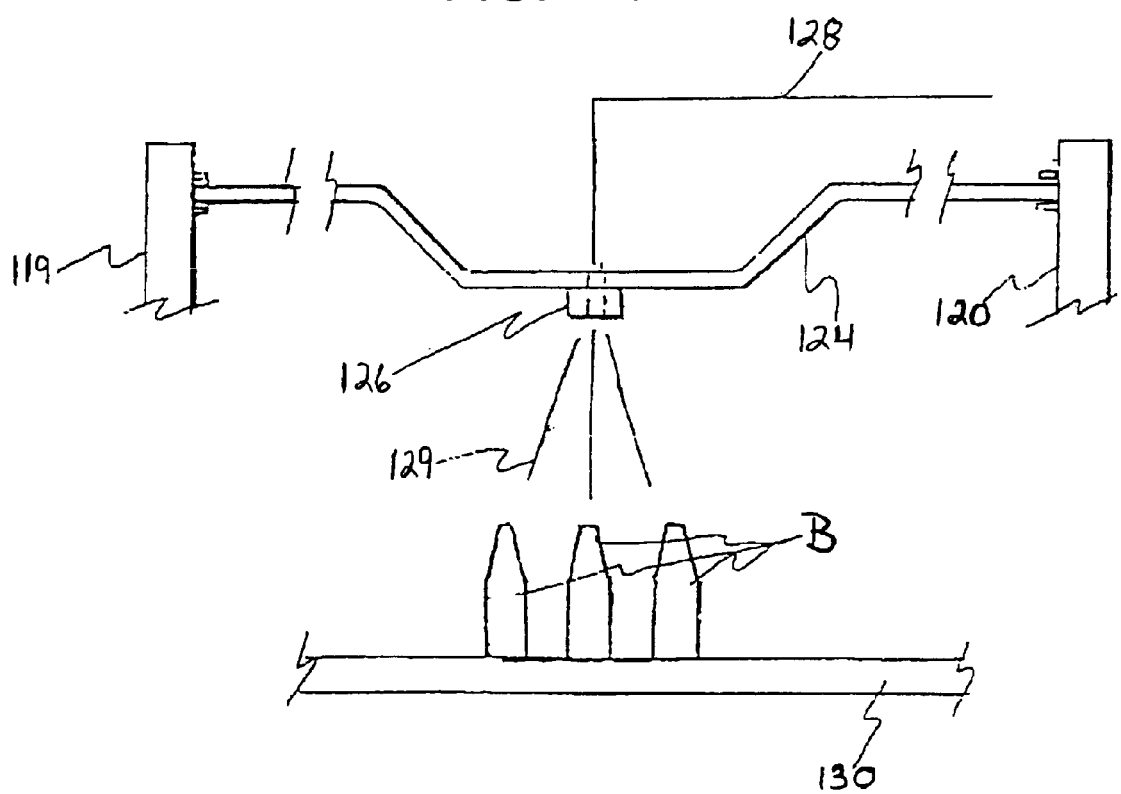
FIG. 24 is a schematic view illustrating the operation of a pasteurization unit.

FIG. 24 schematically illustrates the operation of the system. Thus, there is provided a roof or cover identified by structures 119 and 120 which support a channel or channel section 124 with a spray nozzle 126. The top cover 125 has been omitted in this illustration for clarity. The spray nozzle 126 is supplied in controlled manner with liquid as has been described elsewhere, through a line such as 128. The spray of liquid is schematically identified by reference numeral 129. The spray 129 may be directed in any desired flow pattern, it being understood that the spray pattern or spray patterns should be such that the bottles B, which are conveyed on conveyor 130, are sufficiently contacted with the spraying liquid to treat the product they contain for stabilization.

Figure 25:
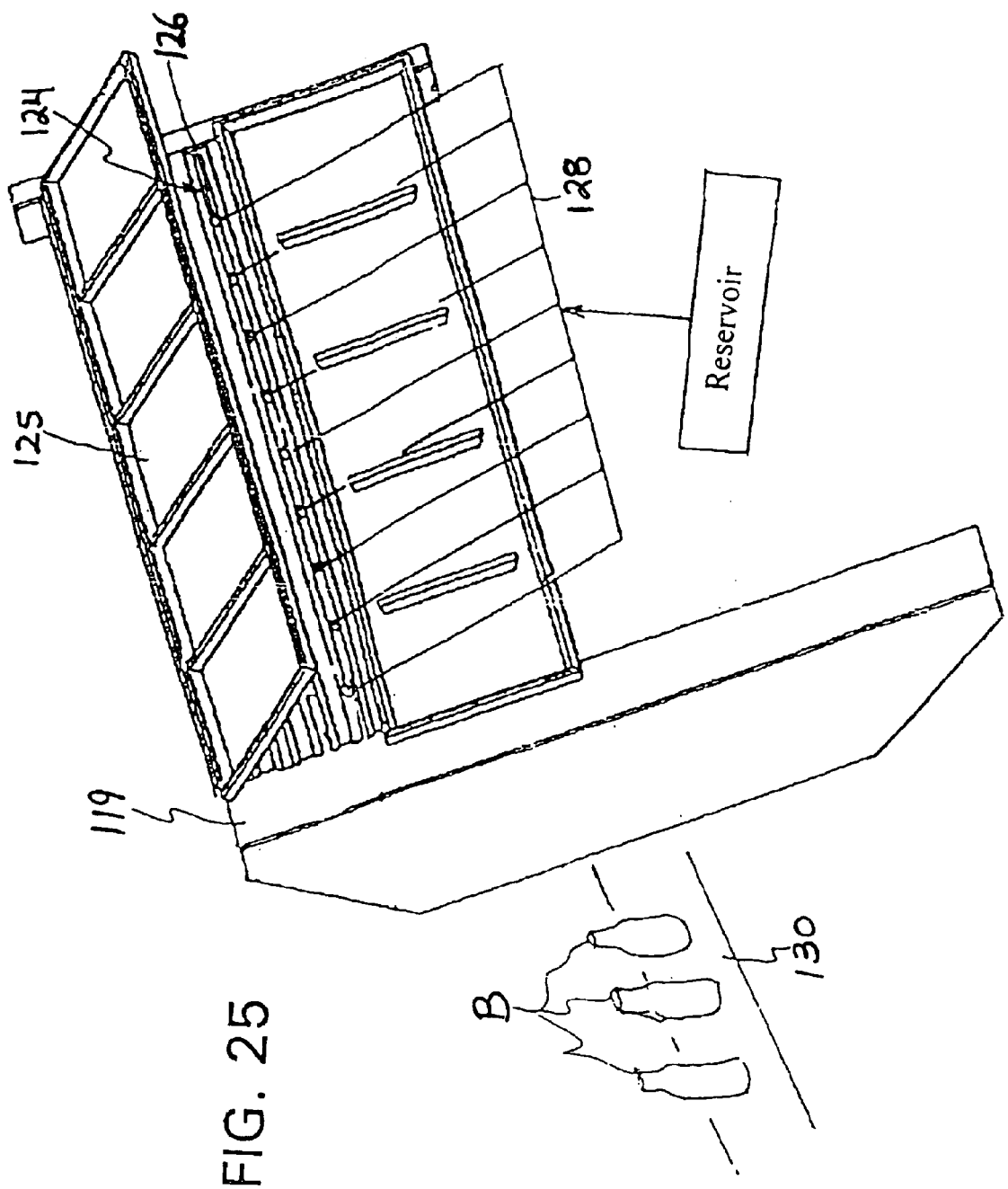
FIG. 25 is a view similar to FIG. 21 showing additional detail.

FIG. 25 illustrates a roof or cover by way of element 119. Atop the roof or cover are top covers 125 which close from atop channel sections 124. The channel sections 124 comprise spray nozzles 126 which are fed with spray liquid from a reservoir as described elsewhere, by way of lines or conduits 128. Bottles B are conveyed beneath the spray nozzles 126.

It will be appreciated that the unitization of the roof and spray arrangements considerably reduces the elements hitherto necessary.

One feature of the invention resides broadly in a pasteurization unit for pasteurizing products in containers in a flow of containers through successive sections at least for heating, pasteurizing and cooling by means of fluid covering them, such as by trickling over them, or spraying over them, or subjecting them to a spray, with a pasteurizer housing and spray devices located inside it, characterized by the fact that the roof (121) of the pasteurizer housing (118) is realized in the form of a roof sprayer and forms both the roof (121) and the spray devices (122).

Another feature of the invention resides broadly in the pasteurization unit, characterized by the fact that the roof (121) is realized in the form of shaped spray channels (124) located next to one another.

Yet another feature of the invention resides broadly in the pasteurization unit, characterized by the fact that the spray channels (124) are open on top and can be closed with an individual and/or common cover (125).

Still another feature of the invention resides broadly in the pasteurization unit, characterized by the fact that the covers (125) can be attached in sections to the spray channels and are mounted so that they can be folded away from them.

A further feature of the invention resides broadly in the pasteurization unit, characterized by the fact that the covers (122) themselves form the spray devices and can be attached to a frame and/or to the side walls in the form of a roof cover.

Another feature of the invention resides broadly in the pasteurization unit, characterized by the fact that the spray channels (124) are realized in a serpentine shape and are run in alternating conical directions individually or in groups, so that a first spray channel or a first group of spray channels can be charged with the fluid to be sprayed from a first side, and the individual channel or group of such channels that lies next to the first channel or group is conical in the opposite direction and can be charged with the fluid to be sprayed from the second side.

Yet another feature of the invention resides broadly in the pasteurization unit, characterized by the fact that the lower portion of the roof that contains the spray opening is straight or flat and the upper part provided as a roof cover for the injection channels forms the actual spray channels, and can be connected in a sealed manner with the lower part of the roof.

Thus, the present invention relates to a bottling plant with sections for stabilizing bottled products in containers.

In the beverage industry, in particular when products being bottled are easily perishable, it is common practice to heat-stabilize the products. In bottling plants of the known art, the containers that contain the products are transported in a practically uniform movement from the entry of the plant to the exit from the plant. As they move through the plant, they are heated until they have achieved the required degree of heat-stabilization and are then cooled, whereupon the heat-stabilizing process is completed. A heat-stabilizing tunnel provided for this purpose consequently has a heating section, a superheating and heat-stabilizing section, and a final cooling section. The individual sections can have additional sub-zones. The gradual heating and cooling that such an arrangement provides is preferred, in particular for the glass bottles used in the beverage industry, to prevent any destruction of the glass bottles caused by abrupt temperature changes. The transmission of heat to the product in the containers normally occurs by spraying these containers with water as they are advanced on a conveyor belt which allows the liquid to be sprayed from underneath. Underneath the conveyor belt are catch basins for the sprayed liquid from which the pumps for the spraying are fed. Heat can be exchanged by means of the spray liquid zone-wise between the zones to be heated and the zones to be cooled.

In at least one possible embodiment of the present invention, the containers to be heat-stabilized and the heat-stabilized containers preferably are bottles.

To achieve an optimal graduation of the temperatures in the individual sections, the sections are subdivided into individual zones. Generally, the heating section has three to four individual zones, the heat-stabilizing section has two or three zones, and there can be an additional superheating zone upstream of the heat-stabilizing zone. The following cooling section in turn has three to four individual zones, in which the containers are cooled by reducing the temperature of the spraying liquid in steps until the containers reach the desired output temperature.

To guarantee that the product in the containers achieves the specified degree of heat-stabilization, the individual spraying temperatures set must be adapted to the following factors, for example: the product, the length of the zones, and the speed of the conveyor belt.

Because such a heat-stabilization system is installed as part of a more comprehensive bottling plant and represents only a portion of this bottling plant, disruptions in the continuous feed of the containers, i.e., an interruption in the flow of containers, or disruptions in the removal of the containers, i.e., a production stoppage, can occur more or less frequently. The result of a production stoppage is that the taste of the products that are currently being held at the heat stabilization temperature can be adversely affected by excessive heat stabilization.

If there is an interruption in the container flow or if the plant runs empty, the thermal equilibrium between the products being heated and the products being cooled is disrupted so that initially the products leave the plant at an excessive temperature, later the heat-stabilized products are no longer cooled quickly enough, and finally the products that enter the heat-stabilizing section are no longer at the required heat stabilization temperature.

In other words, in known heat stabilizing systems, if there is an interruption in the container flow or if the heat stabilization or bottling plant runs empty, the thermal equilibrium between the products being heated and the products being cooled may be disrupted. As a result of such disruption, containers that enter the heat stabilizing section may not be at the required pasteurization temperature. These containers may not be cooled quickly enough after heat stabilization and therefore may leave the plant at an excessive temperature.

The consequences of the type of production disruption described above can be prevented by the controlled addition or removal of thermal energy. Generally, either heat is added to the process indirectly by means of heat exchangers or hot water is added directly from a central heat source and returned at a colder temperature. The removal of heat from the process is realized, as in the known art, by the addition of cold liquid, which is then removed at a higher temperature.

Thus, one object of the present invention may be to propose a method for the operation of such a bottling plant in which the response to disruptions in the container flow can be managed in an essentially optimum fashion with an essentially minimized utilization of the resources water and heat.

One characteristic of the process may be that each addition of heat required for regulation of the process may be followed after some delay by the removal of heat (and vice versa) on the same order of magnitude. In this regard, the teachings concerning the storage of the heat are described in some publications.

One disadvantage of the methods described in some publications, however, is that as a result of the collection of the liquid overflowing from the plant in a conduit or in a plurality of reservoirs, a mixing of the temperatures takes place so that the resulting temperature of the fluid in the reservoir cannot be used either for controlled cooling or for controlled heating. An additional disadvantage is that although heat is stored on a low temperature level, the liquid in question cannot be used for cooling, i.e., there is no conservation of water.

At least one possible embodiment of the present invention preferably teaches that to eliminate these disadvantages, the excess liquid in the heating section added by the regulation process to the zones in the method overflows in a cascade fashion from zone to zone of increasing overflow temperature; in the cooling section, overflows in cascade fashion from zone to zone of decreasing overflow temperature; from the last zone, i.e., the hottest zone in the heating section, overflows into an essentially warm liquid reservoir or tank 13; and from the coldest zone, position, or tank 10 in the cooling section, overflows into an essentially cold liquid reservoir or tank 14. Also, to eliminate the disadvantages of the known art, at least one possible embodiment of the present invention preferably teaches that the excess fluid added by the regulation process to the heat stabilizing section overflows from the zones into an essentially hot liquid reservoir 15.

In an independent realization of the invention, the liquid contained in the cold liquid reservoir 14 can be forcibly transported and used in a controlled fashion to cool at least the zones or tanks in the cooling section and in the heat stabilizing section; the liquid contained in the warm liquid reservoir 13 can be forcibly transported and used in a controlled fashion to heat at least the zones or tanks in the heating section or to cool the zones or tanks in the heat-stabilizing section; and the liquid in the hot liquid reservoir, after the addition of thermal energy, can be used in a controlled fashion to heat at least the zones or tanks in the heat stabilizing section.

As a result of the use of at least one possible embodiment of the present invention, the cold water in the initial portion of the heating section may be essentially gradually heated to the respective higher operating temperatures of the subsequent zones, and the water injected into the cooling section is in turn cooled down essentially gradually, as a function of the individual zones, which may lead to a particularly efficient use of energy. Additionally, when there is a disruption in the feed of the containers to be heat-stabilized, the quantity of water currently in the containers can be used for an essentially rapid cooling of the critical zones, as well as for an essentially rapid heating of these zones and the additional zones, as a result of which the consumption of fresh water can be reduced significantly.

In other words, in at least one possible embodiment of the present invention, water or other liquid, even in the event of a stoppage, interruption, or emptying of the bottling plant or heat stabilizing system, preferably is recycled from the cooling section to the heating section, for example, and vice versa. Also, in at least one possible embodiment of the present invention, water or other liquid, even in the event of a stoppage, interruption, or emptying of the bottling plant or heat stabilizing system, is maintained at an essentially constant temperature by means of tanks or reservoirs that may be centrally located in the bottling plant or heat stabilizing system.

One or more of the words "stabilizing", "stable", "stabilization", "stabilize", "stabilized", "heat-stabilizing", "heat stabilizing", "heat stabilization", "heat-stable", "heat-stabilized", "heat-stabilize", and "high heating", as well as variants thereof, one or more of which words may be used in this application, may mean one or more of the words "pasteurizing", "pasteurization", "pasteurized", and "pasteurize", as well as variants thereof, and vice versa.

The present invention may relate to a method for the operation of a pasteurizing plant or facility for pasteurizing products in containers, as well as to an apparatus that is suitable for the performance of the method.

In the beverage industry, in Particular when products being bottled are easily perishable, it is common practice to pasteurize the products. In pasteurizing plants of the known art, the containers that contain the products are transported in a practically uniform movement from the entry of the plant to the exit from the plant. As they move through the plant, they are heated until they have achieved the required degree of pasteurization and are then cooled, whereupon the pasteurizing process is completed. A pasteurizing tunnel provided for this purpose consequently has a heating section, a superheating and pasteurizing section, and a final cooling section. The individual sections can have additional sub-zones. The gradual heating and cooling that such an arrangement provides is preferred, in particular for the glass bottles used in the beverage industry, to prevent any destruction of the glass bottles caused by abrupt temperature changes. The transmission of heat to the product in the containers normally occurs by spraying these containers with water as they are advanced on a conveyor belt which allows the liquid to be sprayed from underneath. Underneath the conveyor belt are catch basins for the sprayed liquid from which the pumps for the spraying are fed. Heat can be exchanged by means of the spray liquid zone-wise between the zones to be heated and the zones to be cooled.

In at least one possible embodiment of the present invention, the containers to be pasteurized and the pasteurized containers preferably are bottles.

To achieve an optimal graduation of the temperatures in the individual sections, the sections are subdivided into individual zones. Generally, the heating section has three to four individual zones, the pasteurizing section has two or three zones, and there can be an additional superheating zone upstream of the pasteurizing zone. The following cooling section in turn has three to four individual zones, in which the containers are cooled by reducing the temperature of the spraying liquid in steps until the containers reach the desired output temperature.

To guarantee that the product in the containers achieves the specified degree of pasteurization, the individual spraying temperatures set must be adapted to the following factors, for example: the product, the length of the zones, and the speed of the conveyor belt.

Because such a pasteurization system may be installed as part of a more comprehensive bottling plant and may represent only a portion of this bottling plant, disruptions in the continuous feed of the containers, i.e., an interruption in the flow of containers, or disruptions in the removal of the containers, i.e., a production stoppage, can occur more or less frequently. The result of a production stoppage is that the taste of the products that are currently being held at the pasteurization temperature can be adversely affected by over-pasteurization.

If there is an interruption in the container flow or if the plant runs empty, the thermal equilibrium between the products being heated and the products being cooled is disrupted so that initially the products leave the plant at an excessive temperature, later the pasteurized products are no longer cooled quickly enough, and finally the products that enter the pasteurizing section are no longer at the required pasteurization temperature.

In other words, in known pasteurizing systems, if there is an interruption in the container flow or if the pasteurization or bottling plant runs empty, the thermal equilibrium between the products being heated and the products being cooled may be disrupted. As a result of such disruption, containers that enter the pasteurizing section may not be at the required pasteurization temperature. These containers may not be cooled quickly enough after pasteurization and therefore may leave the plant at an excessive temperature.

The consequences of the type of production disruption described above can be prevented by the controlled addition or removal of thermal energy. Generally, either heat is added to the process indirectly by means of heat exchangers or hot water is added directly from a central heat source and returned at a colder temperature. The removal of heat from the process is realized, as in the known art, by the addition of cold liquid, which is then removed at a higher temperature.

One possible object of the present invention may be to propose a method for the operation of such a pasteurizing plant in which the response to disruptions in the container flow can be managed in an essentially optimum fashion with an essentially minimized utilization of the resources water and heat.

One characteristic of the process may be that each addition of heat required for regulation of the process may be followed after some delay by the removal of heat (and vice versa) on the same order of magnitude. In this regard, the teachings concerning the storage of the heat are described in some publications.

One disadvantage of the methods described in some publications, however, is that as a result of the collection of the liquid overflowing from the plant in a conduit or in a plurality of reservoirs, a mixing of the temperatures takes place so that the resulting temperature of the fluid in the reservoir cannot be used either for controlled cooling or for controlled heating. An additional disadvantage is that although heat is stored on a low temperature level, the liquid in question cannot be used for cooling, i.e., there is no conservation of water.

At least one possible embodiment of the present invention teaches that to eliminate these disadvantages, the excess liquid in the heating section added by the regulation process to the zones in the method overflows in a cascade fashion from zone to zone of increasing overflow temperature; in the cooling section, overflows in cascade fashion from zone to zone of decreasing overflow temperature; from the last zone, i.e., the hottest zone in the heating section, overflows into an essentially warm liquid reservoir or tank 13; and from the coldest zone, position, or tank 10 in the cooling section, overflows into an essentially cold liquid reservoir or tank 14. Also, to eliminate the disadvantages of the known art, at least one possible embodiment of the present invention preferably teaches that the excess fluid added by the regulation process to the pasteurizing section overflows from the zones into an essentially hot liquid reservoir 15.

In an independent realization of the invention, the liquid contained in the cold liquid reservoir 14 can be forcibly transported and used in a controlled fashion to cool at least the zones or tanks in the cooling section and in the pasteurizing section; the liquid contained in the warm liquid reservoir 13 can be forcibly transported and used in a controlled fashion to heat at least the zones or tanks in the heating section or to cool the zones or tanks in the pasteurizing section; and the liquid in the hot liquid reservoir, after the addition of thermal energy, can be used in a controlled fashion to heat at least the zones or tanks in the pasteurizing section.

As a result of the use of at least one possible embodiment of the present invention, the cold water in the initial portion of the heating section may be essentially gradually heated to the respective higher operating temperatures of the subsequent zones, and the water injected into the cooling section is in turn cooled down essentially gradually, as a function of the individual zones, which may lead to a particularly efficient use of energy. Additionally, when there is a disruption in the feed of the containers to be pasteurized, the quantity of water currently in the containers can be used for an essentially rapid cooling of the critical zones, as well as for an essentially rapid heating of these zones and the additional zones, as a result of which the consumption of fresh water can be reduced significantly.

In other words, in at least one possible embodiment of the present invention, water or other liquid, even in the event of a stoppage, interruption, or emptying of the bottling plant or pasteurization system, preferably is recycled from the cooling section to the heating section, for example, and vice versa. Also, in at least one possible embodiment of the present invention, water or other liquid, even in the event of a stoppage, interruption, or emptying of the bottling plant or pasteurization system, is maintained at an essentially constant temperature by means of tanks or reservoirs that may be centrally located in the pasteurization system.

The present invention is explained in greater detail herein with reference to at least one exemplary embodiment, which is illustrated in the accompanying drawings as follows: FIG. 1A is a block diagram of a beverage bottling plant and its sections; FIG. 1 is a diagram of a pasteurizing plant; FIG. 2 is an enlarged reproduction of FIG. 1 with additional information; FIGS. 2A, 2B, 2C, 2D, 2E, and 2F are enlarged views of sections of FIG. 2; FIG. 2G is an enlarged view of the control system and microprocessor shown in FIG. 2; FIGS. 3–18 are flow charts for the operation of the pasteurizing system shown in FIGS. 2 and 2A–2G; FIG. 19 is essentially identical to FIG. 2 except for the substitution of a manual control arrangement for the microprocessor shown in FIG. 2; and FIG. 19A is an enlarged view of the manual control arrangement shown in FIG. 19.

One feature of the invention resides broadly in the method for the pasteurization of products in containers in a continuous container flow 1 by stationary, sequential sections for heating 2, pasteurizing 3 and cooling 4 by means of overflowing liquid, whereby the sections are graduated with respect to one another in terms of their liquid temperature, and for purposes of efficient heat exchange, recovery, or recycling are organized in pairs, so that the liquid is transported by overflow from a heating zone to a cooling zone and the liquid overflowing from this cooling zone is transported to the heating zone, and to set the desired temperature of the overflowing liquid, warmer or cooler liquid is added to the liquid being transported, characterized by the fact that the excess liquid in the heating section 2 added by the temperature regulation process to the zones in the method overflows in a cascade fashion from zone to zone of increasing overflow temperature, and in the cooling section 4 overflows in cascade fashion from zone to zone of decreasing overflow temperature, and from the last zone, i.e. the hottest zone 7 in the heating section overflows into a warm liquid reservoir 13, and from the coldest zone 10 in the cooling section into a cold liquid reservoir 14, and the excess fluid added by the regulation process to the pasteurizing section overflows from the zones into a hot liquid reservoir 15.

Another feature of the invention resides broadly in the method characterized by the fact that the liquid contained in the cold fluid reservoir 14 is used in a controlled fashion for cooling at least of the zones in the cooling section 4 and in the pasteurizing section 3, the fluid contained in the warm liquid reservoir 13 is used in a controlled fashion for the heating of at least the zones in the heating section 2 or for cooling of the zones in the pasteurizing section 3, and the liquid contained in the hot liquid reservoir 15, after the addition of thermal energy, can be used in a controlled fashion to heat at least the zones in the pasteurizing section 3.

Yet another feature of the invention resides broadly in the method characterized by the fact that the cold liquid reservoir 14 can overflow into the warm liquid reservoir 13.

Still another feature of the invention resides broadly in the method characterized by the fact that the hot liquid reservoir 15 can overflow into the warm liquid reservoir 13.

A further feature of the invention resides broadly in the method, characterized by the fact that the warm liquid reservoir 13 and the hot liquid reservoir 15 are divided in the direction of flow.

Another feature of the invention resides broadly in the method characterized by the fact that associated with the warm and hot liquid reservoirs 13, 15 are respective additional containers 16, 17 for the overflowing liquid.

Yet another feature of the invention resides broadly in the apparatus for the performance of the method described in the preceding claims, with a conveyor and a plurality of successive handling sections in a pasteurizing tunnel, characterized by the fact that the water of the heating zones 4–7 is conducted at least in part to the respective downstream zones of higher temperature, and no later than upstream of the superheating zone 8 is diverted into a first tank 13 of higher temperature, and the water of at least the superheating zone 8 and/or of the pasteurizing zone 9 can be fed to a second tank 15 of higher temperature, and this second tank 15 corresponds to an additional third tank 16 which is realized in the form of a hot water tank with a heating device, and there is a fourth tank 14 which is fed the water from the cooling zone 12, whereby this water can also be forcibly transported to the heating zone 5, and the water of the third tank 16 can be fed at least to the superheating and/or pasteurizing zone 8, 9.

Still another feature of the invention resides broadly in a method and an apparatus therefor for the pasteurization of products in containers in a continuous container flow by stationary, sequential sections for heating, pasteurizing, and cooling by means of overflowing liquid, whereby the sections are graduated with respect to one another in terms of their liquid temperature, and for purposes of efficient heat exchange are organized in pairs, so that the liquid is transported by overflow from a heating zone to a cooling zone and the liquid overflowing from this cooling zone is transported to the heating zone, and to set the desired temperature of the overflowing liquid, warmer or cooler liquid is added to the liquid being transported, characterized by the fact that the excess liquid in the heating section added by the temperature regulation process to the zones in the method overflows in a cascade fashion from zone to zone of increasing overflow temperature, and in the cooling section overflows in cascade fashion from zone to zone of decreasing overflow temperature, and from the hottest zone in the heating section overflows into a warm liquid reservoir, and from the coldest zone in the cooling section into a cold liquid reservoir, and the excess fluid added by the regulation process to the pasteurizing section overflows from the zones into a hot liquid reservoir.

A further feature of the invention resides broadly in a bottling plant for bottling beverages, said bottling plant comprising: a bottle rinsing section for rinsing bottles; a bottle filling section to receive bottles for spraying and to fill bottles with liquid; a bottle capping section for capping bottles; a bottle stabilizing section for stabilizing bottles, said bottle stabilizing section comprising: a plurality of spray arrangements, each of said plurality of spray arrangements being configured and disposed to spray liquid over at least one bottle; a plurality of tanks, said plurality of tanks being disposed to capture liquid from said plurality of spray arrangements; a plurality of tank arrangements configured to receive liquid from said plurality of tanks and to supply liquid to said plurality of tanks; an arrangement interconnecting said plurality of spray arrangements, said plurality of tanks, and said plurality of tank arrangements among one another to adjust characteristics and flow of liquid circulating in said bottle stabilizing section in response to interruptions of movement of bottles in said bottle stabilizing section.

Another feature of the invention resides broadly in a bottling plant wherein said bottle stabilizing section further comprises: a control system for controlling said bottle stabilizing section; said plurality of tank arrangements comprise at least three tank arrangements; said plurality of spray arrangements comprise a first spray arrangement and a second spray arrangement; and said interconnecting arrangement further comprises: at least one pump arrangement for recycling liquid in said plurality of tanks from at least said first spray arrangement to at least said second spray arrangement and from at least said second spray arrangement to at least said first spray arrangement; and an arrangement to configure and dispose each of said plurality of tanks to supply said plurality of spray arrangements with liquid.

Yet another feature of the invention resides broadly in a bottling plant wherein said bottle stabilizing section further comprises: a conveyance arrangement for moving bottles; said at least two spray arrangements comprise at least three spray arrangements; at least one pump, said at least one pump being configured to supply liquid to at least one of said at least three spray arrangements; at least one valve, said at least one valve being configured to regulate liquid flow into at least one of said at least three spray arrangements; said characteristics of liquid circulating in said interconnecting arrangement comprise temperature; said at least three tank arrangements comprise a first tank arrangement, a second tank arrangement, and a third tank arrangement; each of said first tank arrangement, said second tank arrangement, and said third tank arrangement is configured to hold liquid; said interconnecting arrangement further comprises: a heat exchanger, said heat exchanger being configured to regulate liquid temperature in at least one of said at least three tank arrangements; an arrangement to dispose said plurality of tanks generally below said conveyance arrangement; an arrangement to configure and dispose each of said plurality of tanks to provide liquid to bottles; an arrangement to configure and dispose said conveyance arrangement to move bottles generally above said plurality of tanks; an arrangement to dispose each of said at least three spray arrangements generally above at least one of said plurality of tanks; an arrangement to configure and dispose each of said plurality of tanks to supply, using said at least one pump and said at least one valve, liquid to at least one of said at least three spray arrangements; an arrangement to configure and dispose said at least three tank arrangements to maintain predetermined liquid temperature in each of said at least three spray arrangements; and an arrangement to configure and dispose said at least three tank arrangements to supply liquid in said at least three tank arrangements to at least one of said plurality of tanks, said at least one valve, said at least one pump, and said at least three spray arrangements in the event of an interruption in movement of bottles along said conveyance arrangement.

Still another feature of the invention resides broadly in a bottling plant wherein said interconnecting arrangement further comprises: an overflow apparatus, said overflow apparatus being disposed generally at said second tank arrangement; and an arrangement to configure and dispose said overflow apparatus to permit overflow of liquid from said second tank arrangement into said first tank arrangement to increase liquid temperature in said first tank arrangement.

A further feature of the invention resides broadly in a bottling plant wherein said interconnecting arrangement further comprises: an overflow arrangement, said overflow arrangement being disposed generally at said third tank arrangement; and an arrangement to configure and dispose said overflow arrangement to permit overflow of liquid from said third tank arrangement into said first tank arrangement to lower liquid temperature in said first tank arrangement.

Another feature of the invention resides broadly in a bottling plant wherein said interconnecting arrangement further comprises: an overflow apparatus, said overflow apparatus being disposed generally at said second tank arrangement; an overflow arrangement, said overflow arrangement being disposed generally at said third tank arrangement; an arrangement to configure and dispose said overflow apparatus to permit overflow of liquid from said second tank arrangement into said first tank arrangement to increase liquid temperature in said first tank arrangement; and an arrangement to configure and dispose said overflow arrangement to permit overflow of liquid from said third tank arrangement into said first tank arrangement to lower liquid temperature in said first tank arrangement.

Yet another feature of the invention resides broadly in a bottling plant wherein said bottle stabilizing section further comprises: at least three position sensors for sensing a position of at least one bottle; each of said at least three position sensors is located generally at at least one of said plurality of tanks: said at least three position sensors are configured to sense a position of at least one bottle generally below at least one of said at least three spray arrangements; said at least three tank arrangements further comprise: a fourth tank arrangement, said fourth tank arrangement being configured to hold liquid at a predetermined temperature; and a fifth tank arrangement, said fifth tank arrangement being configured to hold liquid at a predetermined temperature; the predetermined temperature of liquid in said fourth tank arrangement is higher than the predetermined temperature of liquid in each of said first tank arrangement and said fourth tank arrangement; the predetermined temperature of liquid in said third tank arrangement is lower than the predetermined temperature of liquid in each of said first tank arrangement, said second tank arrangement, said third tank arrangement, and said fourth tank arrangement; said plurality of tanks comprise at least three tanks; and said interconnecting arrangement further comprises: an arrangement to configure and dispose said tank arrangements to maintain predetermined temperature of liquid in each of said plurality of spray arrangements; an arrangement to configure and dispose said tank arrangements to supply liquid in said tank arrangements to at least one of said at least three tanks, said at least one valve, said at least one pump, and said at least three spray arrangements in the event of an interruption in movement of bottles along said conveyance arrangement; and an arrangement to configure and dispose said heat exchanger to regulate liquid temperature in at least one of said tank arrangements.

Still another feature of the invention resides broadly in a bottling plant wherein: said control system further comprises a microprocessor for controlling said control system; and said bottle stabilizing section further comprises: said at least three tanks comprise at least eight tanks; said at least three spray arrangements comprise at least eight spray arrangements; and said at least three position sensors comprise at least eight position sensors.

A further feature of the invention resides broadly in a bottling plant said control system comprises: a manual control system for controlling said bottling plant, said manual control system comprising: a control panel for operating said manual control system; and a display arrangement for displaying information relating to said manual control system.

One feature of the invention resides broadly in a container stabilizing section for stabilizing liquid in containers in a plant for filling containers, said plant for filling containers comprising: a container rinsing section for rinsing containers; a container filling section to receive containers for spraying and to fill containers with liquid; a container sealing section for sealing containers; and said container stabilizing section comprising: a plurality of spray arrangements; a plurality of tanks; an interconnecting arrangement to interconnect said plurality of spray arrangements and said plurality of tanks among one another to adjust temperature and flow of liquid circulating in said container stabilizing section in response to interruptions of movement of containers in said container stabilizing section.

Another feature of the invention resides in a container stabilizing section wherein: said interconnecting arrangement further comprises an arrangement to configure and dispose each of said plurality of tanks to supply said plurality of spray arrangements with liquid; and said interconnecting arrangement is configured and disposed to maintain temperature of containers at predetermined temperatures at predetermined locations in said container stabilizing section during interruptions of movement of containers in said container stabilizing section.

Yet another feature of the invention resides in a container stabilizing section wherein said container stabilizing section further comprises: a conveyance arrangement for moving containers; at least one pump, said at least one pump being configured to supply liquid to at least one of said plurality of spray arrangements; at least one valve, said at least one valve being configured to regulate liquid flow into at least one of said plurality of spray arrangements; a plurality of tank arrangements configured to receive liquid from said plurality of tanks and to supply liquid to said plurality of tanks; and said interconnecting arrangement further comprises: an arrangement to dispose said plurality of tanks generally below said conveyance arrangement; an arrangement to configure and dispose each of said plurality of tanks to provide liquid to containers; an arrangement to configure and dispose said conveyance arrangement to move containers generally above said plurality of tanks; an arrangement to dispose each of said plurality of spray arrangements generally above at least one of said plurality of tanks; an arrangement to configure and dispose each of said plurality of tanks to supply, using said at least one pump and said at least one valve, liquid to at least one of said plurality of spray arrangements; an arrangement to configure and dispose said plurality of tank arrangements to maintain predetermined liquid temperature in each of said plurality of spray arrangements, and an arrangement to configure and dispose said plurality of tank arrangements to supply liquid in said plurality of tank arrangements to at least one of said plurality of tanks, said at least one valve, said at least one pump, and said plurality of spray arrangements in the event of an interruption in movement of containers along said conveyance arrangement.

Still another feature of the invention resides broadly in a container stabilizing section wherein said container stabilizing section comprises a pasteurizing section for pasteurizing containers and further comprises: said plurality of tank arrangements comprise a first tank arrangement, a second tank arrangement, and a third tank arrangement; each of said first tank arrangement, said second tank arrangement, and said third tank arrangement is configured to hold liquid; said interconnecting arrangement further comprises: a first overflow arrangement, said first overflow arrangement being disposed generally at said second tank arrangement; a second overflow arrangement, said second overflow arrangement being disposed generally at said third tank arrangement; an arrangement to configure and dispose said first overflow arrangement to permit overflow of liquid from said second tank arrangement into said first tank arrangement to increase liquid temperature in said first tank arrangement; and an arrangement to configure and dispose said second overflow arrangement to permit overflow of liquid from said third tank arrangement into said first tank arrangement to lower liquid temperature in said first tank arrangement.

A further feature of the invention resides broadly in a container stabilizing section wherein said container stabilizing section further comprises: each of said plurality of spray arrangements is configured and disposed to spray liquid at a predetermined temperature; said interconnecting arrangement further comprises: a heat exchanger, said heat exchanger being configured to regulate liquid temperature in at least one of said plurality of tank arrangements; an arrangement to configure and dispose said plurality of tank arrangements to maintain predetermined temperature of liquid in each of said plurality of spray arrangements; an arrangement to configure and dispose said tank arrangements to supply liquid in said tank arrangements to at least one of said plurality of tanks, said at least one valve, said at least one pump, and said plurality of spray arrangements in the event of an interruption in movement of containers along said conveyance arrangement; and an arrangement to configure and dispose said heat exchanger to regulate liquid temperature in at least one of said plurality of tank arrangements.

Another feature of the invention resides broadly in a method for stabilizing containers in a container filling plant, said container filling plant comprising: a conveyance arrangement for moving containers through said container filling plant; a container stabilizing section for stabilizing liquid in containers; said container stabilizing section comprising: a plurality of spray arrangements, each of said plurality of spray arrangements being configured and disposed to spray liquid over at least one container; a plurality of tanks; an interconnecting arrangement to interconnect said plurality of spray arrangements and said plurality of tanks among one another to adjust temperature and flow of liquid circulating in said container stabilizing section in response to interruptions of movement of containers in said container stabilizing section; and said interconnecting arrangement being configured and disposed to maintain temperature of containers at predetermined temperatures at predetermined locations in said container stabilizing section during interruptions of movement of containers in said container stabilizing section; and said method comprising the steps of: moving containers along said conveyance arrangement; spraying containers with liquid using said plurality of spray arrangements; adjusting temperature and flow of liquid circulating in said container stabilizing section in response to interruptions of movement of containers in said container stabilizing section; and maintaining temperature of containers at predetermined temperatures at predetermined locations in said container stabilizing section during interruptions of movement of containers in said container stabilizing section.

Yet another feature of the invention resides broadly in a method wherein: said container stabilizing section further comprises a container heating section for heating containers and a container cooling section for cooling containers; said interconnecting arrangement further comprises an arrangement to configure and dispose each of said plurality of tanks to supply said plurality of spray arrangements with liquid; and said interconnecting arrangement is configured and disposed to maintain temperature of containers at predetermined temperatures at predetermined locations in said container stabilizing section during interruptions of movement of containers in said container stabilizing section; and said method further comprises: said step of moving comprises moving containers generally below at least one of said plurality of spray arrangements; said step of spraying comprises using at least one of said plurality of tanks; the steps of: heating at least one container; stabilizing at least one container in said container stabilizing section to form at least one stabilized product; cooling at least one stabilized product; and removing at least one stabilized product from said container filling plant.

Still another feature of the invention resides broadly in a method wherein said container stabilizing section further comprises: at least one pump, said at least one pump being configured to supply liquid to at least one of said plurality of spray arrangements; at least one valve, said at least one valve being configured to regulate liquid flow into at least one of said plurality of spray arrangements; a plurality of tank arrangements configured to receive liquid from said plurality of tanks and to supply liquid to said plurality of tanks; and said interconnecting arrangement further comprises: an arrangement to dispose said plurality of tanks generally below said conveyance arrangement; an arrangement to configure and dispose each of said plurality of tanks to provide liquid to containers; an arrangement to configure and dispose said conveyance arrangement to move containers generally above said plurality of tanks; an arrangement to dispose each of said plurality of spray arrangements generally above at least one of said plurality of tanks; an arrangement to configure and dispose each of said plurality of tanks to supply, using said at least one pump and said at least one valve, liquid to at least one of said plurality of spray arrangements; an arrangement to configure and dispose said plurality of tank arrangements to maintain predetermined liquid temperature in each of said plurality of spray arrangements; and an arrangement to configure and dispose said plurality of tank arrangements to supply liquid in said plurality of tank arrangements to at least one of said plurality of tanks, said at least one valve, said at least one pump, and said plurality of spray arrangements in the event of an interruption in movement of containers along said conveyance arrangement.

A further feature of the invention resides broadly in a method wherein said container stabilizing section comprises a pasteurizing section for pasteurizing containers and further comprises: said plurality of tank arrangements comprise a first tank arrangement, a second tank arrangement, and a third tank arrangement; each of said first tank arrangement, said second tank arrangement, and said third tank arrangement is configured to hold liquid; and said interconnecting arrangement further comprises: a first overflow arrangement, said first overflow arrangement being disposed generally at said second tank arrangement; a second overflow arrangement, said second overflow arrangement being disposed generally at said third tank arrangement; an arrangement to configure and dispose said first overflow arrangement to permit overflow of liquid from said second tank arrangement into said first tank arrangement to increase liquid temperature in said first tank arrangement; and an arrangement to configure and dispose said second overflow arrangement to permit overflow of liquid from said third tank arrangement into said first tank arrangement to lower liquid temperature in said first tank arrangement; and said method further comprises: overflowing liquid from said second tank arrangement into said first tank arrangement to increase liquid temperature in said first tank arrangement; overflowing liquid from said third tank arrangement into said first tank arrangement to lower liquid temperature in said first tank arrangement; and said step of stabilizing at least one container further comprises pasteurizing at least one container.

Another feature of the invention resides broadly in a method wherein said container stabilizing section further comprises: each of said plurality of spray arrangements is configured and disposed to spray liquid at a predetermined temperature; said interconnecting arrangement further comprises: a heat exchanger, said heat exchanger being configured to regulate liquid temperature in at least one of said plurality of tank arrangements; an arrangement to configure and dispose said plurality of tank arrangements to maintain predetermined temperature of liquid in each of said plurality of spray arrangements; an arrangement to configure and dispose said tank arrangements to supply liquid in said tank arrangements to at least one of said plurality of tanks, said at least one valve, said at least one pump, and said plurality of spray arrangements in the event of an interruption in movement of containers along said conveyance arrangement; and an arrangement to configure and dispose said heat exchanger to regulate liquid temperature in at least one of said plurality of tank arrangements.

Yet another feature of the invention resides broadly in a method wherein said step of spraying comprises using at least one of (a), (b), (c), (d), and (e), where (a), (b), (c), (d), and (e) are the following: (a) at least one of said plurality of tanks; (b) at least one of said plurality of tank arrangements; (c) at least one of said plurality of spray arrangements; (d) said at least one pump; and (e) said at least one valve.

Still another feature of the invention resides broadly in a bottling plant for bottling beverages, said bottling plant comprising: a control system for controlling said bottling plant; a bottle rinsing section; a bottle filling section; a bottle capping section; a bottle stabilizing section; a bottle labeling section; at least two spray arrangements, said at least two spray arrangements being disposed to spray a liquid over at least one bottle; a plurality of tanks, said plurality of tanks being disposed to capture said liquid from said at least two spray arrangements; said plurality of tanks being disposed to supply said at least two spray arrangements with said liquid; at least three tank arrangements, said at least three tank arrangements being disposed to maintain the temperature of said liquid; said at least two spray arrangements comprising a first spray arrangement and a second spray arrangement; and at least one pump arrangement for recycling said liquid in said plurality of tanks from at least said first spray arrangement to at least said second spray arrangement and vice versa.

A further feature of the invention resides broadly in a method for stabilizing bottled beverages, said method comprising: a stabilizing system, said stabilizing system comprising: a control system for controlling said stabilizing system; a microprocessor for controlling said control system; a conveyance arrangement for moving at least two bottles; at least two bottles; at least three tanks, each of said at least three tanks being configured to hold a liquid at a predetermined temperature; said at least three tanks being disposed generally below said conveyance arrangement; said at least three tanks being disposed to provide liquid to said at least two bottles; said conveyance arrangement being configured to move said at least two bottles generally above said at least three tanks; at least three spray arrangements for spraying said at least two bottles, each of said at least three spray arrangements being disposed generally above at least one of said at least three tanks; said at least three spray arrangements being configured to spray at least one of said at least two bottles; each of said at least three tanks being configured to supply, using at least one pump and at least one valve, at least one liquid to at least one of said at least three spray arrangements; at least three position sensors for sensing a position of at least one of said at least two bottles, each of said at least three position sensors being located generally at at least one of said at least three tanks; said at least three position sensors being configured to sense a position of at least one of said at least two bottles generally below at least one of said at least three spray arrangements; at least three tank arrangements, said at least three tank arrangements comprising a first tank arrangement, a second tank arrangement, and a third tank arrangement; said first tank arrangement being configured to hold a liquid at a predetermined temperature; said second tank arrangement being configured to hold a liquid at a predetermined temperature; said third tank arrangement being configured to hold a liquid at a predetermined temperature; said predetermined temperature of said liquid in said first tank arrangement being lower than said predetermined temperature of said liquid in said second tank arrangement; said predetermined temperature of said liquid in said third tank arrangement being lower than said predetermined temperature of said liquid in each of said first tank arrangement and said second tank arrangement; said at least three tank arrangements being configured to supply said liquid in said at least three tank arrangements to at least one of said at least three tanks, said at least one valve, said at least one pump, and said at least three spray arrangements in the event of an interruption in the movement of said at least two bottles along said conveyance arrangement; and an exchanger, said exchanger being configured to regulate the temperature of said liquid in at least one of said at least three tank arrangements; and said method comprising the steps of: moving said at least two bottles along said conveyance arrangement and generally below at least one of said at least three spray arrangements; sensing, using at least one of said at least three position sensors, an interruption in the movement of at least one of said at least two bottles along said conveyance arrangement; sensing, using at least one of said at least three position sensors, a position of at least one of said at least two bottles generally below at least one of said at least three spray arrangements; spraying said at least one of said at least two bottles with a liquid of a predetermined temperature; said step of spraying comprising using at least one of said at least three tanks, at least one of said at least three tank arrangements, at least one of said at least three spray arrangements, at least one pump, and said at least one valve; stabilizing said at least two bottles to form at least two stabilized bottled products; cooling said at least two stabilized bottled products to a predetermined temperature; and removing said at least two stabilized bottled products from said stabilizing system.

Another feature of the invention resides broadly in a method wherein: said second tank arrangement comprises an overflow arrangement; and said overflow arrangement of said second tank arrangement is disposed to permit overflow of said liquid from said second tank arrangement into said first tank arrangement.

Yet another feature of the invention resides broadly in a method wherein: said third tank arrangement comprises an overflow arrangement; and said overflow arrangement of said third tank arrangement is disposed to permit overflow of said liquid from said third tank arrangement into said first tank arrangement.

Still another feature of the invention resides broadly in a method wherein: said second tank arrangement comprises an overflow arrangement; said overflow arrangement of said second tank arrangement is disposed to permit overflow of said liquid from said second tank arrangement into said first tank arrangement; said third tank arrangement comprises an overflow arrangement; and said overflow arrangement of said third tank arrangement is disposed to permit overflow of said liquid from said third tank arrangement into said first tank arrangement.

A further feature of the invention resides broadly in a method wherein said stabilizing system further comprises: a fourth tank arrangement, said fourth tank arrangement being configured to hold a liquid at a predetermined temperature; a fifth tank arrangement, said fifth tank arrangement being configured to hold a liquid at a predetermined temperature; said predetermined temperature of said liquid in said fourth tank arrangement is higher than said predetermined temperature of said liquid in each of said first tank arrangement and said second tank arrangement; said predetermined temperature of liquid in said fifth tank arrangement is lower than said predetermined temperature of said liquid in each of said first tank arrangement, said second tank arrangement, said third tank arrangement, and said fourth tank arrangement; said tank arrangements is configured to supply said liquid in said tank arrangements to at least one of said at least three tanks, said at least one valve, said at least one pump, and said at least three spray arrangements in the event of an interruption in the movement of said at least two bottles along said conveyance arrangement; said heat exchanger is configured to regulate the temperature of liquid in at least one of said tank arrangements; and said step of spraying comprises using at least one of (a), (b), (c), (d), and (e), where (a), (b), (c), (d), and (e) are the following: (a) at least one of said at least three tanks; (b) at least one of said tank arrangements; (c) at least one of said at least three spray arrangements; (d) said at least one pump; and (e) said at least one valve.

Another feature of the invention resides broadly in a method according wherein said stabilizing system comprises: a manual control system for controlling said stabilizing system, said manual control system comprising: a control panel for operating said manual control system; and a display arrangement for displaying information relating to said manual control system; a conveyance arrangement for moving at least two bottles; at least two bottles; at least three tanks, each of said at least three tanks being configured to hold a liquid at a predetermined temperature; said at least three tanks are disposed generally below said conveyance arrangement; said at least three tanks are disposed to provide liquid to said at least two bottles; said conveyance arrangement is configured to move said at least two bottles generally above said at least three tanks; at least three spray arrangements for spraying said at least two bottles, each of said at least three spray arrangements being disposed generally above at least one of said at least three tanks; each of said at least three spray arrangements is configured to spray at least one of said at least two bottles; each of said at least three tanks is configured to supply, using at least one pump and at least one valve, at least one liquid to at least one of said at least three spray arrangements; at least three position sensors for sensing a position of at least one of said at least two bottles, each of said at least three position sensors being located generally at at least one of said at least three tanks; said at least three position sensors are configured to sense a position of at least one of said at least two bottles generally below at least one of said at least three spray arrangements; at least three tank arrangements, said at least three tank arrangements comprising a first tank arrangement, a second tank arrangement, and a third tank arrangement; said first tank arrangement is configured to hold a liquid at a predetermined temperature; said second tank arrangement is configured to hold a liquid at a predetermined temperature; said third tank arrangement is configured to hold a liquid at a predetermined temperature; said predetermined temperature of said liquid in said first tank arrangement is lower than said predetermined temperature of said liquid in said second tank arrangement; said predetermined temperature of said liquid in said third tank arrangement is lower than said predetermined temperature of said liquid in each of said first tank arrangement and said second tank arrangement; said at least three tank arrangements are configured to supply said liquid in said at least three tank arrangements to at least one of said at least three tanks, said at least one valve, said at least one pump, and said at least three spray arrangements in the event of an interruption in the movement of said at least two bottles along said conveyance arrangement; and an exchanger, said exchanger being configured to regulate the temperature of the liquid in at least one of said at least three tank arrangements.

Yet another feature of the invention resides broadly in a method wherein said stabilizing system further comprises: said second tank arrangement comprises an overflow arrangement; said overflow arrangement of said second tank arrangement is disposed to permit overflow of said liquid from said second tank arrangement into said first tank arrangement; said third tank arrangement comprises an overflow arrangement; said overflow arrangement of said third tank arrangement is disposed to permit overflow of said liquid from said third tank arrangement into said first tank arrangement; a fourth tank arrangement, said fourth tank arrangement being configured to hold a liquid at a predetermined temperature; a fifth tank arrangement, said fifth tank arrangement being configured to hold a liquid at a predetermined temperature; said predetermined temperature of said liquid in said fourth tank arrangement is higher than said predetermined temperature of said liquid in each of said first tank arrangement and said second tank arrangement; said predetermined temperature of liquid in said fifth tank arrangement is lower than said predetermined temperature of said liquid in each of said first tank arrangement, said second tank arrangement, said third tank arrangement, and said fourth tank arrangement; said tank arrangements are configured to supply said liquid in said tank arrangements to at least one of said at least three tanks, said at least one valve, said at least one pump, and said at least three spray arrangements in the event of an interruption in the movement of said at least two bottles along said conveyance arrangement; and said heat exchanger is configured to regulate the temperature of liquid in at least one of said tank arrangements; and said step of spraying comprises using at least one of (i), (ii), (iii), (iv), and (v), where (i), (ii), (iii), (iv), and (v) are the following: (i) at least one of said at least three tanks; (ii) at least one of said tank arrangements; (iii) at least one of said at least three spray arrangements; (iv) said at least one pump; and (v) said at least one valve.

Still another feature of the invention resides broadly in a method for stabilizing bottled beverages, said method comprising: a stabilizing system, said stabilizing system comprising: a control system for controlling said stabilizing system; a microprocessor for controlling said control system; a conveyance arrangement for moving at least two bottles; at least two bottles; at least eight tanks, each of said at least eight tanks being configured to hold a liquid at a predetermined temperature; said at least eight tanks being disposed generally below said conveyance arrangement; said at least eight tanks comprising: at least one tank for heating said at least two bottles; at least one tank for stabilizing said at least two bottles; and at least one tank for cooling said at least two bottles; said conveyance arrangement being configured to move said at least two bottles generally above said at least eight tanks; at least eight spray arrangements for spraying said at least two bottles, each of said at least eight spray arrangements being disposed generally above at least one of said at least eight tanks; said at least eight spray arrangements being configured to spray at least one of said at least two bottles; each of said at least eight tanks being configured to supply, using at least one pump and at least one valve, at least one liquid to at least one of said at least eight spray arrangements; at least eight position sensors for sensing a position of at least one of said at least two bottles, each of said at least eight position sensors being located generally at at least one of said at least eight tanks; said at least eight position sensors being configured to sense a position of at least one of said at least two bottles generally below at least one of said at least eight spray arrangements; a first tank arrangement, said first tank arrangement being configured to hold a liquid at a predetermined temperature; a second tank arrangement, said second tank arrangement being configured to hold a liquid at a predetermined temperature; a third tank arrangement, said third tank arrangement being configured to hold a liquid at a predetermined temperature; a fourth tank arrangement, said fourth tank arrangement being configured to hold a liquid at a predetermined temperature; a fifth tank arrangement, said fifth tank arrangement being configured to hold a liquid at a predetermined temperature; said predetermined temperature of said liquid in each of said third tank arrangement and said fourth tank arrangement being higher than said predetermined temperature of said liquid in each of said first tank arrangement and said second tank arrangement; said predetermined temperature of said liquid in said fifth tank arrangement being lower than said predetermined temperature of said liquid in each of said first tank arrangement, said second tank arrangement, said third tank arrangement, and said fourth tank arrangement; said tank arrangements being configured to supply said liquid in said tank arrangements to at least one of said at least eight tanks, said at least one valve, said at least one pump, and said at least eight spray arrangements in the event of an interruption in the movement of said at least two bottles along said conveyance arrangement; an exchanger, said exchanger being configured to regulate the temperature of said liquid in at least one of said tank arrangements; and said method comprising the steps of: moving said at least two bottles along said conveyance arrangement and generally below at least one of said at least eight spray arrangements; sensing, using at least one of said at least eight position sensors, an interruption in the movement of at least one of said at least two bottles along said conveyance arrangement; sensing, using at least one of said at least eight position sensors, a position of at least one of said at least two bottles generally below at least one of said at least eight spray arrangements; spraying said at least one of said at least two bottles with a liquid of a predetermined temperature; said step of spraying comprising using at least one of said at least eight tanks, at least one of said tank arrangements, at least one of said at least eight spray arrangements, said at least one pump, and said at least one valve, said at least two bottles in the event of an interruption in the movement of said at least two bottles along said conveyance arrangement; stabilizing said at least two bottles to form at least two stabilized bottled products; cooling said at least two stabilized bottled products to a predetermined temperature; and removing said at least two stabilized bottled products from said stabilizing system.

A further feature of the invention resides broadly in a method wherein: said second tank arrangement comprises an overflow arrangement; and said overflow arrangement of said second tank arrangement is disposed to permit overflow of said liquid from said second tank arrangement into said first tank arrangement.

Another feature of the invention resides broadly in a method wherein: said third tank arrangement comprises an overflow arrangement; and said overflow arrangement of said third tank arrangement is disposed to permit overflow of said liquid from said third tank arrangement into said first tank arrangement.

Yet another feature of the invention resides broadly in a method wherein: said second tank arrangement comprises an overflow arrangement; said overflow arrangement of said second tank arrangement is disposed to permit overflow of said liquid from said second tank arrangement into said first tank arrangement; said third tank arrangement comprises an overflow arrangement; and said overflow arrangement of said third tank arrangement is disposed to permit overflow of said liquid from said third tank arrangement into said first tank arrangement.

Still another feature of the invention resides broadly in a method wherein said stabilizing system comprises: a manual control system for controlling said stabilizing system, said manual control system comprising: a control panel for operating said manual control system; and a display arrangement for displaying information relating to said manual control system; a conveyance arrangement for moving at least two bottles; at least two bottles; at least eight tanks, each of said at least eight tanks being configured to hold a liquid at a predetermined temperature; said at least eight tanks are disposed generally below said conveyance arrangement; said at least eight tanks comprise: at least one tank for heating said at least two bottles; at least one tank for stabilizing said at least two bottles; and at least one tank for cooling said at least two bottles; said conveyance arrangement is configured to move said at least two bottles generally above said at least eight tanks; at least eight spray arrangements for spraying said at least two bottles, each of said at least eight spray arrangements being disposed generally above at least one of said at least eight tanks; said at least eight spray arrangements are configured to spray at least one of said at least two bottles; each of said at least eight tanks is configured to supply, using at least one pump and at least one valve, at least one liquid to at least one of said at least eight spray arrangements; at least eight position sensors for sensing a position of at least one of said at least two bottles, each of said at least eight position sensors being located generally at at least one of said at least eight tanks; said at least eight position sensors are configured to sense a position of at least one of said at least two bottles generally below at least one of said at least eight spray arrangements; a first tank arrangement, said first tank arrangement being configured to hold a liquid at a predetermined temperature; a second tank arrangement, said second tank arrangement being configured to hold a liquid at a predetermined temperature; a third tank arrangement, said third tank arrangement being configured to hold a liquid at a predetermined temperature; a fourth tank arrangement, said fourth tank arrangement being configured to hold a liquid at a predetermined temperature; a fifth tank arrangement, said fifth tank arrangement being configured to hold a liquid at a predetermined temperature; said predetermined temperature of said liquid in each of said third tank arrangement and said fourth tank arrangement is higher than said predetermined temperature of said liquid in each of said first tank arrangement and said second tank arrangement; said predetermined temperature of said liquid in said fifth tank arrangement is lower than said predetermined temperature of said liquid in each of said first tank arrangement, said second tank arrangement, said third tank arrangement, and said fourth tank arrangement; said tank arrangements are configured to supply said liquid in said tank arrangements to at least one of said at least eight tanks, said at least one valve, said at least one pump, and said at least eight spray arrangements in the event of an interruption in the movement of said at least two bottles along said conveyance arrangement; and an exchanger, said exchanger being configured to regulate the temperature of said liquid in at least one of said tank arrangements.

A further feature of the invention resides broadly in a method wherein: said second tank arrangement comprises an overflow arrangement; said overflow arrangement of said second tank arrangement is disposed to permit overflow of said liquid from said second tank arrangement into said first tank arrangement; said third tank arrangement comprises an overflow arrangement; and said overflow arrangement of said third tank arrangement is disposed to permit overflow of said liquid from said third tank arrangement into said first tank arrangement.

One feature of the invention resides broadly in a method wherein stationary, sequential sections for heating, stabilizing, and cooling by means of spraying liquid over products in containers are graduated with respect to one another in terms of their liquid temperature, and for purposes of efficient heat exchange are organized in pairs, so that the liquid is transported to the heating zone to a cooling zone and the liquid overflowing from this cooling zone is transported to the heating zone, and to set the desired temperature of the overflowing liquid, warmer or cooler liquid is added to the liquid being transported, and the excess liquid in the heating section added by the temperature regulation process to the zones overflows in a cascade fashion from zone to zone of increasing overflow temperature, and in the cooling section overflows in cascade fashion from zone to zone of decreasing overflow temperature, and from the last zone in the heating section overflows into a warm liquid reservoir, and from the coldest zone in the cooling section into a cold liquid reservoir, and the excess fluid added by the regulation process to the stabilizing section overflows from the zones into a hot liquid reservoir.

Another feature of the invention resides broadly in a method wherein the liquid contained in the cold fluid reservoir is used in a controlled fashion for cooling at least one of the zones in the cooling section and in the stabilizing section, the fluid contained in the warm liquid reservoir is used in a controlled fashion for the heating of at least the zones in the heating section or for cooling of the zones in the stabilizing section, and the liquid contained in the hot liquid reservoir, after the addition of thermal energy, can be used in a controlled fashion to heat at least the zones in the stabilizing section.

Yet another feature of the invention resides broadly in a method wherein the cold liquid reservoir can overflow into the warm liquid reservoir.

Still another feature of the invention resides broadly in a method wherein the hot liquid reservoir can overflow into the warm liquid reservoir.

A further feature of the invention resides broadly in a method wherein associated with the warm and hot liquid reservoirs are respective additional containers for the overflowing liquid.

Another feature of the invention resides broadly in an apparatus, with a conveyor and a plurality of successive handling sections in a stabilizing tunnel, wherein the liquid of the heating zones is conducted at least in part to the respective downstream zones of higher temperature, and no later than upstream of the heating zone is diverted into a first tank of higher temperature, and the water of at least the heating zone and/or the stabilizing zone can be fed to a second tank of higher temperature, and this second tank corresponds to an additional third tank which is realized in the form of a hot water tank with a heating device, and there is a fourth tank which is fed the water from the cooling zone, whereby this water can also be forcibly transported to the heating zone, and the water of the third tank can be fed at least to the heating and/or the stabilizing zone.

Some examples of computer systems and methods and their components that may be used or adapted for use in at least one possible embodiment of the present invention may be found in U.S. Pat. No. 5,379,428, entitled "Hardware Process Scheduler and Processor Interrupter for Parallel Processing Computer Systems" and issued to Belo on Jan. 3, 1995; U.S. Pat. No. 5,398,333, entitled "Personal Computer Employing Reset Button to Enter ROM-based Diagnostics" and issued to Shieve et al. on Mar. 14, 1995; U.S. Pat. No. 5,390,301, entitled "Method and Apparatus for Communicating Device-Specific Information Between a Device Driver and an Operating System in a Computer System" and issued to Scherf on Feb. 14, 2995; U.S. Pat. No. 5,404,544, entitled "System for Periodically Transmitting Signal to/from Sleeping Node Identifying its Existence to a Network and Awakening the Sleeping Node Responding to Received Instruction" and issued to Crayford on Apr. 4, 1995; U.S. Pat. No. 5,418,942, entitled "System and Method for Storing and Managing Information" and issued to Krawchuk on May 23, 1995; U.S. Pat. No. 5,479,355, entitled "System and Method for a Closed Loop Operation of Schematic Designs with Electrical Hardware" and issued to Hyduke on Dec. 26, 1995; and U.S. Pat. No. 5,428,790, entitled "Computer Power Management System" and issued to Harper et al. on Jun. 27, 1995.

Some examples of switches or levers, or components thereof, that may be used or adapted for use in at least one possible embodiment of the present invention may be found in U.S. Pat. No. 5,392,895, entitled "Transfer Unit" and issued to Sorensen on Feb. 28, 1995; U.S. Pat. No. 5,404,992, entitled "Suspension Conveyor System" and issued to Robu et al. on Apr. 11, 1995; U.S. Pat. No. 5,438,911, entitled "Control Cylinder for Pneumatic Control Devices with Signal Switches" and issued to Fiedler et al. on Aug. 8, 1995; U.S. Pat. No. 5,440,289, entitled "Combined Alarm System and Window Covering Assembly" and issued to Riordan on Aug. 8, 1995; and U.S. Pat. No. 5,462,245, entitled "Apparatus for Locking Moveable Switch Parts" and issued to Durchschlag on Oct. 31, 1995.

Some examples of sensors and switches that may be used or adapted for use in at least one possible embodiment of the present invention may be found in U.S. Pat. No. 5,379,023, entitled "Alarm System" and issued to Dalton on Jan. 3, 1995; U.S. Pat. No. 5,453,589, entitled "Microswitch with Non-enlarging, Sealed Electrical Connections" and issued to Mayer on Sep. 26, 1995; U.S. Pat. No. 5,453,590, entitled "Bistable Microswitch" and issued to Mayer on Sep. 26, 1995; U.S. Pat. No. 5,378,865, entitled "Multi-directional Shock Sensor" and issued to Reneau on Jan. 3, 1995; U.S. Pat. No. 5,408,132, entitled "Proximity Switch Operating in a Non-Contacting Manner" and issued to Fericean et al. on Apr. 18, 1995; U.S. Pat. No. 5,428,253, entitled "Proximity Switch" and issued to Ogata et al. on Jun. 27, 1995; U.S. Pat. No. 5,442,150, entitled "Piezo Electric Switch" and issued to Ipcinski on Aug. 15, 1995; U.S. Pat. No. 5,430,421, entitled "Reed Contactor and Process of Fabricating Suspended Tridimensional Metallic Microstructure" and issued to et al. on Jul. 4, 1994; and U.S. Pat. No. 5,444,295, entitled "Linear Dual Switch Module" and issued to Lake et al. on Aug. 22, 1995.

Some examples of sensors, sensor systems, gauges, or gauge systems that may be used or adapted for use in at least one possible embodiment of the present invention may be found in the following U.S. Pat. No. 6,016,697, issued to inventors McCulloch et al. on Jan. 25, 2000; U.S. Pat. No. 5,857,482, issued to inventor Dowling on Jan. 12, 1999; U.S. Pat. No. 5,785,100, issued to inventors Showalter et al. on Jul. 28, 1998; U.S. Pat. No. 5,699,049, issued to inventor Difiore on Dec. 16, 1997; U.S. Pat. No. 5,651,285, issued to inventor Legras on Jul. 29, 1997; U.S. Pat. No. 5,627,523, issued to inventors Besprozvanny et al. on May 6, 1997; U.S. Pat. No. 5,581,062, issued to inventor Gomez, Jr. on Dec. 3, 1996; U.S. Pat. No. 5,105,668, issued to inventors Ficken et al. on Apr. 21, 1992; U.S. Pat. No. 5,056,363, issued to inventors Arekapudi et al. on Oct. 15, 1991; U.S. Pat. No. 5,054,319, issued to inventor Fling on Oct. 8, 1991; U.S. Pat. No. 4,962,395, issued to inventor Baird on Oct. 9, 1990; U.S. Pat. No. 4,935,727, issued to inventors Re Fiorentin et al. on Jun. 19, 1990; U.S. Pat. No. 4,917,173, issued to inventors Brown et al. on Apr. 17, 1990; U.S. Pat. No. 4,838,303, issued to inventor Goans on Jun. 13, 1989; U.S. Pat. No. 4,825,695, issued to inventor Ohtani on May 2, 1989; U.S. Pat. No. 4,777,821, issued to inventor Gerve on Oct. 18, 1988; U.S. Pat. No. 4,715,398, issued to inventors Shouldice et al. on Dec. 29, 1987; U.S. Pat. No. 4,497,205, issued to inventors Zulauf et al. on Feb. 5, 1985; U.S. Pat. No. 4,467,156, issued to inventors Dvorak et al. on Aug. 21, 1984; U.S. Pat. No. 4,383,544, issued to inventor Vosper on May 17, 1983; U.S. Pat. No. 4,379,434, issued to inventor Thordarson on Apr. 12, 1983; U.S. Pat. No. 4,205,237, issued to inventor Miller on May 27, 1980; U.S. Pat. No. 4,194,395, issued to inventor Wood on Mar. 25, 1980; U.S. Pat. No. 4,171,932, issued to inventor Miller on Oct. 23, 1979; U.S. Pat. No. 4,087,012, issued to inventor Fogg on May 2, 1978; and U.S. Pat. No. 4,021,122, issued to inventor Krenmayr on May 3, 1977.

Some examples of temperature sensors or sensor systems that may be used or adapted for use in at least one possible embodiment of the present invention may be found in the following U.S. Pat. No. 5,960,857, issued to inventors Oswalt et al. on Oct. 5, 1999; U.S. Pat. No. 5,942,980, issued to inventors Hoben et al. on Aug. 24, 1999; U.S. Pat. No. 5,881,952, issued to inventor MacIntyre on Mar. 16, 1999; U.S. Pat. No. 5,862,669, issued to inventors Davis et al. on Jan. 26, 1999; U.S. Pat. No. 5,459,890, issued to inventor Jarocki on Oct. 24, 1995; U.S. Pat. No. 5,367,602, issued to inventor Stewart on Nov. 22, 1994; U.S. Pat. No. 5,319,973, issued to inventors Crayton et al. on Jun. 14, 1994; U.S. Pat. No. 5,226,320, issued to inventors Dages et al. on Jul. 13, 1993; U.S. Pat. No. 5,078,123, issued to inventors Nagashima et al. on Jan. 7, 1992; and U.S. Pat. No. 5,068,030, issued to inventor Chen on Nov. 26, 1991.

Some examples of position sensors or position sensor systems that may be used or adapted for use in at least one possible embodiment of the present invention may be found in the following U.S. Pat. No. 5,794,355, issued to inventor Nickum on Aug. 18, 1998; U.S. Pat. No. 5,520,290, issued to inventors Kumar et al. on May 28, 1996; U.S. Pat. No. 5,074,053, issued to inventor West on Dec. 24, 1991; and U.S. Pat. No. 4,087,012, issued to inventor Fogg on May 2, 1978.

Some examples of heaters or heat exchangers, cooling systems, valves, pumps, or tanks that may be used or adapted for use in at least one possible embodiment of the present invention may be found in the following U.S. Pat. No. 5,881,952, issued to inventor MacIntyre on Mar. 16, 1999; U.S. Pat. No. 5,862,669, issued to inventors Davis et al. on Jan. 26, 1999; U.S. Pat. No. 5,459,890, issued to inventor Jarocki on Oct. 24, 1995; U.S. Pat. No. 5,367,602, issued to inventor Stewart on Nov. 22, 1994; U.S. Pat. No. 5,319,973, issued to inventors Crayton et al. on Jun. 14, 1994; U.S. Pat. No. 5,226,320, issued to inventors Dages et al. on Jul. 13, 1993; U.S. Pat. No. 5,078,123, issued to inventors Nagashima et al. on Jan. 7, 1992; and U.S. Pat. No. 5,068,030, issued to inventor Chen on Nov. 26, 1991.

Some examples of conveyor belts or conveyor arrangements and components thereof that may be used or adapted for use in at least one possible embodiment of the present invention may be found in the following U.S. Pat. No. 5,999,099, issued to inventor Stobbe on Dec. 7, 1999; U.S. Pat. No. 5,960,933, issued to inventor Albrecht on Oct. 5, 1999; U.S. Pat. No. 5,881,429, issued to inventor Drewitz on Mar. 16, 1999; U.S. Pat. No. 5,873,946, issued to inventor Hantmann on Feb. 23, 1999; U.S. Pat. No. 5,520,290, issued to inventors Kumar et al. on May 28, 1996; U.S. Pat. No. 5,429,651, issued to inventor Bolin on Jul. 4, 1995; U.S. Pat. No. 5,411,129, issued to inventor Crouch on May 2, 1995; U.S. Pat. No. 5,293,888, issued to inventors Avelis et al. on Mar. 15, 1994; U.S. Pat. No. 5,107,980, issued to inventor Piazza on Apr. 28, 1992; and U.S. Pat. No. 5,038,917, issued to inventor Kronseder on Aug. 13, 1991.

While the invention has possibly other applicability, the present invention has most applicability in machinery of KHS Maschinen- und Anlagenbau Aktiengesellschaft of Dortmund, Federal Republic of Germany, and such machinery may be viewed on the company's website under www.khs-ag.de, particularly under www.khs-ag.de/en/05products/1machines.

The website shows aspects of cleaning technology (INNOCLEAN), namely, single-end bottle washers of which there are three versions of the INNOCLEAN single-end bottle washer. The machines offered range from the lowest capacity (INNOCLEAN EC) with an output of 10,000 bottles per hour, the mid-capacity of 10,000 to 30,000 bottles per hour (INNOCLEAN EK), to machines with capacities for 150,000 bottles per hour (INNOCLEAN EE+INNOCLEAN EM, also available as multiple bath versions). All models have been designed for washing returnable and non-returnable glass and PET bottles. Double-end bottle washers: the INNOCLEAN DM double-end, multiple-bath bottle washer is designed for the mid to high capacity range of up to 150,000 bottles per hour. This machine fulfills the highest possible bottle requirements by consistently separating the impurities from the clean bottle discharge. Very long treatment periods can be achieved by combining a series of various types of caustic baths. The INNOCLEAN DM is available in various overall heights. The INNOCLEAN DMT product line machines are double-end bottle washers with modified automation. Crate washers: the INNOCLEAN KW is a fully automatic washing system for plastic crates. Made entirely of stainless steel, single or two-vat versions are available of these single and double-track machines. Capacities range from 500 to 10,000 crates per hour. Crates are washed by two optional types of high-pressure spraying: 1. hot water and follow-up spraying, 2. caustic spraying, hot water and follow-up spraying.

Washing and filling technology for kegs—INNOKEG: comprising keg washers and fillers—whether the INNOKEG RF-SU for the lower capacity range or the linear INNOKEG RF-MP and RF-DP (single and double-conveyor versions) for the mid and upper capacity range, the tried and tested INNOKEG RF product line is the center of attention of the KHS keg systems for the beverage industry. Keg interior cleaning, sterilization, and keg filling is performed fully automatically. Ideal for filling carbonated and non-carbonated beverages such as beer, soft drinks, mineral water, wine and fruit juices. Rotary fillers: the INNOKEG KR is continuous operation (rotary-type) keg treatment machine-filler. It is suitable for filling kegs and containers equipped with central fitting systems and ideal for filling carbonated and non-carbonated beverages such as beer, juice, mineral water, wine and fruit juices. The INNOKEG KR is available in four capacity ranges: up to 600 kegs per hour, filler with 16 filling elements; up to 800 kegs per hour, filler with 20 filling elements; up to 1,000 kegs per hour, filler with 24 filling elements. More than 1,000 kegs per hour, filler with 32 filling elements. Pre-treatment and checking: the INNOKEG product line offers several machine models for pre-treatment and checking of kegs: 1. the INNOKEG AR keg exterior washer, a completely covered tunnel machine for treatment of keg exteriors (capacity 60 to 1,200 kegs per hour); 2. the multiple head INNOKEG MK used for checking the condition of kegs such as cap stripper and check re-tightener, residual pressure check as well as optical distortion checking 70–1,100 kegs per hour capacity (depending on the equipment). Keg handling machines: KHS has a number of keg handling machines in its INNOKEG program: from protective cap cappers and decappers (INNOKEG PM-BK/PM-EK) to the keg program turner (INNOKEG PM-PW) for repositioning horizontally palletized kegs so that fittings point inward or outward. This product line is rounded off by the double-cross keg turner (INNOKEG PM-DW), the keg constant turner (INNOKEG PM-SW) which turns all kegs 180 degrees after filling, and the keg control turner (INNOKEG PM-KW).

Inspection technology (INNOCHECK): empty bottle inspectors: the INNOCHECK LF product line from KHS offers a wide variety of state-of-the-art devices and machines for inspecting returnable glass or PET packaging. Capacities range from 36,000 to 72,000 bottles per hour. High-tech camera technology and tried and tested sensory testing systems, among others, are implemented for the following methods of inspection: bottle height checking, sealing surface, IR residual liquids check, inner side walls, camera base. Foreign substance inspectors: the INNOCHECK FS is a highly dependable foreign substance inspector for inspecting PET multi-use bottles against contamination with taste and health affecting materials. The inspector has a low error return rate and a strong recognition rate and is resistant to parameter changes such as temperature fluctuation, air humidity and unclean air. The INNOCHECK FS operates with a velocity of 50,000 bottles per hour. The filling level checking system: the INNOCHECK FT 50 filling level checking system is available for checking the filling level of bottles and cans. Password-protected recording 20 different types of containers is part of the standard equipment as well as production statistics, counter readings for overfilling or underfilling, and diagnostic functions. The INNOCHECK FT 50 is easy to operate and features dependable filling level detection and a standardized link to reject systems. Crate checking: the INNOCHECK program offers various solutions for checking and detecting defective cartons, containers in cartons, shrink-wrap packaging, and plastic or metal closures. The simple and clearly arranged method of operation guarantees trouble-free machine performance for a multitude of applications.

Filling technology (INNOFILL) comprising: overpressure fillers—KHS offers several overpressure fillers: (INNOFILL EM, ER, EV, DR) equipped with mechanical and computer-controlled filling valves for filling carbonated beverages, particularly soft drinks and mineral water, in glass and plastic containers. A special feature of the INNOFILL EV is the volumetric recording of the filling volume using electromagnetic inductive flowmetering (MID). Capacities range from 5,000 to 80,000 bottles per hour, depending on the type of machine and the container to be filled. Normal pressure fillers: the KHS product program includes the INNOFILL NR double-chamber normal pressure bottle fillers. Equipped with computer-controlled filling valves, this filler is ideal for filling beverages in glass and plastic containers. The INNOFILL NR is capable of filling 6,000 to 70,000 0.7-liter bottles per hour. Can fillers: the INNOFILL product line for can filling is particularly suitable for filling beer, soft drinks, mixed beverages (carbonated and non-carbonated) as well as pulp and non-pulp juices (also hot filling). The complex filler program guarantees high performance standards and offers a host of engineering highlights, for instance, pressure-less filling of non-carbonated products. Or the extremely fast central filling level correction which can also be optionally used automatically during production operation. Particularly worthy of note are the filling temperatures; the approximate temperature for beer is 16 degrees Celsius, 20 degrees Celsius for soft drinks, and 85 degrees Celsius for juices. Rinsers: the KHS INNOFILL program includes two rinsers for single or double rinsing or blowing out of glass and plastic containers of various sizes and shapes. The EMZ/ZM rinser is a universal mechanical rinser with a capacity range from 10,000 to 75,000 bottles per hour. The universal computer-controlled triple-chamber DR rinser has the same capacity range. KHS offers the fully automatic DW can rinser designed for rinsing empty cans, which, depending on the configuration, is capable of outputs from 18,000 to 160,000 cans per hour.

Pasteurizing technology (INNOPAS): KHS pasteurizers are ideal for heating glass, plastic, and metal containers. Beverages and foods such as beer, vegetable juices, fruit juices, fruit juice drinks, and other products are thus biologically preserved. These machines operate fully automatically using the continuous flow processes to gradually heat, pasteurize, and recool the product to be pasteurized during the treatment period. Depending on the equipment installed, the pasteurizers are capable of outputs ranging from 10,000 to 200,000 containers per hour. Heaters: the INNOPAS W, equipped with a continuously running conveyor belt, is a fully automatic machine for warming up cold-filled beverages or food products. The heater's conveyor belt can be made of plastic for can and plastic bottle processing or stainless steel for glass bottle processing. Capacities range from 5,000 to 120,000 container per hour. Re-coolers: the INNOPAS K, equipped with a continuously running conveyor belt, is a fully automatic machine for re-cooling hot-filled beverages or food products. Depending on their size, the re-coolers are designed as compact or segment-type machines. You may choose between plastic and stainless steel chain belts as a conveyor medium. Capacities range from 5,000 to 50,000 containers per hour.

Labeling technology (INNOKET): cold glue labeler—the INNOKET KL labeler is designed for cold glue processing of body, neck, back, neck ring, diagonal ribbon, and safety seal labels as well as aluminum foil. The product line is comprised of five different basic models which fulfill a host of customer capacity and equipment requirements through application-specific modular design (capacity range: 20,000 to 66,000 container per hour). The INNOKET KL can be optionally equipped with MIS, the Machine Information System. Hot-melt labelers: the INNOKET HL product line was developed especially for wrap-around labeling of glass and PET bottles, and cans. High-performance labelers for hot-melt processing. The gluing width is easily adapted to the various container material properties. Adhesives are gently treated by the "three-phase heat-up" (capacity range up to 45,000 per hour). Roll-fed labelers: the INNOKET RF is a high-performance labeler designed for processing paper or foil labels even as partial or wrap-around labels. The INNOKET RF offers dependable processing at capacities ranging up to 48,000 cans, glass or plastic bottles per hour, regardless if polypropylene, polyethylene, polystyrene or paper labels are used. Packing technology (INNOPACK): robots: KHS builds folding arm or one column robots for the application in the packing and palletizing area. Four axes folding arm robots are used, particularly where low performance and high flexibility are in demand by changing position pictures or applications. Three-axes column robots are ideal by their high-dynamic servo-drives, if short cycle times, high pay load and high throughput rates are required. Cyclic packer: Two models of the fully automatic INNOPACK cyclic packer product line are available: CT and GT. Both are ideal for packing or unpacking bottles, jars, cans, multi packs-in plastic crates, carton, or trays. The cyclic packer's extremely efficient operation achieves high packing performance while requiring a minimum amount of space (INNOPACK CT: 500 to 1,900 packagings per hour, INNOPACK GT: 1,000 to 7,000 module crates per hour). Two INNOPACK CT models are available: the short stroke machine (packing movement) for plastic crate processing and the long stroke version (Packing movement) for folding box processing. Multipacker: the fully automatic operation of the INNOPACK GTM multipacker is used for combined packing of bulk containers in plastic crates and cartons or for placing multipacks in plastic crates, cartons, and trays. An outstanding feature of this machine is its horizontally moveable gripper traverse. Packing heads can be equipped as required with a gripping hook system, a vacuum gripping system, or a packing bell system, as well as a horizontally operating swivelling system. Rotary packer: the INNOPACK CR rotary packer is a continuously operating packing and unpacking machine designed for packing plastic crates or cartons (2,400 to 8,100 module crates per hour). It is capable of handling a multitude of tasks and its complex equipment makes it usable in all capacity ranges throughout the beverage industry. Two basic models of the rotary packer are available: size 1 for single and double-track crate conveyors, size 2 exclusively for double-track crate conveyors. Bottle aligner: KHS has developed a single and double-track, fully automatic INNOPACK FA series bottle alignment machine for integration in the packaging conveyor system for proper product presentation. The machine capacity is maximum 96,000 bottles per hour for a 6-second work cycle.

Palletizing technology (INNOPAL): palletizers: the INNOPAL palletizer concept is state-of-the-art and stands for high dependability, economy, and flexibility. Its modular design and versatility defined for customer advantage provide the ideal solution for each type of application. The INNOPAL PM and PL product lines offer machines and systems which can be equipped with a wide variety of loading heads. Nominal capacities range from 120 to 600 layers per hour depending on the model (single or double-column). Depalletizers: INNOPAL depalletizers are designed for the mid and upper capacity range. These machines depalletize by pushing jars, cans, glass or plastic bottles (also Petaloid-base bottles), even of various heights and diameters, layer by layer from pallets of the same size. Two models are available depending on the capacity and system configuration: the single-column, high-level packaging discharge INNOPAL AM with a capacity of 240 to 400 layers per hour and the double-column, low-level packaging discharge version of the INNOPAL AL with a capacity of up to 200 layers per hour. Crate stacker: the fully automatic plastic crate stackers of the INNOPAL KM product line are used as block buffer magazines if filling lines require buffer capacities exceeding 1,000 crates. They can be designed for a capacity of up to 10,000 crates. Pallet stackers: the fully automatic pallet stackers of the INNOPAL product line, stack or unstack pallets, kegs, crates, and with boxes to or from two or three-layers of pallets. Even various size pallets can be processed. Capacities range from 80 to 150 pallets per hour, depending on the model. Vertical pallet conveyors: the vertical pallet conveyors of the INNOPAL FM and FL product lines are fully automatic conveyor lines which link conveyor segments between floors or different levels. They are available in two models: INNOPAL FM. Single-column vertical conveyor ideal for conveying heights of up to 12 meters and loads of up to 1,000 kg. INNOPAL FL. Double-column, portal, vertical conveyor equipped with two lifting chains. The conveying height of the INNOPAL FL is up to 20 meters and the maximum load is 2,500 kg (two-space version).

Attendant equipment and systems such as plant information system (INNOLINE): the INNOLINE program includes conveyors designed for glass and PET bottles, and round, oval or rectangular shaped cans. In their capacity as linking elements between the processing stations, the container conveyors have a considerable effect on the function and efficiency of the overall system. For this reason, all models have the following distinguishing features; highly economical through the use of mechanical and electrical system of building blocks, optimum selection of materials, stable and sturdy design, easy to service through excellent accessibility, easy to clean, product-oriented conveyor regulation and controls, and low-pressure and low-noise conveying through SOFTSTEP MODULE. Pallet conveyors: KHS offers a conveyor system comprised of standard elements capable of performing all the horizontal and vertical level movements necessary for in-feeding and discharging pallets. The building block type design permits coupling of all units in order to simply and clearly perform the most varied of conveying tasks. The INNOLINE program includes horizontal pallet conveyors (equipped with roller or chain conveyors), and vertically conveying pallet magazines, as well as pallet checking systems. Crate magazines: the INNOLINE KMZ is an empty crate row magazine. Available are single or double-track versions. The storage capacity depends on the length and the number of rows. The single-track version has a capacity for 280 to 570 module crates and the double-track version 560 to 1140 module crates. The fully automatic operation of the crate row magazines solve the problem of adequate buffer space between craters and decraters. In order to be able to optimize plant productivity, one should know exactly where the weak points are. This is the purpose and the job of the INNOLINE Plant Information System (AIS). The AIS system, installed on a PC, handles the task of evaluating all production and disruption data collected, making it thus possible for plant operators to monitor the current status of the filling line at any time. All AIS information can also be integrated in other internal company DP systems. All of the above website information is hereby incorporated by reference as if set forth in its entirety herein.

Examples of bottling systems, which may be used in embodiments of the present invention, may be found in the following U.S. patents, which are hereby incorporated by reference, as if set forth in their entirety herein include U.S. Pat. No. 5,558,138 issued to Stock, et al. on Sep. 24, 1996 and entitled "Process and apparatus for cleaning container handling machines such as beverage can filling machines"; U.S. Pat. No. 5,634,500 issued to Clüsserath et al. on Jun. 3, 1997 and entitled "Method for bottling a liquid in bottles or similar containers"; and U.S. Pat. No. 5,713,403 issued to Cl üsserath et al. on Feb. 3, 1998 and entitled "Method and system for filling containers with a liquid filling product, and filling machine and labeling device for use with this method or system". All of the above U.S. patent documents in this paragraph are assigned to KHS Maschinen- und Anlagenbau Aktiengesellschaft of Dortmund, Federal Republic of Germany.

Examples of container labeling and/or filling machines and components thereof and/or accessories therefor may be found in the following documents, which are hereby incorporated by reference, as if set forth in their entirety herein include U.S. Pat. No. 4,911,285 issued to Rogall, et al. on Mar. 27, 1990 and entitled "Drive for a rotary plate in a labeling machine for bottles"; U.S. Pat. No. 4,944,830 issued to Zodrow et al. on Jul. 31, 1990 and entitled "Machine for labeling bottles"; U.S. Pat. No. 4,950,350 issued to Zodrow et al on Aug. 21, 1990 and entitled "Machine for labeling bottles or the like"; U.S. Pat. No. 4,976,803 issued to Tomashauser et al. on Dec. 11, 1990 and entitled "Apparatus for pressing foil on containers, such as on the tops and the necks of bottles or the like"; U.S. Pat. No. 4,981,547 issued to Zodrow et al. on Jan. 1, 1991 and entitled "Mounting and drive coupling for the extracting element support of a labeling station for a labeling machine for containers and similar objects"; U.S. Pat. No. 5,004,518 issued to Zodrow on Apr. 2, 1991 and entitled "Labeling machine for objects such as bottles or the like"; U.S. Pat. No. 5,017,261 issued to Zodrow et al. on May 21, 1991 and entitled "Labeling machine for objects such as bottles or the like"; U.S. Pat. No. 5,062,917 issued to Zodrow et al. on Nov. 5, 1991 and entitled "Support element for the followers of a cam drive of a drive mechanism and a labeling station equipped with a support element"; U.S. Pat. No. 5,062,918 issued to Zodrow on Nov. 5, 1991 and entitled "Glue segments which can be attachable to a drive shaft of a labeling machine"; U.S. Pat. No. 5,075,123 issued to Schwinghammer on Dec. 24, 1991 and entitled "Process and apparatus for removing alcohol from beverages"; U.S. Pat. No. 5,078,826 issued to Rogall on Jan. 7, 1992 and entitled "Labeling machine for the labeling of containers"; U.S. Pat. No. 5,087,317 issued to Rogall on Feb. 11, 1992 and entitled "Labeling machines for the labeling of containers"; U.S. Pat. No. 5,110,402 issued Zodrow et al. on May 5, 1992 and entitled "Labeling machine for labeling containers such as bottles having a labeling box for a stack of labels in a labeling station"; U.S. Pat. No. 5,129,984 issued to Tomashauser et al on Jul. 14, 1992 and entitled "Machine for wrapping foil about the tops and necks of bottles"; U.S. Pat. No. 5,167,755 issued Zodrow et al. on Dec. 1, 1992 and entitled "Adhesive scraper which can be adjusted in relation to an adhesive roller in a labeling machine"; U.S. Pat. No. 5,174,851 issued Zodrow et al. on Dec. 29, 1992 and entitled "Labeling machine for labeling containers, such as bottles"; U.S. Pat. No. 5,185,053 issued to Tomashauser et al. on Feb. 9, 1993 and entitled "Brushing Station for a labeling machine for labeling bottles and the like"; U.S. Pat. No. 5,217,538 issued Buchholz et al. on Jun. 8, 1993 and entitled "Apparatus and related method for the removal of labels and foil tags adhering to containers, in particular, to bottles"; U.S. Pat. No. 5,227,005 issued to Zodrow et al. on Jul. 13, 1993 and entitled "Labeling station for labeling objects, such as bottles"; U.S. Pat. No. 5,413,153 issued to Zwilling et al. on May 9, 1995 and entitled "Container filling machine for filling open-top containers, and a filler valve therefor"; and U.S. Pat. No. 5,569,353 issued to Zodrow on Oct. 29, 1996 and entitled "Labeling machine and apparatus for the automatic loading of the main magazine of a labeling machine, and a supply magazine which can be used in such an apparatus". All of the above U.S. patent documents in this paragraph are assigned to KHS Maschinen- und Anlagenbau Aktiengesellschaft of Dortmund, Federal Republic of Germany.

Some additional examples of container filling systems, valves or methods and their components which may be incorporated in an embodiment of the present invention may be found in U.S. Pat. No. 5,377,726 issued to Clusserath on Jan. 3, 1995 and entitled "Arrangement for filling bottles or similar containers"; U.S. Pat. No. 5,402,833 issued to Clusserath on Apr. 4, 1995 and entitled "Apparatus for filling bottles or similar containers"; U.S. Pat. No. 5,425,402 issued to Pringle on Jun. 20, 1995 and entitled "Bottling system with mass filling and capping arrays"; U.S. Pat. No. 5,445,194 issued to Clusserath on Aug. 29, 1995 and entitled "Filling element for filling machines for dispensing a liquid filling material into containers"; and U.S. Pat. No. 5,450,882 issued to Gragun on Sep. 19, 1995 and entitled "Beverage dispensing apparatus and process", all of these U.S. patents being hereby expressly incorporated by reference as if set forth in their entirety herein.

Some further examples of container filling systems, valves or methods and their components which may possibly be incorporated into the present invention are to be found in U.S. Pat. No. 5,190,084 issued to Diehl et al. on Mar. 2, 1993 and entitled "Filling element for filling machines for dispensing liquid"; U.S. Pat. No. 5,195,331 issued to Zimmern et al. on Mar. 23, 1993 and entitled "Method of using a thermal expansion valve device, evaporator and flow control means assembly and refrigerating machine"; U.S. Pat. No. 5,209,274 issued to LaWarre, Sr. on May 11, 1993 and entitled "Filling valve apparatus having shortened vent tube"; U.S. Pat. No. 5,217,680 issued to Koshiishi et al. an Jun. 8, 1993 and entitled "Liquid filling method for a high-temperature and high-pressure vessel and apparatus therefor"; and U.S. Pat. No. 5,241,996 issued to Werner et al. and entitled "Apparatus for filling liquid into containers", all of these U.S. patents being hereby expressly incorporated by reference as if set forth in their entirety herein.

Some yet further additional examples of container filling systems, apparatus or methods and their components which may possibly be incorporated into the present invention are to be found in U.S. Pat. No. 3,960,066 issued to LaRocco et al. on Jun. 1, 1976 and entitled "Beverage preparation apparatus"; U.S. Pat. No. 4,103,721 issued to Noguchi on Aug. 1, 1978 and entitled "Method and apparatus for bottling beer"; U.S. Pat. No. 4,124,043 issued to Noguchi on Nov. 7, 1978 and entitled "Method and apparatus for bottling"; U.S. Pat. No. 4,135,699 issued to Petzsch et al. on Jan. 23, 1979 and entitled "Control valve for gaseous and liquid media"; U.S. Pat. No. 4,146,065 issued to Borstelmann on Mar. 27, 1979 and entitled "Method and machine for charging liquid into containers"; U.S. Pat. No. 4,171,714 issued to Knabe et al. on Oct. 23, 1979 and entitled "Filling machine for charging containers with a liquid"; U.S. Pat. No. 4,549,272 issued to Hagan et al. on Oct. 22, 1985 and entitled "Apparatus for filling containers with prescribed quantity of product by weight"; U.S. Pat. No. 4,599,239 issued to Wieland et al. on Jul. 8, 1986 and entitled "Method of preparing nonalcoholic beverages starting with a deaerated low sugar concentration base"; U.S. Pat. No. 5,058,632 issued to Lawarre, Sr. et al. on Oct. 22, 1991 and entitled "Filling valve apparatus"; U.S. Pat. No. 5,318,078 issued to Hantmann on Jun. 7, 1994 and entitled "Process for bottling beverages"; U.S. Pat. No. 5,365,771 issued to Gysi et al. and entitled "Process and apparatus for testing bottles for contamination"; U.S. Pat. No. 5,409,545 issued to Levey et al. on Apr. 25, 1995 and entitled "Apparatus and method for cleaning containers"; U.S. Pat. No. 5,458,166 issued to Kronseder on Oct. 17, 1995 and entitled "Cleansing system for a container treating machine"; U.S. Pat. No. 5,566,695 issued to Levey et al. and entitled "Modular apparatus and method for cleaning containers"; U.S. Pat. No. 5,689,932 issued to Peronek et al. on Nov. 25, 1997 and entitled "Quick change method and apparatus for filling and capping machines"; U.S. Pat. No. 5,732,528 issued to Peronek et al. and entitled "Container guide for filling and capping machine"; U.S. Pat. No. 5,778,633 issued to Sweeny on Jul. 14, 1998 and entitled "Quick change ledge support assembly for filling and capping machines"; and U.S. Pat. No. 6,058,985 issued to Petri et al. on May 9, 2000 and entitled "Bottling machine with set-up table and a set-up table for a bottling machine and a set-up table for a bottle handling machine", all of these U.S. patents being hereby expressly incorporated by reference as if set forth in their entirety herein.

Some additional examples of methods and apparatuses for closing bottles and containers and their components which may possibly be incorporated in an embodiment of the present invention may be found in U.S. Pat. No. 5,398,485 issued to Osifchin on Mar. 21, 1995 and entitled "Bottle support mechanism for a capping machine"; U.S. Pat. No. 5,402,623 issued to Ahlers on Apr. 4, 1995 and entitled "Method and apparatus for closing bottles"; U.S. Pat. No. 5,419,094 issued to Vander Bush, Jr. et al. on May 30, 1995 and entitled "Constant speed spindles for rotary capping machine"; U.S. Pat. No. 5,425,402 issued to Pringle on Jun. 20, 1995 and entitled "Bottling system with mass filling and capping arrays"; U.S. Pat. No. 5,447,246 issued to Finke on Sep. 5, 1995 and entitled "Methods and combinations for sealing corked bottles"; U.S. Pat. No. 5,449,080 issued to Finke on Sep. 12, 1995 and entitled "Methods and combinations for sealing corked bottles"; and U.S. Pat. No. 5,473,855 issued to Hidding et al. and entitled "System for installing closures on containers", all of these U.S. patents being hereby expressly incorporated by reference as if set forth in. their entirety herein.

Some further examples of methods and apparatuses for filling containers and their components which may possibly be incorporated in an embodiment of the present invention may be found in U.S. Pat. No. 3,946,770 issued to Trinne et al. on Mar. 30, 1976 and entitled "Bottle filling means and method"; U.S. Pat. No. 4,136,719 issued to Kronseder et al. on Jan. 30, 1979 and entitled "Method and device for cleaning bottle filling machines and the like"; U.S. Pat. No. 4,446,673 issued to Desthieux on May 8, 1984 and entitled "Bottle-filling method and device"; U.S. Pat. No. 4,467,846 issued to Croser on Aug. 28, 1984 and entitled "Bottle filling device"; U.S. Pat. No. 4,653,249 issued to Simonazzi on Mar. 31, 1987 and entitled "Telescopic filling adapter for bottle filling machines"; U.S. Pat. No. 4,911,21 issued to Burton on Mar. 27, 1990 and entitled "Bottle filling device"; U.S. Pat. No. 4,967,813 issued to Ponvianne et al. on Nov. 6, 1990 and entitled "Bottle filling machine and filling head therefor"; U.S. Pat. No. 4,987,726 issued to Petho et al. on Jan. 29, 1991 and entitled "Bottle filling and sealing apparatus"; U.S. Pat. No. 5,191,742 issued to Jones on Mar. 9, 1993 and entitled "Fluidized bed bottle filling system"; U.S. Pat. No. 5,454,421 issued to Kerger et al. on Oct. 3, 1995 and entitled "Device for filling and emptying a gas bottle"; U.S. Pat. No. 5,494,086 issued to McBrady et al. on Feb. 27, 1996 and entitled "Bottle filling machine"; U.S. Pat. No. 5,533,552 issued to Ahlers on Jul. 9, 1996 and entitled "Bottle filling machine and a cleansing system accessory including an operator therefor"; and U.S. Pat. No. 5,582,223 issued to Weh et al. on Dec. 10, 1996 and entitled "Filling apparatus for gas bottle valves", all of these U.S. patents being hereby expressly incorporated by reference as if set forth in their entirety herein.

Examples of rotary position sensors and rotary position indicators, components thereof, and components associated therewith, which may be utilized in accordance with the embodiments of the present invention, may be found in the following U.S. patents: U.S. Pat. No. 4,360,889 issued to Liedtke on Nov. 23, 1982 and entitled "Rotary position indicating circuit"; U.S. Pat. No. 4,458,893 issued to Ruh on Jul. 10, 1984 and entitled "Drive for sheet feeder in printing press"; U.S. Pat. No. 4,581,993 issued to Schöneberger on Apr. 15, 1986 and entitled "Device for a printing press comprising a plate cylinder and/or blanket cylinder"; U.S. Pat. No. 4,841,246 issued to Juds et al. on Jun. 20, 1989 and entitled "Multiturn shaft position sensor having magnet movable with nonrotating linear moving unit"; U.S. Pat. No. 4,899,643 issued to Hvilsted et al. on Feb. 13, 1990 and entitled "Hydraulic cylinder comprising at least one electric position indicator"; U.S. Pat. No. 5,222,457 issued to Friedrich on Jun. 6, 1993 and entitled "Indicator for rotary positioner"; U.S. Pat. No. 5,396,139 issued to Surmely et al. on Mar. 7, 1995 and entitled "Polyphase electromagnetic transducer having a multipolar permanent magnet"; U.S. Pat. No. 5,419,195 to Quinn on May 30, 1995 and entitled "Ultrasonic booted head probe for motor bore inspection"; U.S. Pat. No. 5,424,632 issued to Montagu on Jun. 13, 1995 and entitled "Moving magnet optical scanner with novel rotor design"; U.S. Pat. No. 5,433,118 issued to Castillo on Jul. 18, 1995 and entitled "Magnetic turbine rotor for low flow fluid meter"; U.S. Pat. No. 5,442,329 issued to Ghosh et al. on Aug. 15, 1995 and entitled "Waveguide rotary joint and mode transducer structure therefor"; and U.S. Pat. No. 5,444,368 issued to Horber on Aug. 22, 1995 and entitled "Differential reactance permanent magnet position transducer", all of these U.S. patents being hereby expressly incorporated by reference as if set forth in their entirety herein.

Examples of filling machines that utilize electronic control devices to control various portions of-a filling or bottling process and which may possibly be utilized in connection with the present invention are to be found in U.S. Pat. No. 4,821,921 issued to Cartwright et al. on Apr. 18, 1989 and entitled "Liquid dispensing apparatus"; U.S. Pat. No. 5,056,511 issued to Ronge on Oct. 15, 1991 and entitled "Method and apparatus for compressing, atomizing, and spraying liquid substances"; U.S. Pat. No. 5,273,082 issued to Paasche et al. on May 27, 1992 and entitled "Method and apparatus for filling containers"; and U.S. Pat. No. 5,301,488 issued to Ruhl et al. on Nov. 6, 1992 and entitled "Programmable filling and capping machine", all of these U.S. patents being hereby expressly incorporated by reference as if set forth in their entirety herein.

Rotary mechanical devices relating to bottling are to be found in U.S. Pat. No. 4,976,803 issued to Tomashauser et al. on Dec. 11, 1990 and entitled "Apparatus for pressing foil on containers, such as on the tops and the necks of bottles or the like", also referred to above; U.S. Pat. No. 5,087,317 issued to Rogall on Feb. 11, 1992 and entitled "Labeling machine for the labeling of containers", also referred to above; U.S. Pat. No. 5,174,851 issued to Zodrow et al. on Dec. 29, 1992 and entitled Labeling machine for labeling containers, such as bottles", also referred to above; U.S. Pat. No. 5,185,053 issued to Tomashauser et al. on Feb. 9, 1993 and entitled "Brushing station for a labeling machine for labeling bottles and the like", also referred to above; U.S. Pat. No. 5,217,538 issued to Buchholz et al. on Jun. 8, 1993 and entitled "Apparatus and related method for the removal of labels and foil tags adhering to containers, in particular, to bottles", also referred to above; and U.S. Pat. No. 5,219,405 issued to Weiss on Jun. 15, 1993 and entitled "Continuously operating rotational bottle filling installation", and all of these U.S. patents being hereby expressly incorporated by reference as if set forth in their entirety herein.

Examples of capping devices which may possibly be incorporated into the present invention are to be found in U.S. Pat. No. 4,939,890 issued to Peronek et al. on Apr. 14, 1989 and entitled "Anti-rotation method and apparatus for bottle capping machines"; U.S. Pat. No. 5,150,558 issued to Bernhard on Jul. 5, 1991 and entitled "Closing mechanism for a capping machine"; U.S. Pat. No. 5,157,897 issued to McKee et al. on Oct. 27, 1992 and entitled "Rotary capping machine"; and U.S. Pat. No. 5,220,767 issued to de Santana on Jun. 22, 1993 and entitled "Device for applying a cap and seal to the mouth of a bottle whereon an interference boss is provided for said seal", all of these U.S. patents being hereby expressly incorporated by reference herein.

An example of an electric probe utilized in connection with a bottle filling process which may be incorporated into the present invention is to be found in U.S. Pat. No. 5,190,084 issued to Diehl et al. on May 3, 1991 and entitled "Filling element for filling machines for dispensing liquid", which U.S. patent is hereby expressly incorporated by reference as if set forth in its entirety herein.

Other examples of liquid level probes which may be incorporated into the present invention are to be found in U.S. Pat. No. 4,903,530 issued to Hull on Dec. 8, 1988 and entitled "Liquid level sensing system"; U.S. Pat. No. 4,908,783 issued to Maier on Apr. 28, 1987 and entitled "Apparatus and method for determining liquid levels"; and U.S. Pat. No. 4,921,129 issued on Jul. 11, 1988 to Jones et al. and entitled "Liquid dispensing module", all of these U.S. patents being hereby expressly incorporated by reference as if set forth in their entirety herein.

Some examples of pressure sensors which may possibly be incorporated in an embodiment of the present invention are to be found in U.S. Pat. No. 4,703,657 issued to Hirama et al. on Nov. 3, 1987 and entitled "Gas pressure sensor"; U.S. Pat. No. 4,812,801 issued to Halvis et al. on Mar. 14, 1989 and entitled "Solid state gas pressure sensor"; U.S. Pat. No. 5,597,020 issued to Miller et al. on Jan. 28, 1997 and entitled "Method and apparatus for dispensing natural gas with pressure calibration"; U.S. Pat. No. 5,763,762 issued to Sweeney, Jr. on Jun. 9, 1998 and entitled "Total dissolved gas pressure sensor, replaceable collector module and process"; and U.S. Pat. No. 5,925,823 issued to Buehler et al. on Jul. 20, 1999 and entitled "Alpha-particle gas-pressure sensor", all of these U.S. patents being hereby expressly incorporated by reference as if set forth in their entirety herein.

Some further examples of microcomputer control systems which may possibly be incorporated in an embodiment of the present invention are to be found in U.S. Pat. No. 5,530,515 issued to Saegusa et al. on Jun. 25, 1996 and entitled "Control system for an apparatus using a microprocessor"; U.S. Pat. No. 5,548,774 issued to Maurel on Aug. 20, 1996 and entitled "Microcomputer system providing time management enabling control and acquisition of data indicative of condition changes occurring at high speed"; U.S. Pat. No. 5,581,771 issued to Osakabe on Dec. 3, 1996 and entitled "Microcomputer having interrupt control circuit to determine priority level"; U.S. Pat. No. 5,610,749 issued to Mizoguchi et al. on Mar. 11, 1997 and entitled "Microcomputer control optical fiber transmission system"; U.S. Pat. No. 5,619,669 issued to Katsuta on Apr. 8, 1997 and entitled "Memory wait cycle control system for microcomputer"; U.S. Pat. No. 5,664,199 issued to Kuwahara on Sep. 2, 1997 and entitled "Microcomputer free from control of central processing unit (CPU) for receiving and writing instructions into memory independent of and during execution of CPU"; and U.S. Pat. No. 5,687,345 issued to Matsubara et al. on Nov. 11, 1997 and entitled "Microcomputer having CPU and built-in flash memory that is rewriteable under control of the CPU analyzing a command supplied from an external device", all of these U.S. patents being hereby expressly incorporated by reference as if set forth in their entirety herein.

Some further examples of microprocessor control systems which may possibly be incorporated in an embodiment of the present invention may be found in U.S. Pat. No. 4,202,035 issued to Lane on May 6, 1980 and entitled "Modulo addressing apparatus for use in a microprocessor"; U.S. Pat. No. 4,307,448 issued to Sattler on Dec. 22, 1981 and entitled "Method and a circuit arrangement for expanding the addressing capacity of a central unit, in particular of a microprocessor"; U.S. Pat. No. 4,419,727 issued to Holtey et al. on Dec. 6, 1983 and entitled "Hardware for extending microprocessor addressing capability"; U.S. Pat. No. 5,541,045 issued to Kromer, III on Sep. 10, 1985 and entitled "Microprocessor architecture employing efficient operand and instruction addressing"; U.S. Pat. No. 5,293,062 issued to Nakao on Mar. 8, 1994 and entitled "FET nonvolatile memory with composite gate insulating layer"; U.S. Pat. No. 5,292,681 issued to Lee et al. on Mar. 8, 1994 and entitled "Method of processing a semiconductor wafer to form an array of nonvolatile memory devices employing floating gate transistors and peripheral area having CMOS transistors"; and U.S. Pat. No. 5,301,161 issued to Landgraf et al. on Apr. 5, 1994 and entitled "Circuitry for power supply voltage detection and system lockout for a nonvolatile memory", all of these U.S. patents being hereby expressly incorporated by reference as if set forth in their entirety herein.

Some examples of control valve apparatus and methods of operation thereof which possibly may be incorporated in an embodiment of the present invention may be found in U.S. Pat. No. 5,406,975 issued to Nakamichi et al. on Apr. 18, 1995 and entitled "Flow rate control valve"; U.S. Pat. No. 5,503,184 issued to Reinartz et al. on Apr. 2, 1996 and entitled "pressure control valve"; U.S. Pat. No. 5,706,849 issued to Uchida et al. on Jan. 13, 1998 and entitled "Flow control valve"; U.S. Pat. No. 5,975,115 issued to Schwegler et al. on Nov. 2, 1999 and entitled "Pressure control valve"; U.S. Pat. No. 6,142,445 issued to Kawaguchi et al. on Nov. 7, 2000 and entitled "Electromagnetic control valve"; U.S. Pat. No. 6,145,538 issued to Park on Nov. 14, 2000 and entitled "Flow control valve employing a step motor"; and U.S. Pat. No. 6,189,326 B1 issued to Tomatsu et al. on Feb. 20, 2001 and entitled "Pressure control valve", all of these U.S. patents being hereby expressly incorporated by reference as if set forth in their entirety herein.

Some examples of electric control valves which may possibly be used in an embodiment of the present invention may be found in U.S. Pat. No. 4,431,160 issued to Burt et al. on Feb. 14, 1984 and entitled "Electric control valve"; and U.S. Pat. No. 4,609,176 issued to Powers on Sep. 2, 1986 and entitled "Fluid flow control system with pulse driven electric control valve", all of these U.S. patents being hereby expressly incorporated by reference as if set-forth in their entirety herein.

Some examples of pneumatic control valves which may possibly be incorporated in an embodiment of the present invention may be found in U.S. Pat. No. 4,302,057 issued to Durling on Nov. 24, 1981 and entitled "Pneumatic control valve"; U.S. Pat. No. 4,922,952 issued to Kemmler on May 8, 1990 and entitled "Pneumatic control valve"; U.S. Pat. No. 5,038,670 issued to Roe on Aug. 13, 1991 and entitled "Pneumatic control valve apparatus"; U.S. Pat. No. 5,218,994 issued to Jeschke on Jun. 15, 1993 and entitled "Arrangement having a pneumatic control valve with a housing closed on all sides"; and U.S. Pat. No. 5,918,631 issued to Weiler, Jr. et al. on Jul. 6, 1999 and entitled "Ball-poppet pneumatic control valve", all of these U.S. patents being hereby expressly incorporated by reference as if set forth in their entirety herein.

Some examples of methods and apparatus for gas recovery in beverage filling or bottling features of which may possibly be incorporated in an embodiment of the present invention may be found in U.S. Pat. No. 4,390,048 issued to Zelder on Jun. 28, 1983 and entitled "Method and device for recovering an inert gas"; U.S. Pat. No. 4,637,438 issued to Weiss on Jan. 20, 1987 and entitled "Method and device for filling containers"; U.S. Pat. No. 4,693,054 issued to Spargo on Sep. 15, 1987 and entitled "Process for filling beer into containers"; U.S. Pat. No. 4,949,764 issued to Clusserath on Aug. 21, 1990 and entitled "Method for filling containers with carbonated liquid under counterpressure as dispensed having different filling characteristics by adjusting pressure differential without changing flow control mechanism"; U.S. Pat. No. 4,976,295 issued to Clusserath on Dec. 11, 1990 and entitled "Apparatus for filling containers with carbonated liquid under counterpressure as dispensed having different filling characteristics by adjusting pressure differential without changing flow control mechanism"; U.S. Pat. No. 5,016,684 issued to Clüsserath on May 21, 1991 and entitled "Method and apparatus for dispensing carbonated liquids, especially beverages, into containers using counter pressure; and U.S. Pat. No. 5,329,963 issued to Jones et al. on Jul. 19, 1994 and entitled "Method of and apparatus for packaging a beverage in a container", all of these U.S. patents being hereby expressly incorporated by reference as if set forth in their entirety herein.

Some additional examples of counter-pressure filling methods and apparatus features of which may possibly be used in an embodiment of the present invention may be found in U.S. Pat. No. 4,089,353 issued to Antonelli on May 16, 1978 and entitled "Filling valve for carbonated liquid bottling machines"; U.S. Pat. No. 5,273,084 issued to Monnig on Dec. 28, 1993 and entitled "Gas flow check valve for bottle filling device"; U.S. Pat. No. 5,884,677 issued to McKaughan on Mar. 23, 1999 and entitled "Beverage filling machine"; U.S. Pat. No. 5,924,462 issued to McKaughan on Jul. 20, 1999 and entitled "Beverage filling machine"; U.S. Pat. No. 6,076,567 issued to Naecker et al. on Jun. 20, 2000 and entitled "Filling machine assembly"; and U.S. Pat. No. 6,109,483 issued to Wilke et al. on Aug. 29, 2000 and entitled "Filling machine assembly having a movable vent tube", all of these U.S. patents being hereby expressly incorporated by reference as if set forth in their entirety herein.

Some examples of spray nozzle, features of which may possibly be used or adapted for use in an embodiment of the present invention may be found in the following U.S. patents: U.S. Pat. No. 5,931,3392 issued to Adams on Aug. 3, 1999 and entitled, "High-pressure cleaning spray nozzle," U.S. Pat. No. 5,975,432 issued to Han on Nov. 2, 1999 and entitled, "Spray nozzle," U.S. Pat. No. 6,065,685 issued to Tschumi on May 23, 2000 and entitled, "Spray nozzle," U.S. Pat. No. 6,152,388 issued to Rohloff on Nov. 28, 2000 and entitled, "Spray nozzle apparatus," U.S. Pat. No. 6,193,166 issued to Miller et al. on Feb. 27, 2001 and entitled, "Spray nozzle arrangement," U.S. Pat. No. 6,196,473 issued to Beeren et al. on Mar. 6, 2001 and entitled, "Spray nozzle, and also spray boom provided therewith," U.S. Pat. No. 6,220,524 issued to Tores et al. on Apr. 24, 2001 and entitled, "Device for heating a spray nozzle," U.S. Pat. No. 6,220,530 issued to Wu on Apr. 24, 2001 and entitled, "Water spray nozzle control device," U.S. Pat. No. 6,230,091 issued to McQuinn on May 8, 2001 and entitled, "Variable flow spray nozzle system," and U.S. Pat. No. 6,241,165 issued to Bickart et al. on Jun. 5, 2001 and entitled, "Spray nozzle with directly mounted plate." These patents are hereby expressly incorporated by reference as if set forth in their entirety herein.

The details in the patents, patent applications and publications may be considered to be incorporable, at Applicant's option, into the claims during prosecution as further limitations in the claims to patentably distinguish any amended claims from any applied prior art.

Some further examples of bottling systems and features, which may possibly be used in embodiments of the present invention, which are incorporated by reference, as if set forth in their entirety herein, are to be found in U.S. patent application Ser. No. 08/238,613 filed on May 5, 1994 entitled "Apparatus for sorting bottles or similar containers", having inventors Christoph WEISSENFELS and Manfred LONNIG, which corresponds to Federal Republic of Germany patent application No. P 43 15 038, filed May 6, 1993, which corresponds to DE-OS 43 15 038 and DE-PS 43 15 038; U.S. patent application Ser. No. 08/246,605 filed on May 20, 1994 entitled "Method and arrangement for converting a single-row stream of containers into a multi-row stream of containers", having inventor Heinz-Jürgen SCHERER, which corresponds to Federal Republic of Germany patent application No. P 43 17 069 filed on May 21, 1993, which corresponds to DE-OS 43 17 069 and DE-PS 43 17 069; U.S. patent application Ser. No. 08/372,674 filed on Jan. 16, 1995 entitled "Apparatus for processing containers returned to food and beverage producers for the refilling of the containers", having inventor Karl HEIDRICH, which corresponds to Federal Republic of Germany patent application No. P 42 23 427 filed on Jul. 16, 1992, which corresponds to DE-OS 42 23 427 and DE-PS 42 23 427, and International application No. PCT/DE93/00586 filed on Jul. 1, 1993, which corresponds to WO 94/02848; U.S. patent application Ser. No. 08/383,156 filed on Feb. 3, 1995 entitled "Apparatus for processing containers returned to food and beverage producers for the refilling of the containers", having inventors Rüdiger STRAUCHMANN, Marten PETERS, and Hubert GAISBAUER, which corresponds to Federal Republic of Germany patent application No. P 42 25 984 filed on Aug. 6, 1992, which corresponds to DE-OS 42 25 984 and DE-PS 42 25 984, and International application No. PCT/DE93/00692 filed Aug. 4, 1993, which corresponds to WO 94/03287; all of the above U.S. patent documents in this paragraph are assigned to KHS Maschinen- und Anlagenbau Aktiengesellschaft of Dortmund, Federal Republic of Germany.

U.S. patent application Ser. No. 09/282,975 38,613 filed on Mar. 31, 1999, having the inventor Herbert BERNHARD, and claiming priority from Federal Republic of Germany Patent Application No. 198 14 625.6 which was filed on Apr. 1, 1998, and DE-OS 198 14 625.6 and DE-PS 198 14 625.6, are hereby incorporated by reference as if set forth in their entirety herein.

U.S. Pat. No. 6,213,169 B1 issued on Ap. 10, 2001, to Ludwig CLÜSSERATH, and entitled, "Single-chamber filling system," and claiming priority from Federal Republic of Germany Patent Application No. 198 18 761.0 which was filed on Apr. 27, 1998, and DE-OS 198 18 761.0 and DE-PS 198 18 761.0, are hereby incorporated by reference as if set forth in their entirety herein.

U.S. Pat. No. 6,189,578 B1 issued on Feb. 20, 2001, to Ludwig CLÜSSERATH and entitled, "Filling system and filling element," and claiming priority from Federal Republic of Germany Patent Application No. 198 18 762.9 which was filed on Apr. 27, 1998, and DE-OS 198 18 762.9 and DE-PS 198 18 762.9, are hereby incorporated by reference as if set forth in their entirety herein U.S. Pat. No. 6,192,946 B1 issued on Feb. 27, 2001, to Ludwig CLÜSSERATH and entitled, "Bottling system," and claiming priority from Federal Republic of Germany Patent Application No. 198 36 500 which was filed on Apr. Aug. 12, 1998, and DE-OS 198 36 500 and DE-PS 198 36 500, are hereby incorporated by reference as if set forth in their entirety herein.

U.S. patent application Ser. No. 09/510,862, filed on Feb. 23, 2000, entitled, "Bottling plant and method of operating a bottling plant," having inventors Gisbert STROHN, Ulrich WIEDEMANN, Bernd MOLITOR AND Falk DITTRICH, and claiming priority from Federal Republic of Germany Patent Application No. P 199 080 35.6, filed on Feb. 24, 1999, having inventors Gisbert STROHN, Ulrich WIEDEMANN, Bernd MOLITOR and Falk DITTRICH, are hereby incorporated as if set forth in their entirety herein.

The following foreign patents are hereby incorporated as if set forth in their entirety herein: DE-OS P 199 080 35.6 and DE-PS P 199 080 35.6, both having inventors Gisbert STROHN, Ulrich WIEDEMANN, Bernd MOLITOR and Falk DITTRICH.

U.S. patent application Ser. No. 09/551,126, filed on Apr. 18, 2000, entitled, "Method and apparatus for cleaning filter candles of a candle filter," having inventors Roland KRUGER, Markus KOLCZYK, Rainer KUHNT, and Dietmar OECHSLE, and claiming priority from Federal Republic of Germany Patent Application No. 198 37 569.7, filed on Aug. 19, 1998, and from International Patent Application No. PCT/EP99/05768, filed on Aug. 9, 1999, and DE-OS 198 37 569 and DE-PS 198 37 569, are hereby incorporated as if set forth in their entirety herein.

U.S. patent application Ser. No. 09/574,516, filed on May 19, 2000, entitled, "Method of cleaning filter housings," having inventors Roland KRUGER, Markus KOLCZYK, Rainer KUHNT, and Dietmar OECHSLE, and claiming priority from Federal Republic of Germany Patent Application No. 198 43 308.5, filed on Aug. 19, 1998, and from International Patent Application No. PCT/EP99/05779, filed on Aug. 9, 1999, and DE-OS 198 43 308 and DE-PS 198 43 308, are hereby incorporated as if set forth in their entirety herein.

U.S. patent application Ser. No. 09/590,351, filed on Jun. 8, 2000, entitled, "Method for filling and capping containers such as screw top bottles and the screw top closures therefore," having inventors Roland KRUGER, Markus KOLCZYK, Rainer KUHNT, and Dietmar OECHSLE, and claiming priority from Federal Republic of Germany Patent Application No. 199 60 860, filed on Dec. 1, 1999, and from Federal republic of Germany Patent Application No. 199 26 293, filed on Jun. 9, 1999 and DE-DOS 199 60 860 and DE-PS 199 60 860, as well as DE-OS 199 26 293 and DE-PS 199 26 293, are hereby incorporated as if set forth in their entirety herein.

U.S. patent application Ser. No. 09/792,129, filed on Feb. 22, 2001, having inventors Ludwig CLÜSSERATH and Manfred HARTEL, and entitled, "Beverage filling machine, system as well as method for filling containers with a liquid filling material, and claiming priority from Federal Republic of Germany Patent Application No. 100 08 426, filed on Feb. 23, 2000, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

U.S. patent application Ser. No. 09/803,728, filed on Mar. 9, 2001, having inventor Siegmar SINDERMANN, and entitled, "Apparatus for displacing foam and air in a container filled with a beverage and apparatus for displacing the remaining air volume in a container filled with filling material," and claiming priority from Federal Republic of Germany Patent Application No. 100 11 653, filed on Mar. 10, 2000, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

U.S. patent application Ser. No. 09/808,411, filed on Mar. 14, 2001, having inventor Siegmar SINDERMANN, and entitled, "Apparatus for the recovery of an inert gas in counter-pressure beverage filling machines and a beverage filling apparatus for stabilizing an inert gas such as carbon dioxide in the containers filled by the beverage filling machine," and claiming priority from Federal Republic of Germany Patent Application No. 100 12 684, filed on Mar. 10, 2000, as well-as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

U.S. patent application Ser. No. 09/877,225, filed on Jun. 8, 2001, having inventor Ludwig CLUSSERATH, and entitled, "Method of filling bottles, cans or the like containers with a liquid filling material, and filling machine," and claiming priority from Federal Republic of Germany Patent Application No. 100 28 676.3, filed on Jun. 9, 2000, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Some examples of methods and apparatus of carbonation beverages, features of which may possibly be used in at least one embodiment of the present invention may possibly be found in the following U.S. Pat. No. 3,992,493 issued to Whyte et al. on Nov. 16, 1976 and entitled, "Beverage carbonation," No. 4,466342 issued to Basile et al. on Aug. 21, 1984 ands entitled, "Carbonation chamber with sparger for beverage carbonation," U.S. Pat. No. 4,517,135 issued to Szerenyi et al. on May 14, 1985 and entitled, "Carbonation measuring system and process," U.S. Pat. No. 4,607,342 issued to Seiden et al. on Aug. 19, 1986 and entitled Apparatus for remotely measuring and controlling the carbon dioxide in a beverage liquid: on-line," U.S. Pat. No. 4,636,337 issued to Gupta et al. on Jan. 13, 1987 and entitled, "Apparatus for rapid carbonation," U.S. Pat. No. 4,656,933 issued to Aschberger et al. on Apr. 14, 1987 and entitled, "Water-carbonizing system," U.S. Pat. No. 4,804, 112 issued to Jeans on Feb. 14, 1989 and entitled, "Carbonating apparatus," U.S. Pat. No. 5,473,161 issued to Nix et al. on Dec. 5, 1995 and entitled, "Method for testing carbonation loss from beverage bottles using IR spectroscopy," and U.S. Pat. No. 5,656,313 issued to Gibney et al. on Aug. 12, 1997 and entitled, "Method of beverage blending and carbonation." All of the foregoing patents are hereby incorporated by reference as if set forth in their entirety herein.

Examples of can closing method and apparatus, features of which may possibly be used or adapted for use with an embodiment of the present invention may be found in the following U.S. patents: U.S. Pat. No. 4,257,341 issued to Roberts on Mar. 24, 1981 and entitled, "Spring pressure adjusting tool for can closing machine," U.S. Pat. No. 4,582,216 issued to Byrd on Apr. 15, 1986 and entitled, "Easy open-reclosable container with pouring lip/drain surface," U.S. Pat. No. 4,705,186 issued to Barrach on Nov. 10, 1987 and entitled, "Can end assembly," U.S. Pat. No. 4,979,635 issued to Levine on Dec. 25, 1990 and entitled, "Easy opening can with internal reclosure flap," and U.S. Pat. No. 5,996,832 issued to Nieuwoudt on Dec. 7, 1999 and entitled, "Cover for beverage can." All of the foregoing patents are hereby incorporated by reference as if set forth in their entirety herein.

Examples of containerization and packaging of beverage containers, features of which may possibly be used or adapted for use with an embodiment of the present invention may be found in the following U.S. patents: U.S. Pat. No. 3,942,631 issued to Sutherland et al. on Mar. 9, 1976 and entitled, "Multi-unit packaging method and package," U.S. Pat. No. 4,029,204 issued to Manizza on Jun. 14, 1977 and entitled, "Bottle package," U.S. Pat. No. 4,703,855 issued to Moe et al. on Nov. 3, 1987 and entitled, "System for storing and shipping containers," U.S. Pat. No. 5,921,740 issued to Stewart on Jul. 13, 1999 and entitled, "Device for an automatically loading a container," and U.S. Pat. No. 6,189, 330 issued to Retachick et al. on Feb. 20, 2001 and entitled, "Container system and process for shipping." All of the foregoing patents are hereby incorporated by reference as if set forth in their entirety herein.

Examples of counter-pressure beverage filling machines may be found in the following U.S. patents, mentioned above: U.S. Pat. Nos. 5,413,153, 6,189,578, and 6,192,946.

Examples of pasteurizing or pasteurization apparatus and methods, and attendant arrangements, features of which may possibly be used or adapted for use in at least one embodiment of the present invention may be found in the following U.S. Pat. No. 4,331,629 issued to Huling on May 25, 1982 and entitled, "Steam and water conservation system for pasteurizers," U.S. Pat. No. 4,441,406 issued to Becker et al.

on Apr. 10, 1984 and entitled, "Pasteurization apparatus," U.S. Pat. No. 4,490,401 issued to Becker et al. on Dec. 25, 1984 and entitled, "Pasteurization method," U.S. Pat. No. 4,685,507 issued to Schafer on Aug. 11, 1987 and entitled, "Process for the staged heating of a material in a treatment apparatus and subsequent cooling thereof," U.S. Pat. No. 4,693,902 issued to Richmond et al. on Sep. 15, 1987 and entitled, "Pasteurization process," U.S. Pat. No. 4,704,958 issued to Braymand on Nov. 10, 1987 and entitled, "Pasteurization apparatus," U.S. Pat. No. 4,727,800 issued to Richmond et al. on Mar. 1, 1988 and entitled, "Pasteurization apparatus," U.S. Pat. No. 4,801,466 issued to Clyne et al. on Jan. 31, 1989 and entitled, "Pasteurization monitoring process," U.S. Pat. No. 4,841,457 issued to Clyne et al. on Jun. 20, 1989 and entitled, "Pasteurization monitoring process," U.S. Pat. No. 5,012,727 issued to Presente et al. on May 7, 1991 and entitled, "Apparatus for the control of a pasteurizing process," U.S. Pat. No. 5,264,036 issued to Haas et al. on Nov. 23, 1993 and entitled, "Apparatus for applying a fluid under hydrostatic pressure to a moving web of material," U.S. Pat. No. 5,310,566 issued to Baudendistel on May 10, 1994 and entitled, "Method of ensuring constant product quality and safety when tailback conditions occur in pasteurizers," U.S. Pat. No. 5,334,352 issued to Johnson on Aug. 2, 1994 and entitled, "Manifold construction," U.S. Pat. No. 5,614,238 issued to Mendez on Mar. 25, 1997 and entitled, "Process for the natural aseptic packaging of juices for extending shelf life without refrigeration," U.S. Pat. No. 5,750,174 issued to Lucassen on May 12, 1998 and entitled, "Process and apparatus for pasteurizing liquid contained in containers," U.S. Pat. No. 5,759,627 issued to Kokubo et al. on Jun. 2, 1998 and entitled, "Coating apparatus," U.S. Pat. No. 5,772,958 issued to Nielsen on Jun. 30, 1998 and entitled, "Method and apparatus for the pasteurization of a continuous line of products," U.S. Pat. No. 6,142,065 issued to Panella et al. on Nov. 7, 2000 and entitled, "System for controlling the pasteurization heat treatment, in particular of packaged food products, in tunnel-type pasteurizers," and U.S. Pat. No. 6,189,440 issued to Amundson on Feb. 20, 2001 and entitled, "Continuous flow pasteurizer."

The components disclosed in the various publications disclosed or incorporated by reference herein, may be used in the embodiments of the present invention, as well as equivalents thereof.

The appended drawings in their entirety, including all dimensions, proportions, and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 199 080 35.6, filed on Feb. 24, 1999, having inventors Gisbert STROHN, Ulrich WIEDEMANN, Bernd MOLITOR and Falk DITTRICH, and DE-OS P 199 080 35.6 and DE-PS P 199 080 35.6, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The corresponding foreign patent applications, namely, Application No.100 42 528.3, filed on Aug. 30, 2000, having inventor Ulrich WIEDEMANN, and DE-OS 100 42 528.3, having inventor Ulrich WIEDEMANN, and DE-PS 100 42 528.3, having inventor Ulrich WIEDEMANN, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, and the references they are in turn cited in are hereby incorporated by reference as if set forth in their entirety herein. All of the documents cited herein, referred to in the immediately preceding sentence, include all of the patents, patent applications and publications cited anywhere in the present application. All-of the references included herein as aforesaid include the corresponding equivalents published by the United States Patent and Trademark Office and elsewhere.

The details in the patents, patent applications and publications may be considered to be incorporable, at Applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A product pasteurizing section for a beverage container filling plant for filling beverage containers such as bottles or containers with a beverage, said product pasteurizing section being configured to permit at least heating and cooling of the content in containers, said product pasteurizing section comprising:

a housing comprising a roof arrangement, an inlet arrangement configured to receive containers into said housing, and an outlet arrangement configured to discharge containers from said housing;

a plurality of spray arrangements being disposed integrally in said roof arrangement;

said roof arrangement being configured to receive said plurality of spray arrangements;

each of said plurality of spray arrangements comprising a spray nozzle being configured to spray a stream of liquid;

each of said spray nozzles being disposed integrally within said roof arrangement;

said plurality of spray arrangements and said roof arrangement being configured to be disposed above the containers to permit spraying of containers from above the containers;

said plurality of spray arrangements in said roof arrangement comprising:

a first roof portion of spray arrangements;
said first roof portion being configured:
to receive containers from said inlet arrangement; and
to be disposed to heat the beverage in containers with a first, heated, spray of liquid having a predetermined first temperature to bring the beverage in containers to a temperature below the pasteurization temperature of the beverage;
a second roof portion of spray arrangements;
said second roof portion being configured to pasteurize the beverage in containers with a second, heated, spray of liquid having a predetermined second temperature to bring the beverage in containers to the pasteurization temperature of the beverage; and
a third roof portion of spray arrangements;
said third roof portion being configured to cool the beverage in containers with a third spray of liquid having a predetermined third temperature to bring the beverage in containers to a temperature below said second temperature;
said second roof portion being configured:
to be disposed adjacent to said first roof portion; and
to receive containers from said first roof portion; and
said third roof portion being configured:
to be disposed adjacent to said second roof portion;
to receive containers from said second roof portion; and
to discharge containers through said outlet arrangement from said housing.

2. The product pasteurizing section according to claim 1, wherein:

said housing has a longitudinal axis extending from said inlet arrangement to said outlet arrangement of said housing;
said roof arrangement comprises a plurality of depressions configured and disposed to receive liquid to be sprayed over containers;
each one of said depressions has a pair of walls extending in the direction of said longitudinal axis of said housing;
each one of said depressions has a planar bottom surface;
each one of said pair of walls has a length;
each one of said depressions has a width between a pair of walls;
said length of each wall is greater than said width between a pair of walls;
each planar bottom surface is configured to have a plurality of said spray nozzles disposed therein;
said housing has a first side;
said inlet arrangement is disposed in said first side;
said housing has a second side;
said outlet arrangement is disposed in said second side;
said roof arrangement comprises a first inlet for liquid;
said first inlet for liquid is disposed at said first side of said housing;
said first inlet is configured to permit entry of liquid in a flow of liquid in the direction from said first side to said second side of said housing;
at least one of said plurality of depressions is configured and disposed to receive liquid from said first inlet and to pass the received liquid through said spray nozzles disposed in the planar bottom surface of said at least one depression over containers;
said roof arrangement comprises a second inlet for liquid;
said second inlet for liquid is disposed at said second side of said housing;
said second inlet liquid is configured to permit entry of liquid in a flow of liquid in the direction from said second side to said first side of said housing; and
at least one of said plurality of depressions is configured and disposed to receive liquid from said second inlet and to pass the received liquid through said spray nozzles disposed in the planar bottom surface of said at least one depression over containers.

3. The product pasteurizing section according to claim 2, wherein each one of said pair of walls comprises a pair of sloping walls.

4. The product pasteurizing section according to claim 3, wherein:

said housing comprises a frame structure;
said roof arrangement comprises a plurality of roof sections disposed in said frame structure;
said roof arrangement comprises a plurality of cover arrangements disposed above said plurality of roof sections;
said plurality of cover arrangements is configured to cover said plurality of roof sections; and
at least one of said plurality of cover arrangements comprises a hinge arrangement configured and disposed to permit movement of said at least one cover arrangement between a first position in which said at least one cover arrangement is disposed to cover a plurality of spray arrangements and a second position in which said at least one cover arrangement is disposed to expose a plurality of spray arrangements.

5. The product pasteurizing section according to claim 1, wherein:

said roof arrangement comprises a single cover arrangement; and
said cover arrangement is disposed above said plurality of spray arrangements and configured to cover substantially all of said plurality of spray arrangements.

6. The product pasteurizing section according to claim 1, wherein:

said roof arrangement comprises a first, lower roof portion and a second, upper, roof portion disposed above said first, lower, roof portion; and
a seal is disposed between said first, lower, roof portion and said second, upper, roof portion to seal said first and second roof portions.

7. The product pasteurizing section according to claim 6, wherein:

said first, lower, roof portion comprises a flat portion;
said flat portion is configured to extend over a substantial portion of said roof arrangement;
a plurality of said spray nozzles is disposed in said flat portion;
said plurality of spray nozzles is disposed and configured to spray liquid over sealed containers;
said second, upper, roof portion comprises a cover for said first, lower, roof portion;
said second, upper, roof portion comprises a conduit arrangement; and
said conduit arrangement is configured and disposed to permit the supply of liquid to said plurality of spray nozzles.

8. A product pasteurizing section for a beverage container filling plant for filling beverage containers such as bottles or containers with a beverage, said product pasteurizing section being configured to permit at least heating and cooling of the content in containers, said product pasteurizing section comprising:
- a housing comprising a roof arrangement, an inlet arrangement configured to receive containers into said housing, and an outlet arrangement configured to discharge containers from said housing;
- a plurality of spray arrangements being disposed within said roof arrangement;
- each of said plurality of spray arrangements comprising a spray nozzle being configured to spray a stream of liquid;
- each of said spray nozzles being disposed integrally within said roof arrangement;
- said plurality of spray arrangements and said roof arrangement being configured to be disposed above the containers to permit spraying of containers from above the containers;
- said plurality of spray arrangements in said roof arrangement comprising:
  - a first roof portion of spray arrangements;
  - said first roof portion being configured:
    - to receive containers from said inlet arrangement; and
    - to be disposed to heat the beverage in containers with a first, heated, spray of liquid having a predetermined first temperature to bring the beverage in containers to a temperature below the pasteurization temperature of the beverage;
  - a second roof portion of spray arrangements;
  - said second roof portion being configured to pasteurize the beverage in containers with a second, heated, spray of liquid having a predetermined second temperature to bring the beverage in containers to the pasteurization temperature of the beverage; and
  - a third roof portion of spray arrangements;
  - said third roof portion being configured to cool the beverage in containers with a third spray of liquid having a predetermined third temperature to bring the beverage in containers to a temperature below said second temperature;
  - said second roof portion being configured:
    - to be disposed adjacent to said first roof portion; and
    - to receive containers from said first roof portion; and
  - said third roof portion being configured:
    - to be disposed adjacent to said second roof portion;
    - to receive containers from said second roof portion; and
    - to discharge containers through said outlet arrangement from said housing.

9. The product pasteurizing section according to claim 8, wherein:
- said housing has a longitudinal axis extending from said inlet arrangement to said outlet arrangement of said housing;
- said roof arrangement comprises a plurality of depressions configured and disposed to receive liquid to be sprayed over containers;
- each one of said depressions has a pair of walls extending in the direction of said longitudinal axis of said housing;
- each one of said depressions has a planar bottom surface;
- each one of said pair of walls has a length;
- each one of said depressions has a width between a pair of walls;
- said length of each wall is greater than said width between a pair of walls;
- each planar bottom surface is configured to have a plurality of said spray nozzles disposed therein;
- said housing has a first side;
- said inlet arrangement is disposed in said first side;
- said housing has a second side;
- said outlet arrangement is disposed in said second side;
- said roof arrangement comprises a first inlet for liquid;
- said first inlet for liquid is disposed at said first side of said housing;
- said first inlet is configured to permit entry of liquid in a flow of liquid in the direction from said first side to said second side of said housing;
- at least one of said plurality of depressions is configured and disposed to receive liquid from said first inlet and to pass the received liquid through said spray nozzles disposed in the planar bottom surface of said at least one depression over containers;
- said roof arrangement comprises a second inlet for liquid;
- said second inlet for liquid is disposed at said second side of said housing;
- said second inlet liquid is configured to permit entry of liquid in a flow of liquid in the direction from said second side to said first side of said housing; and
- at least one of said plurality of depressions is configured and disposed to receive liquid from said second inlet and to pass the received liquid through said spray nozzles disposed in the planar bottom surface of said at least one depression over containers.

10. The product pasteurizing section according to claim 9, wherein each one of said pair of walls comprises a pair of sloping walls.

11. The product pasteurizing section according to claim 10, wherein:
- said housing comprises a frame structure;
- said roof arrangement comprises a plurality of roof sections disposed in said frame structure;
- said roof arrangement comprises a plurality of cover arrangements disposed above said plurality of roof sections;
- said plurality of cover arrangements is configured to cover said plurality of roof sections; and
- at least one of said plurality of cover arrangements comprises a hinge arrangement configured and disposed to permit movement of said at least one cover arrangement between a first position in which said at least one cover arrangement is disposed to cover a plurality of spray arrangements and a second position in which said at least one cover arrangement is disposed to expose a plurality of spray arrangements.

12. The product pasteurizing section according to claim 8, wherein:
- said roof arrangement comprises a single cover arrangement; and
- said cover arrangement is disposed above said plurality of spray arrangements and configured to cover substantially all of said plurality of spray arrangements.

13. The product pasteurizing section according to claim 8, wherein:

said roof arrangement comprises a first, lower roof portion and a second, upper, roof portion disposed above said first, lower, roof portion;

a seal is disposed between said first, lower, roof portion and said second, upper, roof portion to seal said first and second roof portions;

said first, lower, roof portion comprises a flat portion;

said flat portion is configured to extend over a substantial portion of said roof arrangement;

a plurality of said spray nozzles is disposed in said flat portion;

said plurality of spray nozzles is disposed and configured to spray liquid over sealed containers;

said second, upper, roof portion comprises a cover for said first, lower, roof portion;

said second, upper, roof portion comprises a conduit arrangement; and said conduit arrangement is configured and disposed to permit the supply of liquid to said plurality of spray nozzles.

14. A product pasteurizing section for a beverage container filling plant for filling beverage containers with a beverage, said product pasteurizing section being configured to permit at least heating and cooling of the content in the containers, said product pasteurizing section comprising:

a housing comprising a roof arrangement, an inlet arrangement configured to receive containers into said housing, and an outlet arrangement configured to discharge containers from said housing;

a plurality of sprayers being disposed in said roof arrangement to permit spraying of the containers from above the containers;

each of said plurality of sprayers comprising a spray nozzle being configured to spray a stream of liquid;

each of said spray nozzles being disposed integrally within said roof arrangement;

said plurality of sprayers in said roof arrangement comprising:

a first roof portion of sprayers;

said first roof portion being configured:
to receive containers from said inlet arrangement; and
to be disposed to heat the beverage in containers with a first, heated, spray of liquid having a predetermined first temperature to bring the beverage in containers to a temperature below the pasteurization temperature of the beverage;

a second roof portion of sprayers;

said second roof portion being configured to pasteurize the beverage in containers with a second, heated, spray of liquid having a predetermined second temperature to bring the beverage in containers to the pasteurization temperature of the beverage; and a third roof portion of sprayers;

said third roof portion being configured to cool the beverage in containers with a third spray of liquid having a predetermined third temperature to bring the beverage in containers to a temperature below said second temperature;

said second roof portion being configured:
to be disposed adjacent to said first roof portion; and
to receive containers from said first roof portion; and said third roof portion being configured:
to be disposed adjacent to said second roof portion;
to receive containers from said second roof portion; and
to discharge containers through said outlet arrangement from said housing.

15. The product pasteurizing section according to claim 14, wherein:

said housing has a longitudinal axis extending from said inlet arrangement to said outlet arrangement of said housing;

said roof arrangement comprises a plurality of depressions configured and disposed to receive liquid to be sprayed over containers;

each one of said depressions has a pair of walls extending in the direction of said longitudinal axis of said housing;

each one of said depressions has a planar bottom surface;

each one of said pair of walls has a length;

each one of said depressions has a width between a pair of walls;

said length of each wall is greater than said width between a pair of walls;

each planar bottom surface is configured to have a plurality of said spray nozzles disposed therein;

said housing has a first side;

said inlet arrangement is disposed in said first side;

said housing has a second side;

said outlet arrangement is disposed in said second side;

said roof arrangement comprises a first inlet for liquid;

said first inlet for liquid is disposed at said first side of said housing;

said first inlet is configured to permit entry of liquid in a flow of liquid in the direction from said first side to said second side of said housing;

at least one of said plurality of depressions is configured and disposed to receive liquid from said first inlet and to pass the received liquid through said spray nozzles disposed in the planar bottom surface of said at least one depression over containers;

said roof arrangement comprises a second inlet for liquid;

said second inlet for liquid is disposed at said second side of said housing;

said second inlet liquid is configured to permit entry of liquid in a flow of liquid in the direction from said second side to said first side of said housing; and at least one of said plurality of depressions is configured and disposed to receive liquid from said second inlet and to pass the received liquid through said spray nozzles disposed in the planar bottom surface of said at least one depression over containers.

16. The product pasteurizing section according to claim 15, wherein each one of said pair of walls comprises a pair of sloping walls.

17. The product pasteurizing section according to claim 16, wherein:

said housing comprises a frame structure;

said roof arrangement comprises a plurality of roof sections disposed in said frame structure;

said roof arrangement comprises a plurality of cover arrangements disposed above said plurality of roof sections;

said plurality of cover arrangements is configured to cover said plurality of roof sections; and at least one of said plurality of cover arrangements comprises a hinge arrangement configured and disposed to permit movement of said at least one cover arrangement between a first position in which said at least one cover arrangement is disposed to cover a plurality of sprayers and a second position in which said at least one cover arrangement is disposed to expose a plurality of sprayers.

18. The product pasteurizing section according to claim 14, wherein:

said roof arrangement comprises a single cover arrangement; and said cover arrangement is disposed above said plurality of sprayers and configured to cover substantially all of said plurality of sprayers.

19. The product pasteurizing section according to claim 14, wherein:

said roof arrangement comprises a first, lower roof portion and a second, upper, roof portion disposed above said first, lower, roof portion; and a seal is disposed between said first, lower, roof portion and said second, upper, roof portion to seal said first and second roof portions.

20. The product pasteurizing section according to claim 19, wherein:

said first, lower, roof portion comprises a flat portion;

said flat portion is configured to extend over a substantial portion of said roof arrangement;

a plurality of said spray nozzles is disposed in said flat portion;

said plurality of spray nozzles is disposed and configured to spray liquid over sealed containers;

said second, upper, roof portion comprises a cover for said first, lower, roof portion;

said second, upper, roof portion comprises a conduit arrangement; and said conduit arrangement is configured and disposed to permit the supply of liquid to said plurality of spray nozzles.

* * * * *